United States Patent [19]
King et al.

[11] Patent Number: 5,537,592
[45] Date of Patent: Jul. 16, 1996

[54] SYSTEM AND METHOD FOR READING AND WRITING DISKS FORMATTED FOR AN OPERATING SYSTEM FOREIGN TO THE HOST COMPUTER

[75] Inventors: Dianne L. King; John W. Whisler, both of Raleigh, N.C.

[73] Assignee: Alphatronix, Research Triangle Park, N.C.

[21] Appl. No.: 376,455

[22] Filed: Jan. 23, 1995

Related U.S. Application Data

[63] Continuation of Ser. No. 232,343, Apr. 22, 1994, abandoned, which is a continuation of Ser. No. 348,557, May 8, 1989, abandoned.

[51] Int. Cl.$^6$ ........................................... G06F 13/00
[52] U.S. Cl. ........................... 395/600; 364/DIG. 1; 364/260.9; 364/280.2
[58] Field of Search ................................ 395/200, 500, 395/600, 700

[56] References Cited

U.S. PATENT DOCUMENTS

| | | | |
|---|---|---|---|
| 4,477,880 | 10/1984 | Advani et al. | 364/900 |
| 4,559,614 | 12/1985 | Peek et al. | 364/900 |
| 4,858,114 | 8/1989 | Heath et al. | 364/200 |
| 5,053,945 | 10/1991 | Whisler | 364/200 |

FOREIGN PATENT DOCUMENTS 2146812  4/1985  United Kingdom.

OTHER PUBLICATIONS

IBM Technical Disclosure Bulletin; "DOS Interface to Non-DOS Formatted Driver", vol. 28, No. 8, Jan. 1986.
IBM Technical Disclosure Bulletin, vol. 28, No. 8, Jan. 1986, Research Disclosure, 2244, (1984) Aug. No. 244.
European Search Report completed Jan. 23, 1992 by Examiner Weiss P. at The Hague.

*Primary Examiner*—Thomas M. Heckler

[57] ABSTRACT

The present invention provides an independent set of processes and data structures that allow data transfer between differently formatted disks of files specified by the user. The processes identify the file format of the disks, retrieve the files in the source file format, store the source files in a common format in memory that allows the directory hierarchy of the disks to be maintained, translates the files to the format of the destination file system disk, creates index information for the destination disk, and stores the files, directories and indexes on the destination disk in the destination file format. The user can then access and modify the files and transfer the modified files back to the foreign disk in the foreign file format using the same transfer processes. The common memory format is a data structure which is a two dimensional list with one dimension maintaining the directory hierarchy of the source disk and the second dimension maintaining the hierarchy of the destination disk. Data and directory rings are used to store file contents as they are transferred from one disk to the other and pagable windows storing the contents of index files on the source and destination disks are used to enhance transfer speed.

26 Claims, 47 Drawing Sheets

Microfiche Appendix Included
(3 Microfiche, 221 Pages)

| COMMAND | | 62 |
|---|---|---|
| TRANSLATE FLAG | | 64 |
| DISK FILE SYSTEM TYPE | *S10 | 66 |
| LOGICAL BLOCK SIZE | S10 | 68 |
| DEVICE INFORMATION | S10 | 70 |
| DEVICE NAME | S10 | 72 |
| FILE SPECIFICATION | S10 | 74 |
| MOUNT FLAG | S10 | 76 |
| CURRENT SCAN # | | 78 |
| CURRENT PROCESS # | | 80 |
| TARGET - SRC OR DEST | | 82 |
| ENTRY SORT FLAG | | 84 |
| TREE FLAG | | 86 |

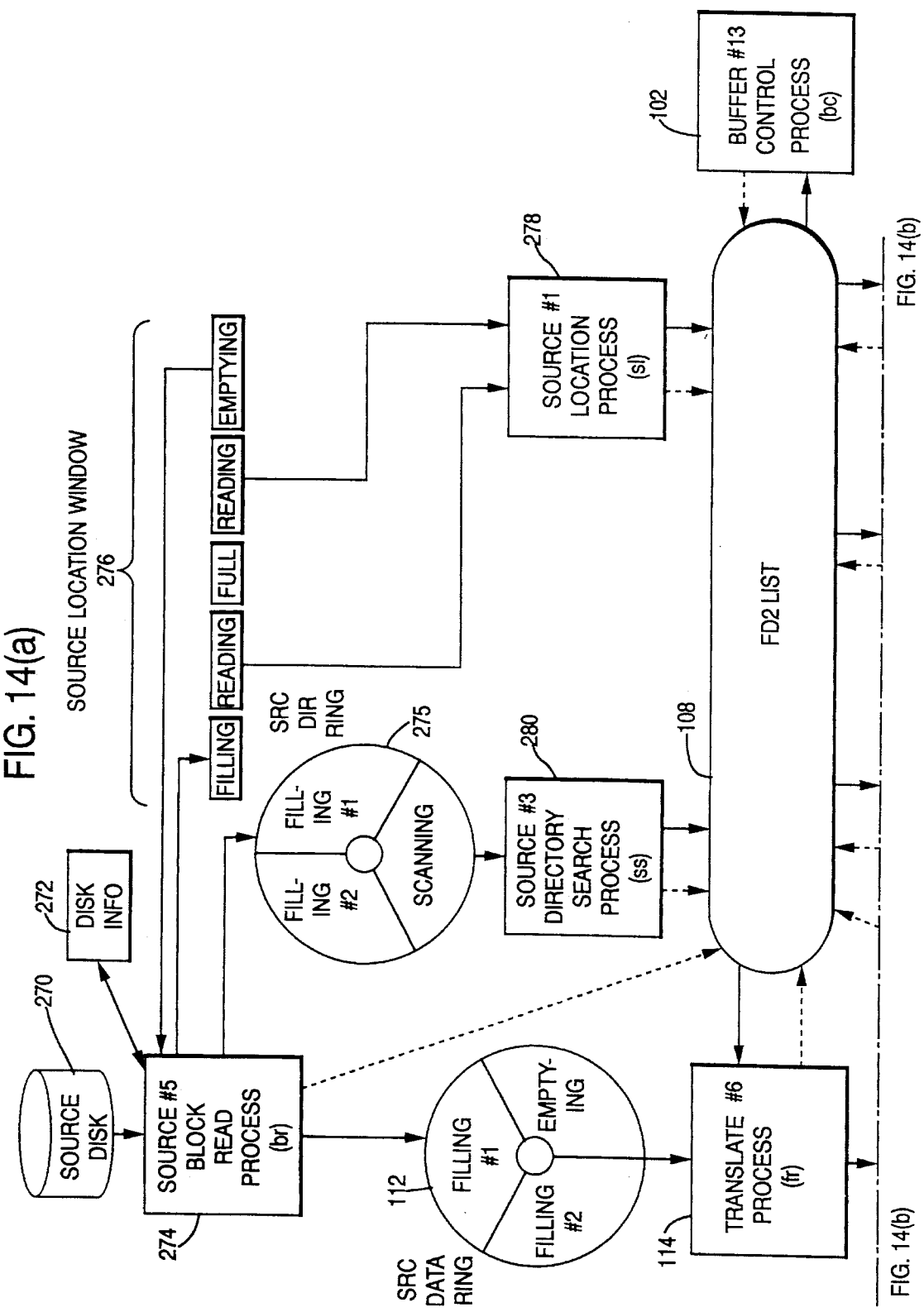

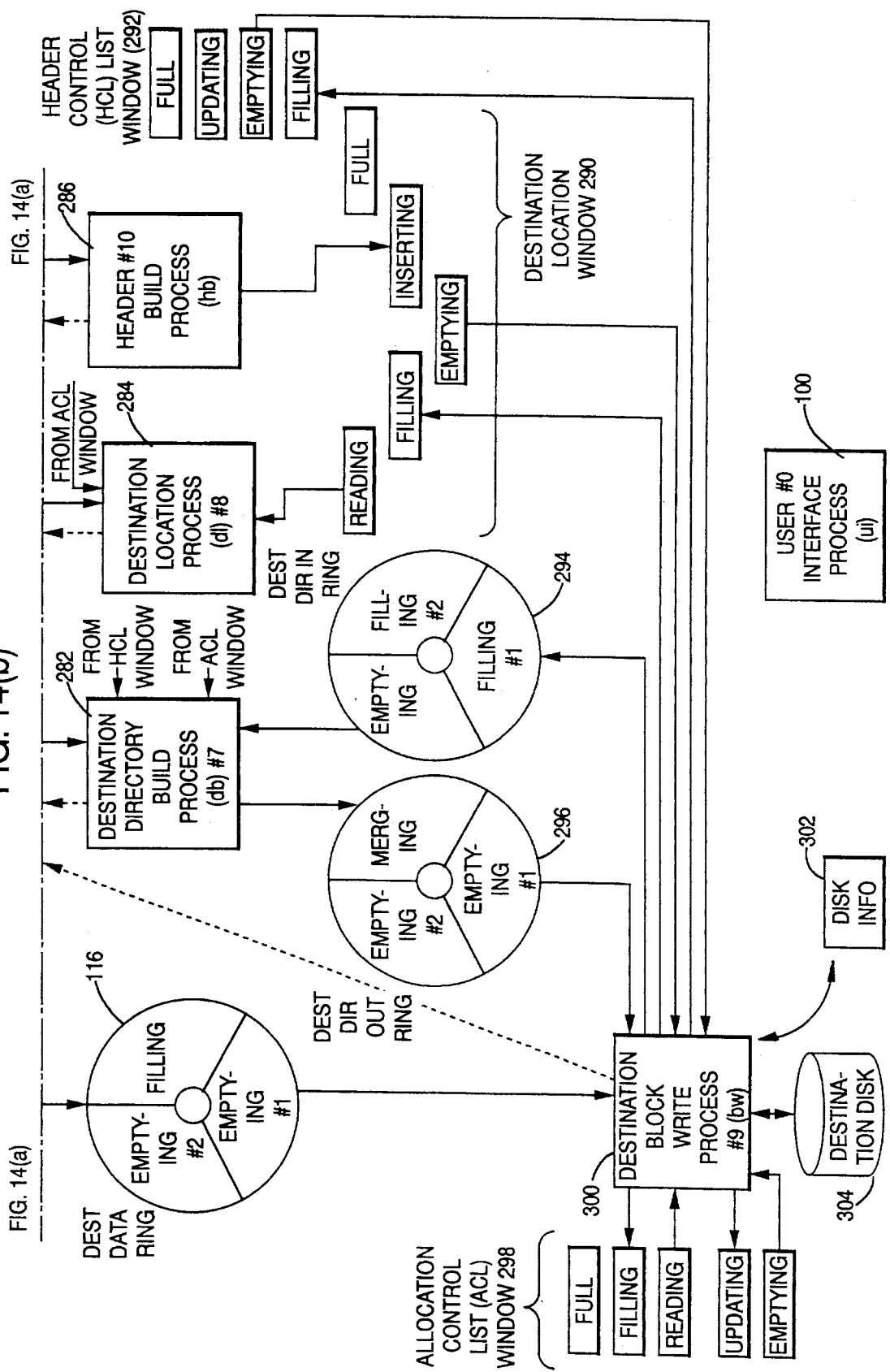

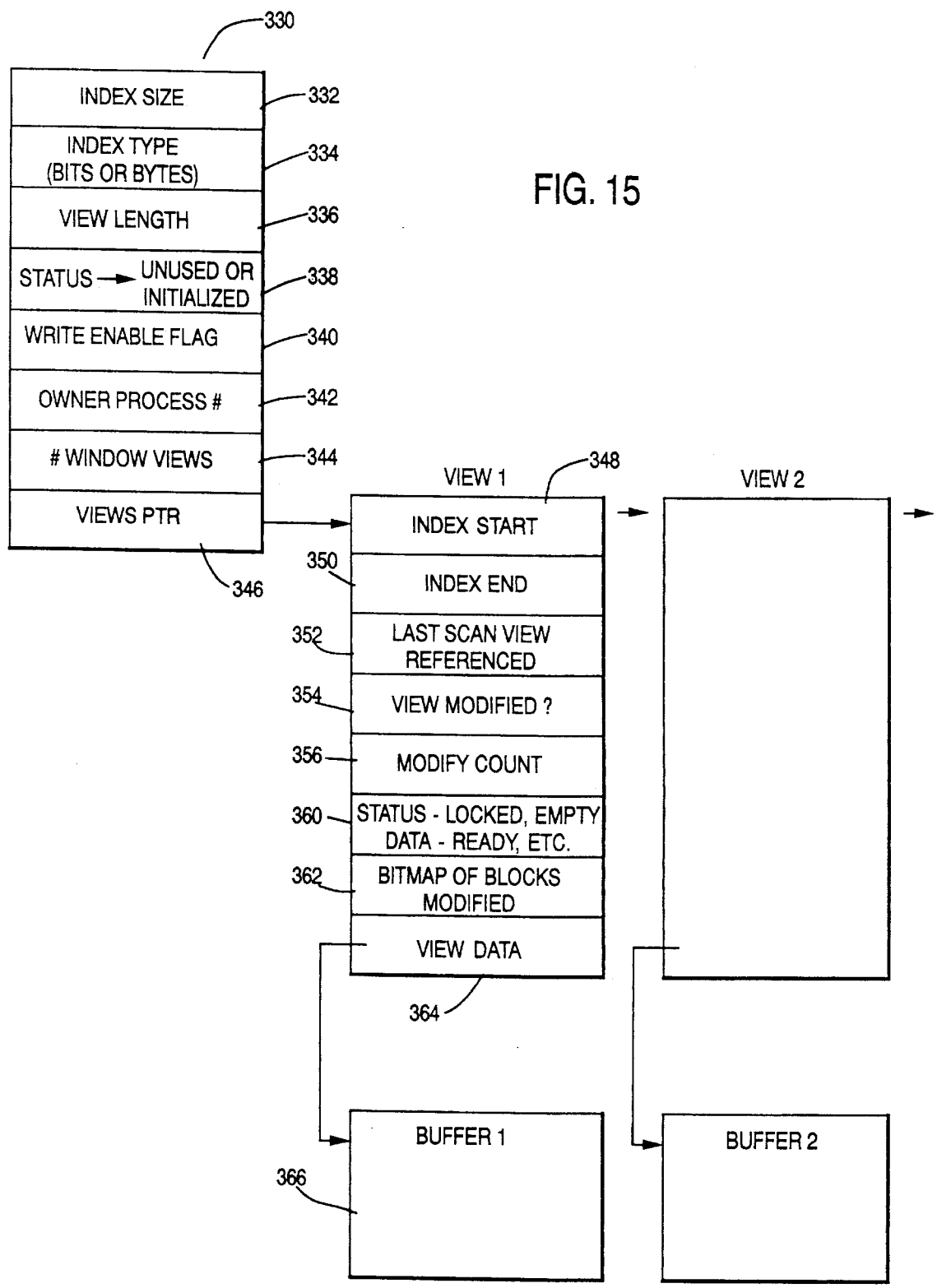

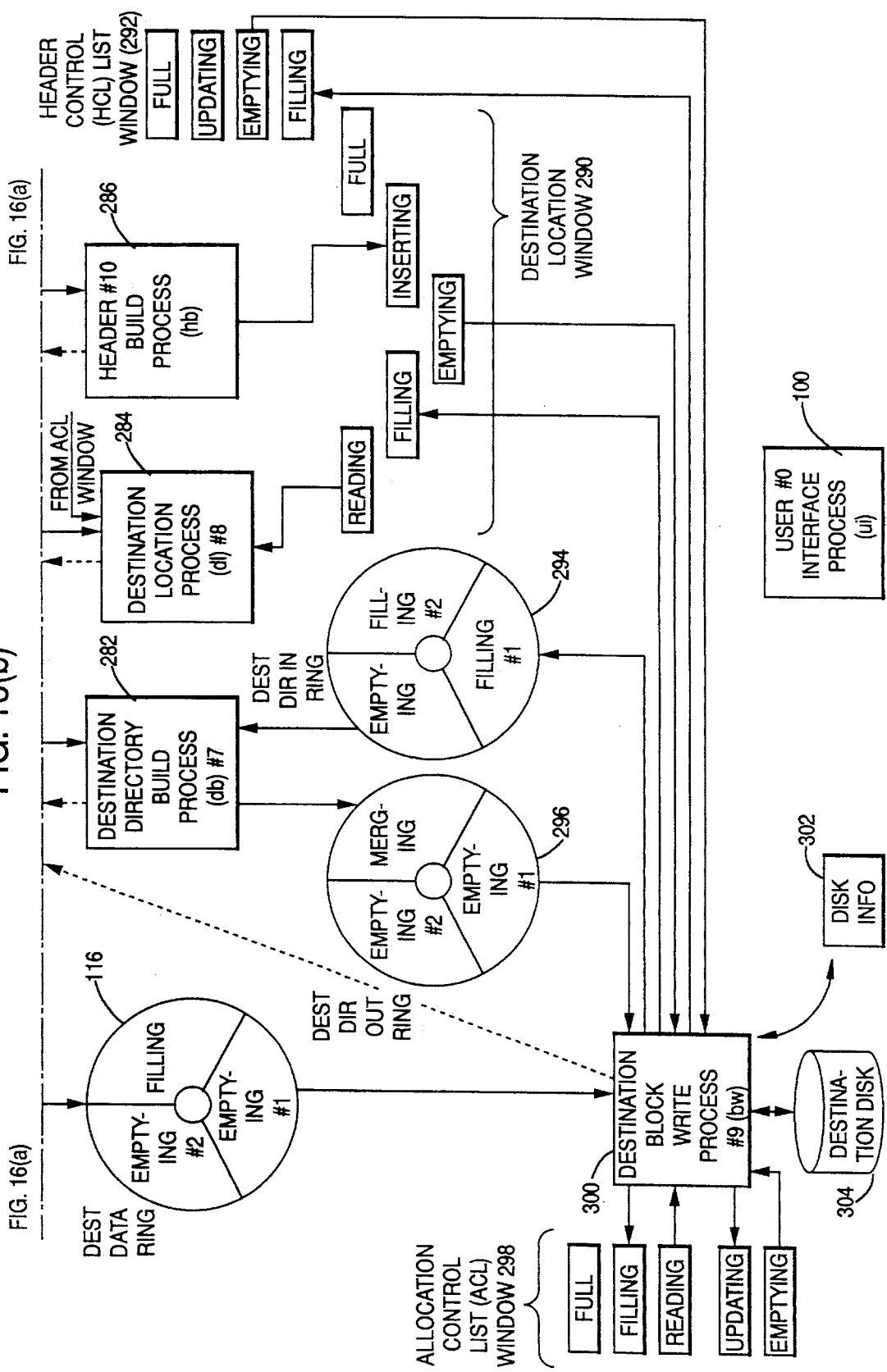

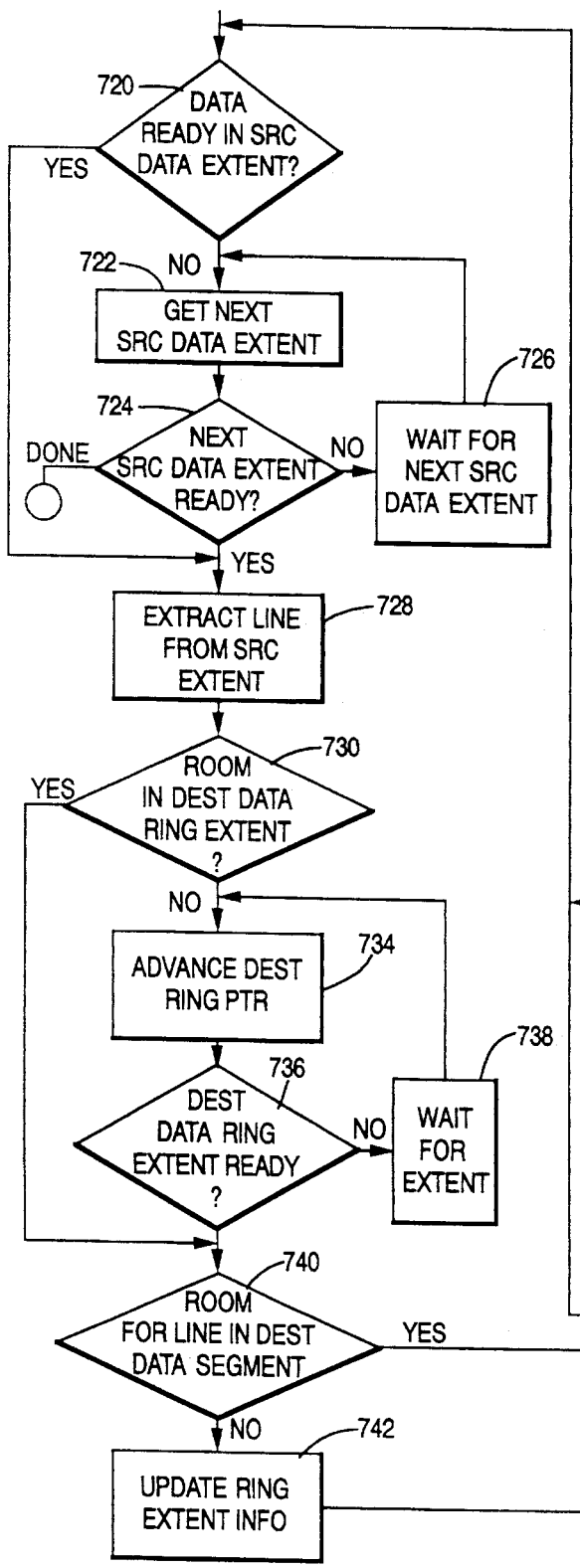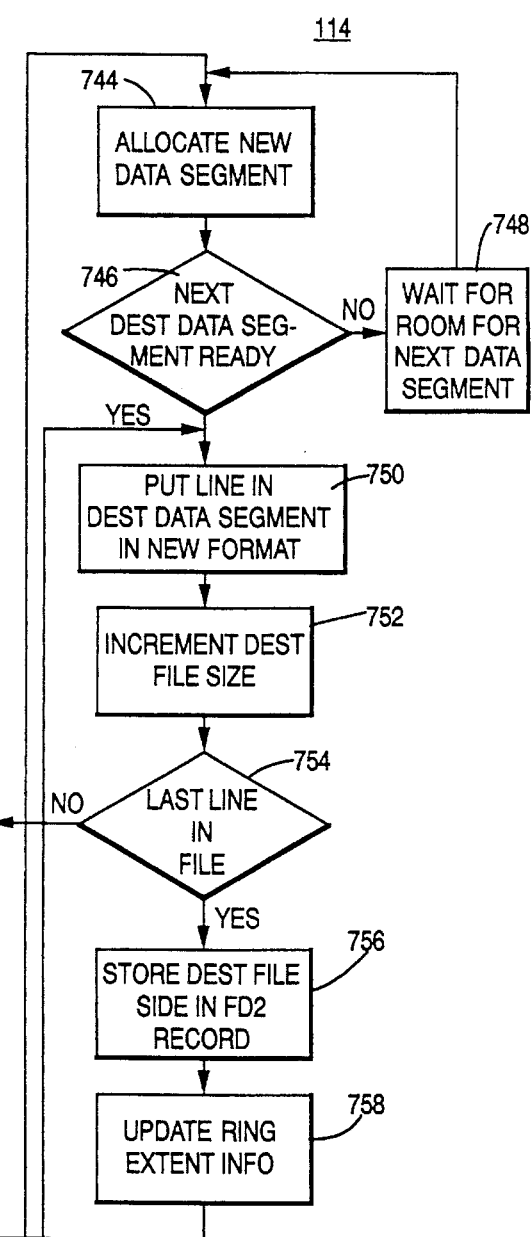
FIG. 27

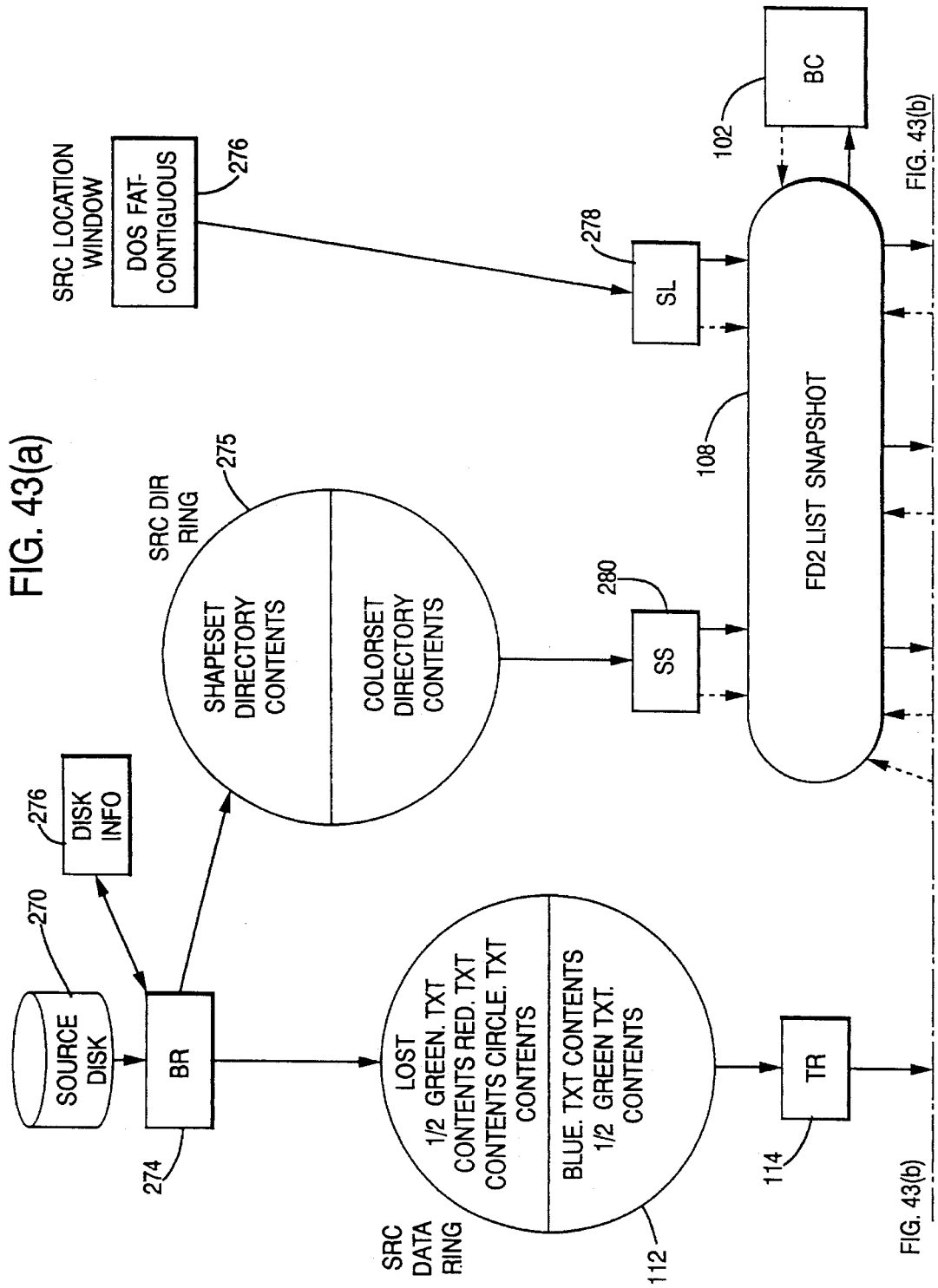

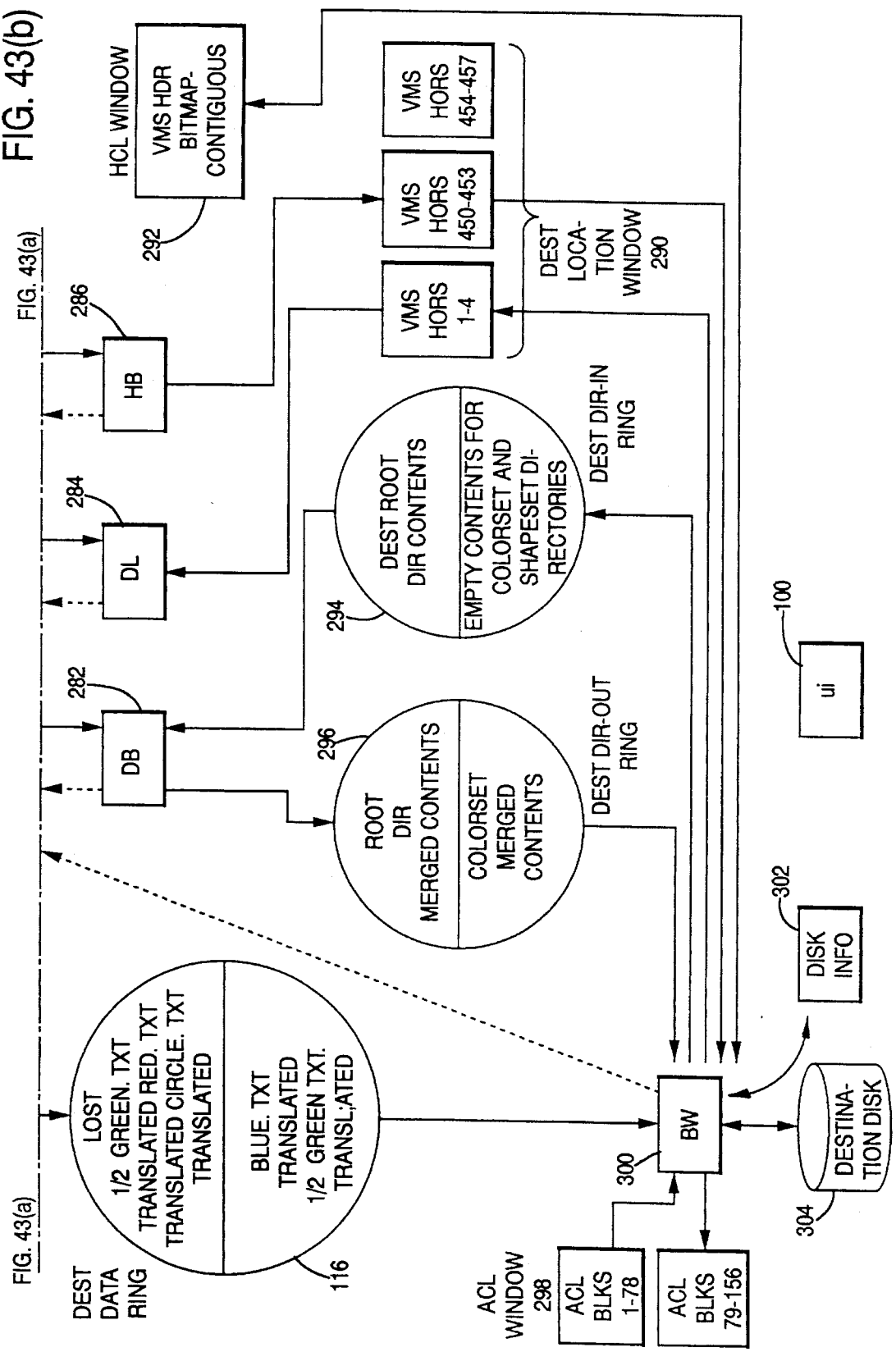

SYSTEM AND METHOD FOR READING AND WRITING DISKS FORMATTED FOR AN OPERATING SYSTEM FOREIGN TO THE HOST COMPUTER

This application is a continuation of application Ser. No. 08/232,343, filed Apr. 22, 1994, now abandoned, which is a continuation of application Ser. No. 07/348,557, filed May 8, 1989, now abandoned.

CROSS REFERENCE TO RELATED APPLICATION

This application is related to U.S. application, Ser. No. 07/254,274, filed Oct. 6, 1988 entitled System And Method For Performing A Multi-File Transfer Operation and by John W. Whisler and incorporated by reference herein.

REFERENCE TO MICROFICHE APPENDIX

This application includes a microfiche appendix with 221 frames on 3 fiche.

BACKGROUND OF THE INVENTION

1. Field of the Invention

The present invention is directed to a system that allows the contents of any disk to be read and written by any computer running any operating system and, more particularly, to an application program running on a host system that allows a user to access and modify disks having a file format suitable for an operating system foreign to the operating system of the host and carry the modified foreign disk back to the original system, thereby making disk file format transparent to the user.

2. Description of the Related Art

A conventional method of transferring data from a disk system 10 of a computer system 12 running one operating system, such as VMS with a corresponding first file format, to another disk system 14 of a second computer system 16 running another operating system, such as MS DOS with a corresponding second file format, is to transfer the data over a local area network (LAN) or over a telephone line system using modems 18 and 20 as illustrated in FIG. 1. The file format of a disk comprises two things, first, the directory structure of the files which is the information that describes where files are located, the relationship between the files and the files themselves and, second, the internal structure of a file such as the record format for text lines within the file. The method described above requires that the files be converted into a common transmission format and transferred over a transmission medium between the physically connected distinct computers 12 an 14. Another method is to store the data on a commonly formatted media such as tape and physically carry the tape between the different computers 12 and 14. Many smaller systems such as personal computers do not have tape facilities available and resort must be had to the network transfer method. Both of these methods are very slow and require hardware that may not be useful for other purposes.

SUMMARY OF THE INVENTION

An object of the present invention is to provide a system that will allow a user to move information between dissimilar file systems on the same computer even if the native operating system does not correspond to that of the dissimilar file system.

Another object of the present invention is to allow a user to access information on a foreign disk.

An additional object of the present invention is to allow a user to write to a foreign disk.

The present invention accomplishes the above objects by providing an independent set of processes and data structures that allow transfer of user specified files between differently formatted disks. The processes identify the file format of the source and destination disks, retrieve the source files in the source file format, store the source files in a common format in memory that allows the directory hierarchy of the source disk and destination disk to be maintained, translate the contents of text source file records to the record format of the destination file system if desired, create directories and headers if necessary for the foreign disk for the transferred files, and store the files on the destination disk in the host file format. The user can then access and modify the files using the host computer system and then transfer the modified files back to the foreign disk in the foreign file format using the same transfer routines with the host system format disk acting as the source and the foreign system format disk acting as the destination.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 14 illustrates a block I/O to block I/O transfer;

FIG. 15 provides an illustration of a window buffer;

FIG. 27 illustrates the operation of the translate process 114;

FIG. 43 illustrates the overall contents of the rings during a transfer snapshot;

DESCRIPTION OF THE PREFERRED EMBODIMENTS

Figure 1:
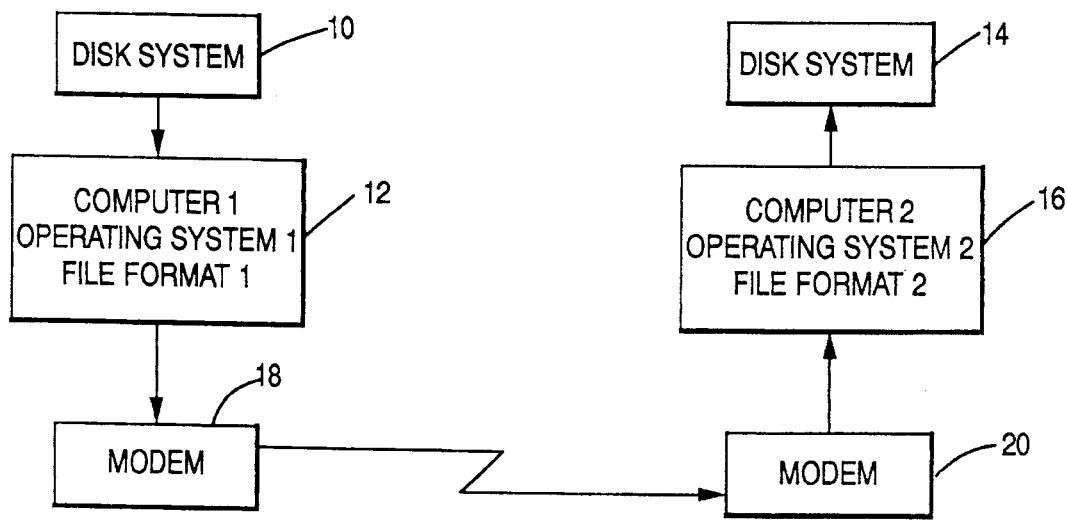
FIG. 1 illustrates a conventional transfer method for disk files in different file formats.
Figure 2:
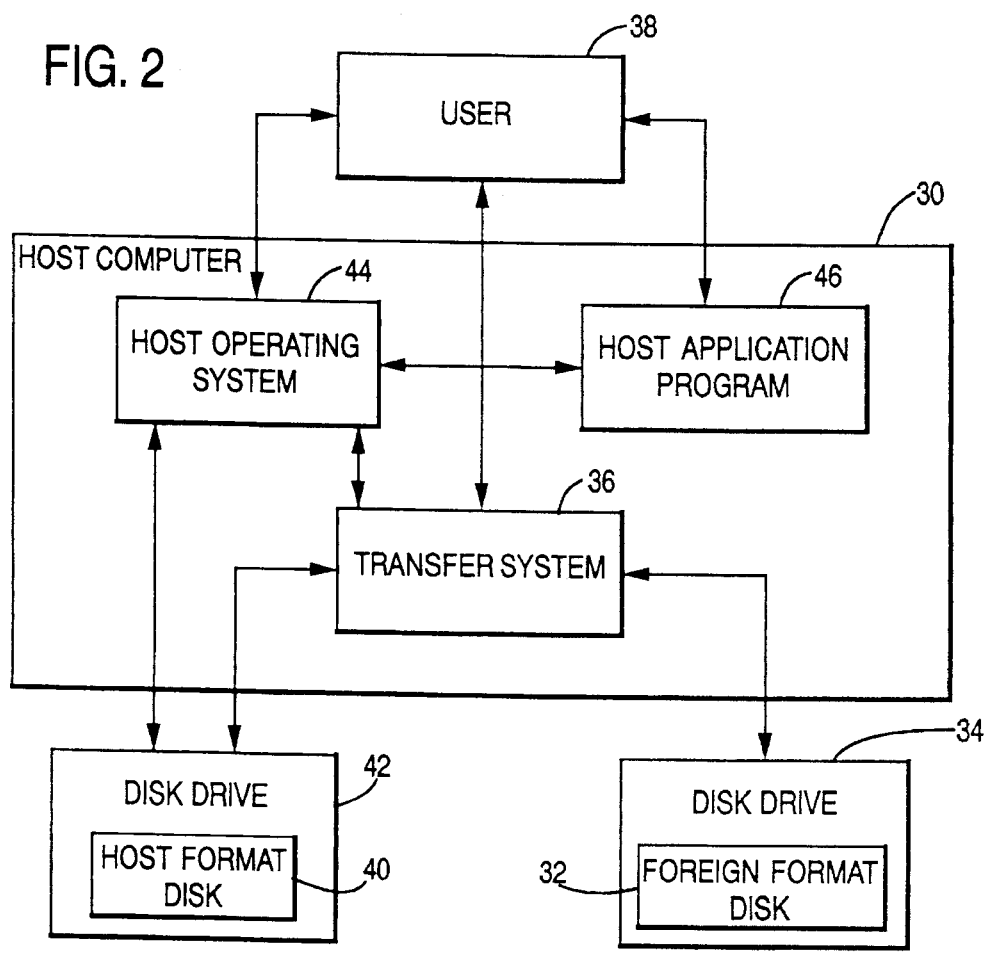
FIG. 2 illustrates the operation of the present invention.

The present invention allows a single computer 30 to access a foreign file format disk 32, as illustrated in FIG. 2, preferably mounted in a disk drive 34, such as the INSPIRE™ model disk drives available from Alphatronix. The transfer system 36 of the present invention will also transfer the contents of the foreign format disk 32 as designated by the user 38 to a host or native file format disk 40 in a disk drive 42 which is also preferably an INSPIRE™ model drive. This transfer or bypass system 36 application program bypasses the host operating system 44 running in the host computer 30 and stores the foreign file format disk file contents on the host format disk 40 in the file format of the host operating system 44. The user 38 can then access the transferred files on the host format disk 40 either through the host operating system 44 or a host application program 46 which accesses the file contents on the host format disk 40 through the host operating system 44. Once the user has completed reviewing the transferred files or completed any file modifications, the files in the host file format on the host disk 40 can be converted by the transfer system 36 into files in the foreign file format and stored on the foreign file format disk 32. The present invention thereby allows the user to have access to the contents of the disk on any computer running any operating system without worrying about whether the files are in a file format accessible by the host system. The present invention requires disk drives 34 and 42 which are hardware compatible and in which the data is stored in a standard physical disk format. The preferred physical disk format is the optical digital physical data disk format adopted by ANSI, ISO and Japan Study Committee 23 (Japan 23) which specifies the physical layout of the information on the disk such as the spacing between tracks and the number of sectors into which the disk is divided. A description of this physical disk format can be found in an ISO paper entitled "Optical Digital Data Disks". The emergence of optical disk drives such as the INSPIRE™ drive mentioned above provides the requisite hardware compatibility.

The transfer system 36 of the present invention is an application program preferably written in a language such as C which is transportable between computer systems with different operating systems. The operation of the application program and the data structures used by the application program will be described with flowcharts in the context of the C programming language, however, the invention can be implemented in other languages such as FORTRAN and PASCAL. The operation of the present invention will also be described using flow charts allowing the reader of ordinary skill to implement the invention in one of the non-preferred languages if desired. However, the present application includes a microfiche appendix which describes the various processes of the present invention in greater detail in a pseudo-code format suitable for implementation in the preferred programming language to which the reader is referred for details of the blocks of the flowcharts. The present invention will also be described particularly with respect to a block I/O transfer from a DOS source disk to a VMS destination disk via block I/O on a machine running a DOS operating system such as an IBM PC/AT. Implementation details of the present invention for transfers to and from other operating systems such as UNIX will also be described. Description of the file systems of the above-mentioned operating systems which will assist the reader of ordinary skill in implementing the present invention for the above-mentioned operating systems can be found in reference books such as: Advanced MS DOS Programming by Ray Duncan; The Design of the UNIX Operating System by Morris J. Bach; SUN OS Reference Manual Release 4.0, Section 5-File Formats; SUN-OS Release 4.0, System Include Files-On Line; VAX/VMS Users Manual Part 2, DCL Appendix; VAX/VMS I/O Reference Volume I; VAX VMS Records Management Services Reference Manual; and VAX/VMS Systems Services Reference Manual incorporated by reference herein. Other operating systems than those mentioned above, such as the AEGIS operating system for Apollo computers or the OS-2 operating system for IBM Personal System computers, will have similar reference works available in which the details necessary to implement the present invention for the non-listed operating system can be found. For example, the details which allow an operating system disk to be uniquely identified as a disk formatted in that operating system can be generally found in such reference works. If for one reason-or another the file format definition information for a particular operating system is not available in a suitable operating system reference, a person of ordinary skill in the operating system design art can easily reverse engineer the file format looking for the common information which every disk maintains such as cluster size, maximum number of files, directory names, an allocation control list, etc. The person reverse engineering the disk would format an empty disk and dump the contents, load the disk with files of known contents and a known file structure and again dump the contents of the disk, then change the file contents and structure and then again dump the contents. By a series of such known content and structure changes with the dumps, the analyst will be able to determine the location and arrangement of the file format information for the foreign disk.

The user 38 of the present invention would load the foreign disk 32 into one disk drive 34 and the native disk 40 into the drive 42 and would load and execute the transfer system or bypass application program 36 of the present invention. Many times the user 38 would not remember all of the files that are needed on the host computer 30 and that are stored on the foreign disk 32, and the user 38 would enter a transfer system directory access command such as DIR which would allow review of the directory on the foreign format disk 32. The user would then specify which files need to be transferred with a command such as COPY A:\*set\...\*.* E: which would copy all directories and files within those directories on the source disk A (disk 34) to the destination disk E (disk 42) which have a directory name which ends with "set". The system 36 would automatically detect the format of the foreign format disk 32 and transfer the appropriate files. A simpler version of the system would ask the user to identify the file formats instead of automatically detecting them. The user could also enter a file review command such as TYPE which would provide the file contents on the user's display or printer for detailed file content review before a transfer decision is made.

Figures 3, 5:
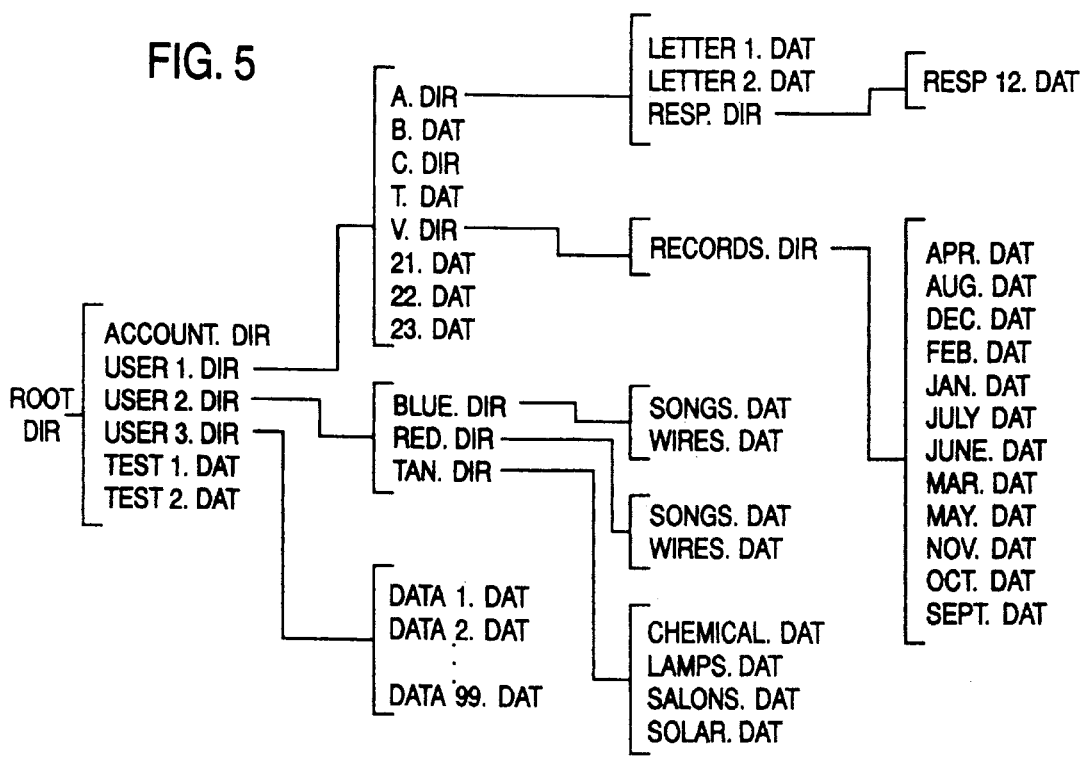
FIG. 3 illustrates the contents of a global operation description data structure 60.
FIG. 5 is an example hierarchical directory structure.
Figure 4:
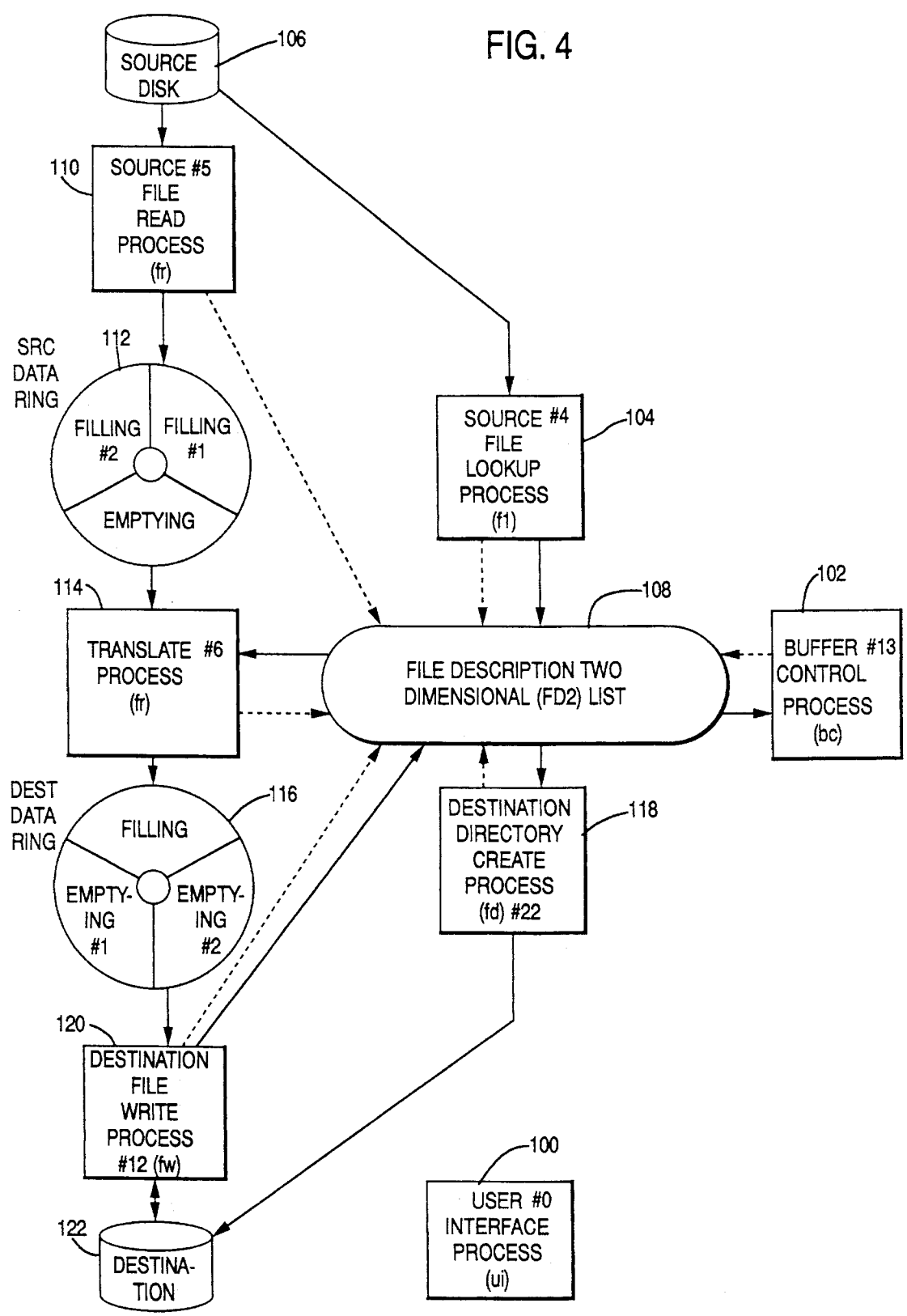
FIG. 4 illustrates process execution and data flow for a file I/O to file I/O transfer.

Once the user interface process 100 illustrated in FIG. 4 of the system has parsed the command, the command, in this situation "COPY", is stored in the operation description data structure 60, illustrated in FIG. 3, in the command field 62. This data structure is an array where the fields ending with s/d have two entries or subfields one for the source and one for the destination. This data structure is a global data structure which can be referenced by all the processes of the invention. The system would also store the device names "A" and "E" in the field 72. The device information 70 is obtained to insure that the devices are random access disk devices and to determine how they are mounted, for example foreign with files on VMS. The system next determines the type of file system for the source and destination and stores the types in field 66. As previously mentioned, if a simpler version of the invention is implemented the file types specified by the user would be entered here.

The type determination is preferably in an order in which the DOS file format determination is made last because, as will be discussed below, VMS and UNIX have check sums which provide a better method of type determination and thus a lesser chance of inadvertently misidentifying the disk file format type. In the VMS file formatted disks two check sums in the home block of the disk must be correct and non-zero for the disk to be uniquely identified as a VMS disk. A UNIX file format disk has one check sum which also has to be correct and non-zero to uniquely identify the disk as a UNIX format disk. To identify a DOS formatted disk the BIOS parameter block, the first block on the disk, must be checked to determine if the fields therein are valid. This validity test determines whether the version and OEM field contains alphanumeric characters, blanks or the "." character, determines whether the sectors per cluster, number of file allocation tables and number of reserve sectors are non-zero, determines whether the bytes per sector are a multiple of 128, determines whether the total disk capacity is greater than the minimum disk capacity and determines whether the number of root directory entries (space per entry) occupies an even multiple of sectors. If all of these determinations are positive then the disk is uniquely identified as a DOS disk. The source block read process 274 and the destination block write process 300, both to be discussed later, are initially turned on to determine disk type and then return done when the appropriate information, as discussed above, has been loaded. The logical block size of the foreign disk is also determined and stored in field 68. In the context of this application logical block size can have two different meanings. The first is the logical block size of the foreign disk as it will be interpreted when carried back to the foreign disk operating system. This information is stored on the disk, for DOS in the Bios Parameters Block and for VMS in the home block. This information is extracted when these blocks are checked and the disk type is determined. This value is then stored in the global operation description data structure 60 in field 68 as mentioned above. The other meaning is the logical block size that is used during logical input/output—read/write operations. In VMS and UNIX, the I/O logical block size is always 512 bytes while in DOS it varies in size between disks. The block I/O size in a DOS formatted disk is determined by first filling a buffer with the pattern "5A" where the buffer is larger than the largest block available in DOS. On the first read call this buffer is filled and then checked to see how much of the buffer has been written over. The size determined is the DOS I/O logical block size. A translation between sizes, which will be discussed later, that occurs in an I/O call is a translation between these two meanings.

As previously mentioned the disk file system type is stored in field 66 while the file specification for the files being transferred is stored in field 74. In the example mentioned previously the specification is "*set". If the source or destination disks are foreign to the operating system 44 of the computer 30 the transfer to or from the disks must be a block I/O transfer. If the source or destination disk format is native, that is, in the format of the host operating system 44 the transfers to and from the disk can be accomplished by file I/O transfers. However, with the use of the present invention in a block I/O transfer mode, because of the ring buffering scheme used, transfers are faster than when using file I/O transfers. For example, with a VMS disk mounted foreign on computer system running VMS a block I/O transfer will occur in the present invention that is faster that a file I/O transfer. This speed advantage is possible because the VMS disk foreign mounted will not be simultaneously modified by other users of the system. On a computer system running DOS a block I/O transfer for increased speed may also be done because DOS is a single user non-multi-tasking system resulting in no risk of a user modifying files while they are being accessed by the present invention. However, when a DOS file server on a LAN is the target system file I/O must be used because more than one computer may have access to the data.

Subsequent to the parsing, if a transfer command is being executed and one of the disks is a foreign file format disk, the user is also asked by the interface process 100 whether the contents of the files need to be translated and if so the translate flag 64 is set. When the translate flag is set all of the files are translated. It is of course possible to create a special translate array which would allow the user to designate each file that needs to be translated. The set translate flag specifies that the user wants to convert the line record format of the contents of the text files from the format of the source disk to the format of the destination disk. For example, in DOS for text files each line record ends with a carriage return and a line feed, while in VMS, in one of the several record formats used, the line record begins with a line length character. The translate flag would result in an appropriate record format translation and in the above example would cause a line feed to be added or subtracted and a line length field to be removed or added and completed as necessary and the line termination field of the header to be appropriately set to a line feed terminated file in a VMS destination disk situation.

If the designation disk is a VMS disk then a sort flag 84 is automatically set by the user interface process 100 because the directory entries in VMS must be sorted alphabetically. For a COPY command the sort flag is always set so that a file description two dimensional list, to be discussed in more detail later, can be searched more quickly to determine if an entry in the list already exists on the directory of the destination disk.

The buffer control process 102 which is also initially activated uses the current scan number field 78, which is initialized and maintained by a process control routine, to be discussed later, the current process number 80 and the target field 82 of FIG. 3. The scan number is used to determine which view of a window, to be discussed in more detail later, is optimal to download where the window view that has had the least recent access, as determined by scan number is chosen. The current process number is used to insure that one process is not trying to manipulate a pointer of another process. The target field 82 is used to specify whether the target format is the source or destination disk and is used to insure that the appropriate field (source or destination) within the fields in FIG. 3 is selected by the routines of the present invention which perform common operations for source and destination disks. For example, as will be discussed later, the file location process executed during block I/O transfers is executed as both a read and a write process with the target field being used to specify which subfields within fields 66–76 that are accessed.

Once the initialization processes have been executed by the user interface process 100 and the buffer control process 102 and if the source disk 106 is to be referenced as a native disk (i.e. not mounted foreign), the source file look up process 104 obtains the file names of the files and directories from the source disk 106 using the file specification in field 74 and creates nodes in the file description two dimensional list (FD2) list 108 as indicated by the solid data flowlines, where dashed lines indicate pointer movement control. The source file look up process 104, because the source disk 106 is a native source disk will obtain the names by making C based system calls to the operating system 44 of the host computer 30. The process 104 starts with the root directory and searches the directory structure tree in a conventional manner looking for the file names of the files designated by the user 38. For some of the system calls used in this process, such as file open, file read, file write and file close, the C library provides a standard interface, for the other system calls the appropriate call is determined by reference to the operating system reference texts where similar system calls will be available in each operating system. One of ordinary skill in the art can easily identify which system calls are necessary from the operating system reference texts.

Figure 6:
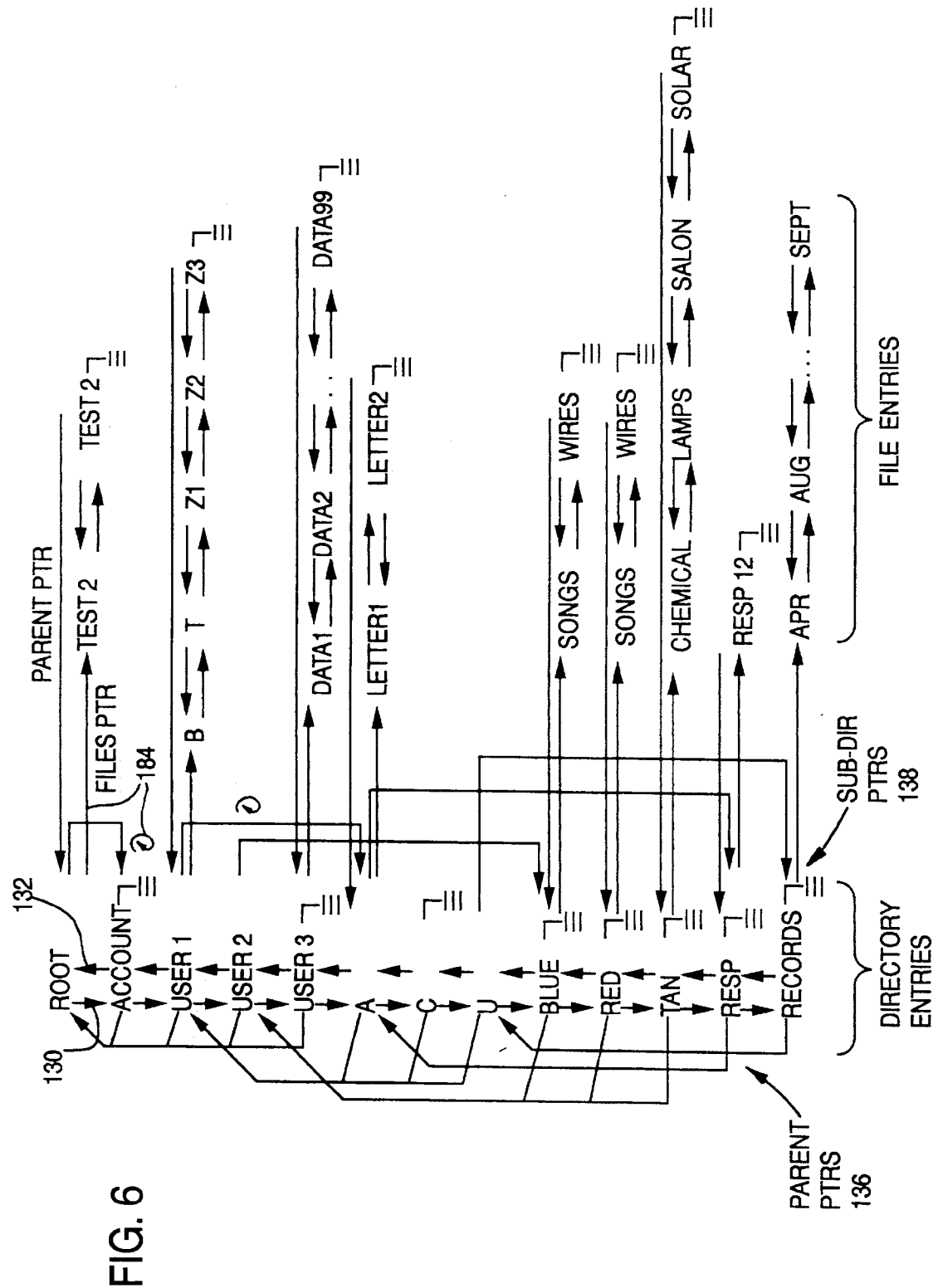
FIG. 6 illustrates the structure of FIG. 5 in a file description two-dimensional list 108.
Figure 7:
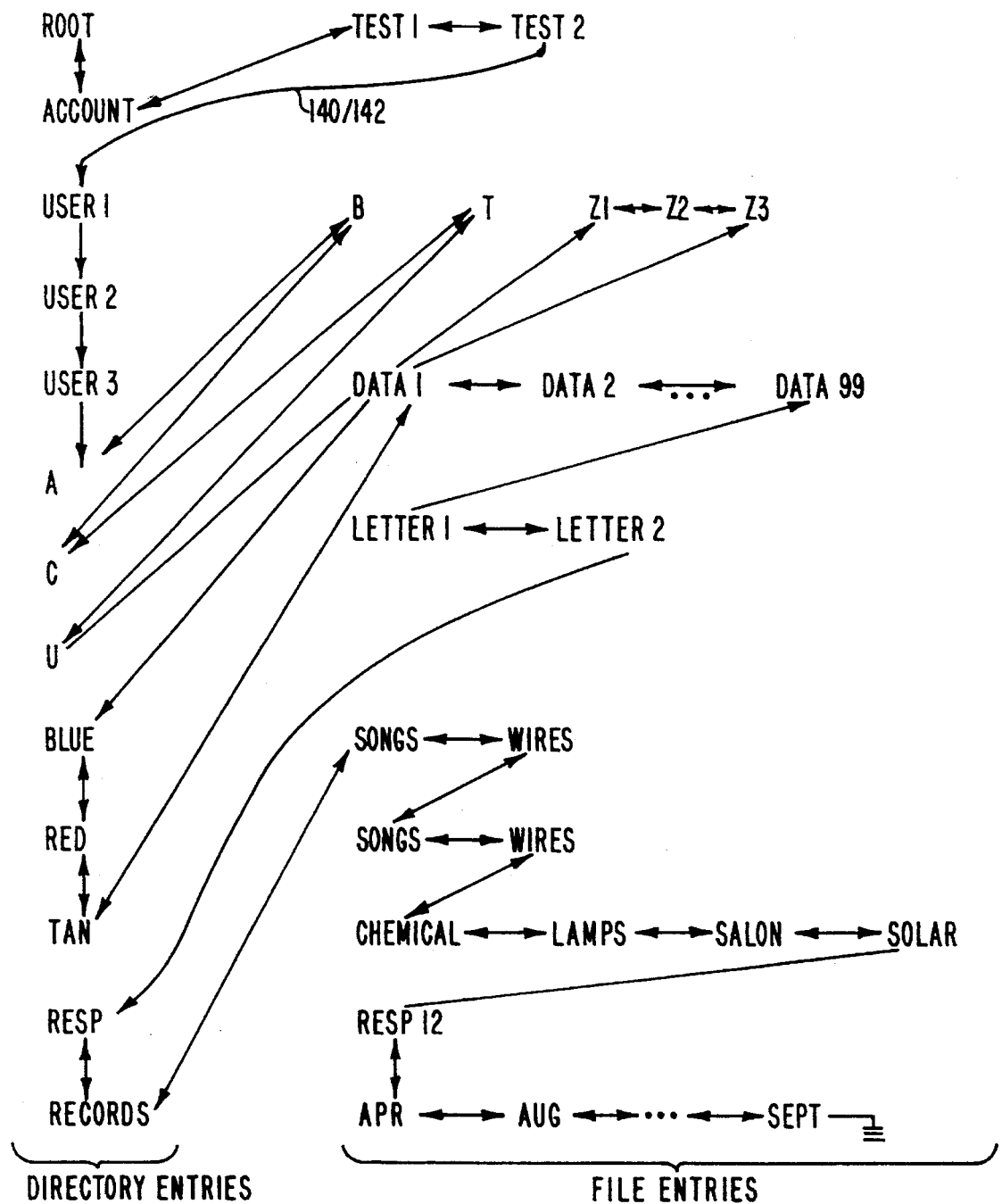
FIG. 7 illustrates a directory build order for the structure of FIG. 5 in the list 108.
Figure 8:
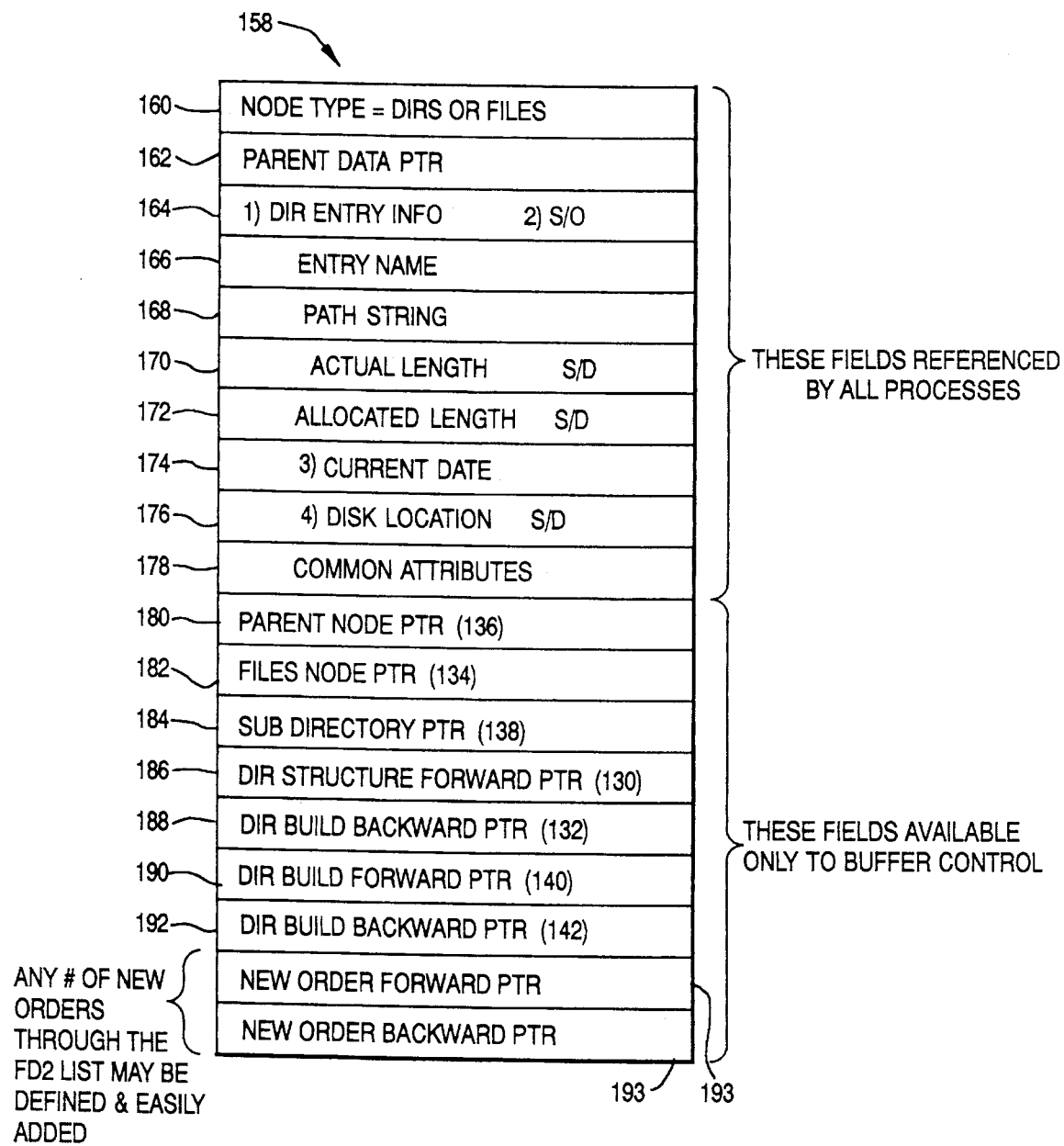
FIG. 8 illustrates the contents of each list node 158.

If the hierarchical directory tree structure of FIG. 5 is encountered and a complete disk copy is specified, the present invention will produce a two dimensional list 108 with pointers as illustrated in FIG. 6 which designed to maintain the hierarchical directory structure of the source and with the pointers of FIG. 7 which are used to maintain directory build order when, for example, a VMS disk is the destination disk 122. Directory build order in VMS is alphabetic within directories, for example, when the present invention advances to a new directory which will be searched and inserted a new alphabetical list will be appended to the current list 108. A person of ordinary skill in the art can produce a routine in a desired target language other than C to insert the nodes in the proper place in the list 108 with appropriate pointers each time a file or directory entry corresponding to the user specification is encountered. Each node of the list 108 (where the nodes are indicated by file names) includes several different pointers associated therewith. These pointers are stored in each file description list node 158 as illustrated in FIG. 8. The hierarchical directory structure of FIG. 6 is maintained by forward 130 and backward 132 directory structure pointers stored in fields 186 and 188 of the node 158. The directory structure is also maintained by a files pointer 134 stored in field 182, a parent pointer 136 for each node 158 stored in field 180, and a subdirectory pointer 138 stored in field 184. To maintain the directory build order, as illustrated in FIG. 7, forward and backward build pointers 140 and 142 are stored in corresponding fields 190 and 192 as illustrated in FIG. 8 These fields 180–192 which are only available to the buffer control routine will be discussed in more detail with respect to FIGS. 37–42. The figure also shows two unused pointer fields 193 which indicate that the present invention can be readily expanded by adding more pointers to allow establishment of any other desired order within the list 108. The list 108 is considered two dimensional because the list is a list of lists, that is there is a list of directories as one dimension and for each directory a list of files which is the second dimension. The list 108 can also be considered to be two dimensional because the hierarchical directory order as one dimension illustrated in FIG. 6, is maintained simultaneously with the directory build order as the other dimension, as illustrated in FIG. 7.

Figure 9:
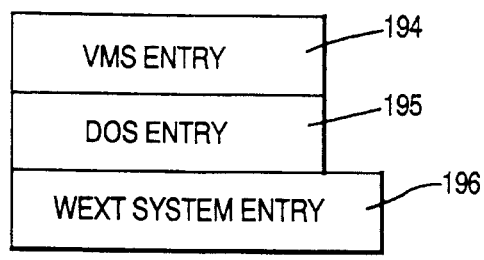
FIGS. 9–10A depict the contents of fields within each node 158.
Figure 9A:
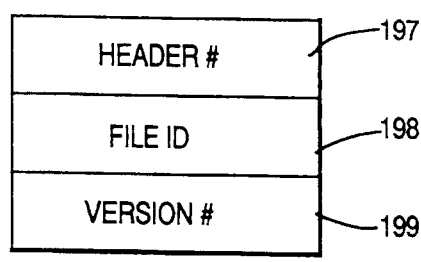
Figure 9B:
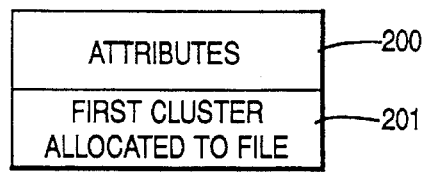
Figure 9C:
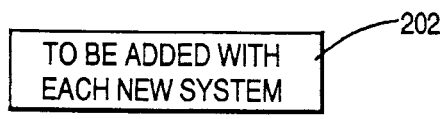
Figure 10:
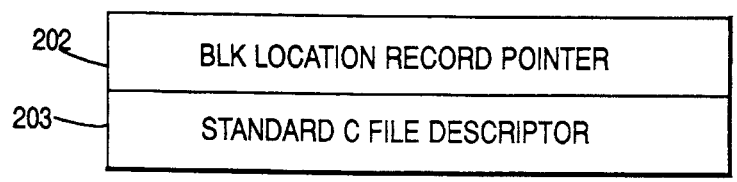
Figure 10A:
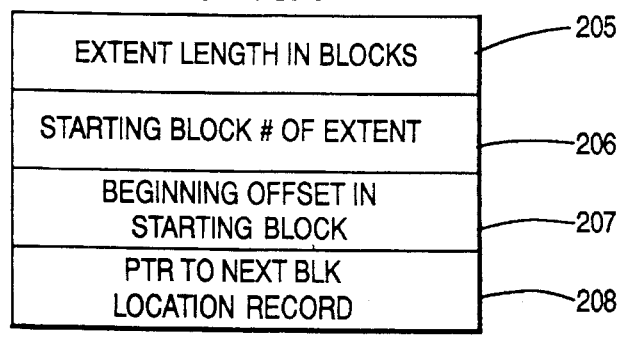

Each node 158 includes a node type field 160 (FIG. 8) which stores the type of node, that is, whether the node is a directory node or a file node. The node 158 also includes a parent data pointer field 162 which is a pointer to the parent directory data which is used for determining in which directory the entry is located with entering the field (parent directory entry) for a DOS directory and entering the back link (parent file—id) field in the VMS header. A directory entry information field 164 follows field 162. The information field 164 is a data structure which includes an entry 194–196 for each operating system with which the present invention is used as illustrated in FIG. 9. The VMS entry 194 includes a header number field 197, a file-id field and a version number field 199 as illustrated in FIG. 9A. The DOS entry 195 includes an attributes field 200 and field 201 used to indicate the first cluster allocated to the file as illustrated in FIG. 9B. FIG. 9C illustrates the contents of the entry 196 for other systems must be added and is system file format specific. The disk location field 176 includes two subfields each as illustrated in FIG. 10. The subfields include a block location record pointer 202 used by block I/O processes and which points to the location of the block location record 204 illustrated in FIG. 10A, and a field 203 which includes a standard C file descriptor for a standard input output command in C which is used when file I/O processes rather than block I/O processes are activated. The contents of the record 204 depends on the type of input-output necessary for the list entry (block or file) and essentially provides an address of the entry on the disk. Since data files are stored generally as contiguous extents on a disk one block location record is needed for each extent. Each extent is defined by the length 205 and the starting block number 206 of the extent, the beginning offset 207 for the file within the starting block and a pointer 208 to the next block location record. The entry name is contained in field 166 of FIG. 8, for example, the entry name for the first directory after the root in FIGS. 5–7 is "account". Field 168 contains the path string necessary to find the entry, for example, the path string for the "letter1" file of FIGS. 5–7 would be "user1.A". Field 170 is the actual length of the file while field 172 stores the allocated length of the file. In this description files and directories are considered files unless distinguished. Field 174 stores the current date which allows those operating systems which record accesses or modifications to files to update this information. The last field 178 accessible by all of the processes is the common attributes field which is a preallocated undefined field which will allow the present invention to be expanded for other uses.

As can be seen each node 158 of the list 108 contains the information necessary to locate the entry on the source disk and maintain the entry in the proper source directory hierarchical structure and destination directory build order.

Figure 11:
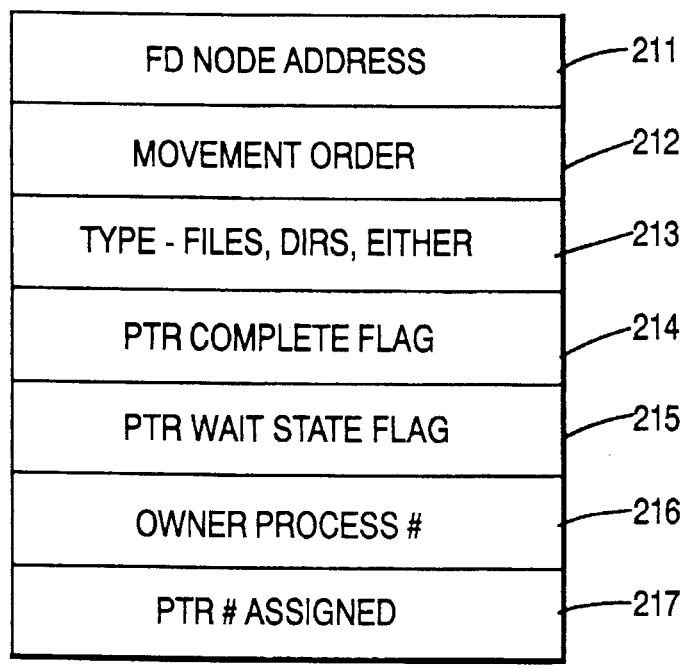
FIG. 11 illustrates the pointer definition for each pointer to each node 158 of the file description list 108.
Figure 13:
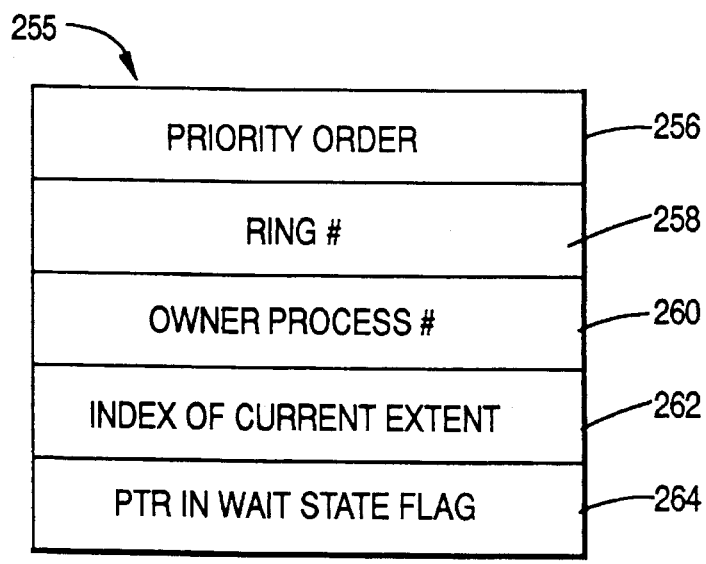
FIG. 13 depicts the definition of a ring pointer.

Returning to FIG. 4 the source file look up process 104 accesses the source disk 106 and obtains the information, which is at least the name of the directory entries, necessary to create a node 158 and calls the buffer control process 102 to obtain a pointer to an available node 158 in the file description list 108 where the information as to the new entry can be stored. The source file look up process 104 then loads the node 158 with the appropriate information. If the entry must be sorted the process 104 looks for the proper insertion point by asking for a new pointer in the list until the proper point is found even if the pointer must traverse the list 108 more than one time. The list pointer is defined as illustrated in FIG. 11 and includes a node address 211, the movement order 212 through the list 108, the node type 213, a complete flag 214 indicating that the pointer has advanced over all nodes and is complete or finished, a wait state flag 215 indicating pointer movement is waiting for another event to occur, the owner process number 216 and the pointer number 217 assigned. The buffer process 102 also initializes the parent data pointer, sets the node type and stores the entry name and the path name in the node. That is, the buffer control process 102 returns a pointer to a node with fields 160, 162, 166 and 168 completed with the rest left empty.

Figure 12:
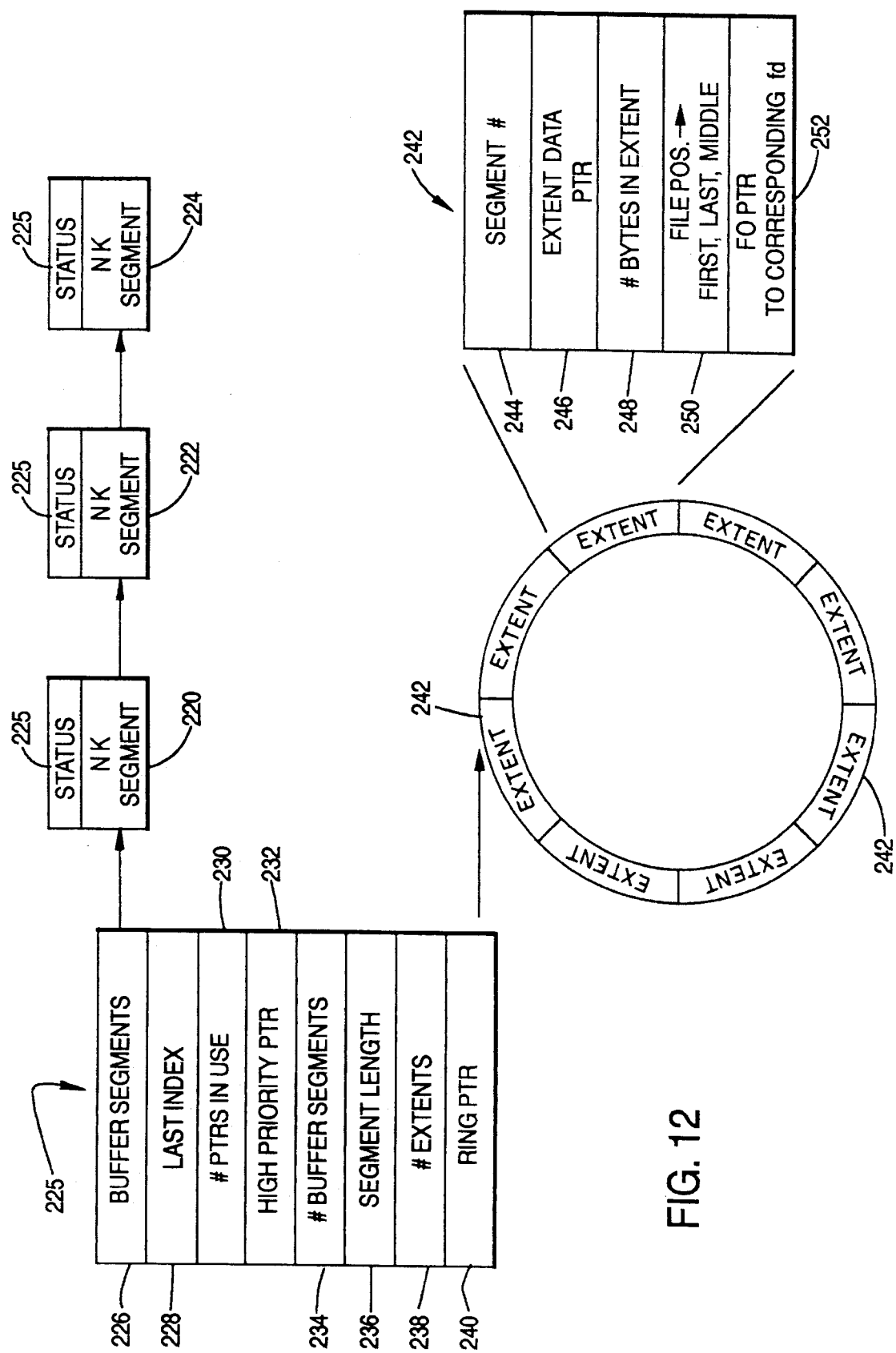
FIG. 12 illustrates the contents of the rings used in the present invention.

Once the source file lookup process 104 has created a file node 158 and advanced past that file node 158, or is in a wait state on the node, the source file read process 110 can advance its pointer to the file node 158 and load the file contents into a source data ring 112. The source file read process pointer advances over the directory entries in list 108. The definition of the source data ring 112 and all other rings which will be discussed with respect to this invention is illustrated in FIG. 12.

The source file read process 110, based on the path string field 168 of the node 158, obtains the contents of the file and stores the data in a variable number of memory segments 220–224 where the process requesting a ring defines the number of memory segment buffers to be used. Each segment includes a status field 225 which indicates whether the segment is being used. The ring definition includes a buffer segment pointer 226 and a last index field 228 that indicates the last index to which a pointer should advance and which is set when the lead pointer in the ring has inserted the file last extent. Field 230 indicates the number of pointers in use for this ring, for example, read, write, directory, directory header, are some of the pointers which can be used. Field 232 indicates the highest priority pointer for this ring. For the source data ring the highest priority pointer is block read or file read. Field 234 indicates the number of buffer segments that have been allocated for this ring while field 236 indicates segment length. Field 238 defines the number of extents in the ring where it is preferred that the extents number ten with the minimum number being one more than the number of pointers for the ring where more extents will increase efficiency. Field 240 is a ring pointer which points to the first extent 242. Each extent 242 is used to define where in the segment the actual data for this extent is located. The extent therefore includes a segment number 242, an extent data pointer 246, the number of bytes 248 in the extent and the position 250 of the extent in the file. The extent also includes a pointer 252 to the corresponding node in the list 108. That is, the field 252 points to the corresponding node in the list 108 for the contents of the field stored in the ring represented by the node. As in the process 104, when the process 110 needs a ring pointer it calls buffer control 102 for the pointer. The first call, which defines a ring, also automatically sets the created pointer to the highest priority for the ring, that is, the pointer for the process which defines the ring receives the highest priority for the defined ring. By allowing the defining process to obtain the highest priority a circular priority problem that could arise because two processes are operating on the same two rings but in reverse order. For example, the block write process fills the ring 294 while the directory build process follow extracting and searching the directories and concurrently the directory build process fills ring 296 and the block write process follows to write out directory contents. Each ring thus includes a ring definition 255 used by buffer control 102 to control pointer movement. The definition 255 includes the priority order 256 of the pointer, the ring number 258 of the pointer, the owner process number 260, the index 262 of the current extent and a wait state flag 264.

Once the source file read process 110 has filled one or more ring segments, if activated, the translate process 114 will translate the text file records into the appropriate format for the destination disk and store same on the destination data ring 116. If the translate process is not activated the destination data ring 116 and the source data ring 112 are the same.

The destination directory create process 118 of FIG. 4 creates the directory for the destination disk 122. System calls, as previously discussed, perform this function for each entry on the list 108. The destination directory create process 118 can advance its pointer (which jumps over files and only points to directory entries) when the directory entries have been completed in the list 108. The destination directory process 118 first checks to see if the entry in the list 108 exists on the destination disk. This is performed by a system file call such as previously discussed. If the entry does not exist on the disk another system file call is made to create the entry on the disk. If the entry does exist no operation is required. Once the entry on the disk is created the destination file write process 120 can advance its pointer in the list

108 to the files for the directory entries created by process 118 and store the files on the destination disk 122. The destination write process opens the file on the destination disk when the first extent is encountered, obtains data in the first through last extents, stores the data on the destination disk and then closes the file when the last extent is encountered.

FIG. 14 illustrates the data flow and associated processes for performing a block I/O—block I/O transfer. At the beginning of execution the source block read process 274 obtains the root directory and loads it into the source directory ring 275. The root directory logical block location can be found in the header number four (where the location of header four can be determined from the home block) on VMS and in the BIOS parameter block on DOS. For VMS, the start of the headers is obtained from the home block. The root directory header is always number four. This header is read in and contains the block location of the root directory. The block read process 274 also loads the root directory header into the source location window 276.

The source location window 276 acts very similar to the paging system in a virtual memory system and provides a way of accessing index data that is conceptually contiguous when there is not sufficient memory to store the data contiguously. One of ordinary skill in the art of paging systems will readily recognize how to create such windows. Within the source location window 276 five possible views are shown which are essentially snapshots of sections of the headers or indexes of the disk 270. Five views are shown to illustrate the operations with respect to windows that can be occurring simultaneously and a different number of views is possible. The definition of the location window buffer 276 is illustrated in FIG. 15. This figure only shows two views, however, more are possible. The window definition 330 includes an index size 332 and index type 334, a view length 336 in bytes, the status of the window 338, a write enable flag 340, an owner process number 342, the number of views 344 provided by the window and a pointer 346 to the views. Each view includes an index start 348 and an index end 350. The view also indicates when this view was last referenced 352, whether the view has been modified 356 and a modification count 356. The view also indicates the status 360 of the view and provides a bit map 362 of the blocks within the view that have been modified. These modification fields are only modified if the window (whether it is the index window, bit map window or header bit map window) is write enabled. The view definition also includes a pointer 364 to the actual data in the memory. For the source location window 276 the view is a view of the index file on the source disk 270 which contains the location information for locating files (in VMS this would be the file of headers, in UNIX the I-nodes and in DOS the file allocation table). During operation when a process, for example source locate 278, asks for a header (that is, an index representing a VMS header or a file allocation table word), buffer control 102 looks through the views to see if the header is found by examining the start and end fields. If a view is found with the index therein, buffer control 102 returns a pointer to the index by calculating the offset position of the index in the buffer 366 from the index size 332 and the difference between the index start 348 and the index or header number desired. If the header is not in a view, buffer control returns a wait state. Block read later obtains a view of headers starting with the missing index from the header or index file on the disk and loads it into the least recently used write enabled view by examining the fields 352 and 354 of each view.

As previously mentioned the source block read process 274, shown in FIG. 14, obtains the root directory and loads the root directory in the source directory ring 275. This is the beginning of a bootstrap type operation that obtains the location of reads in the files. The source directory search process 280, once the root directory is in ring 275, interprets the contents of the root directory and creates appropriate entries in the file description list 108 in the same manner as the file look up process 104 which includes searching the list 108 for the appropriate insertion point. Once the root directory entries are created in the list 108, the source block read process 274 peeks ahead and loads the source location windows 276 with the appropriate portions of the index file which will allow buffer control 102 for the source location process 278 to locate the files in the root directory on the disk 270. Once the initial window views are loaded the source block read process 274 continues to peek ahead in the list 108 to determine what portions of the index file the source location process will need next. The peek ahead operation will be discussed in more detail with respect to FIG. 24. The source block read process 274 then loads empty views with the index information which will be needed. The source location process 278 completes the block location record pointer 200 (FIG. 10) in each node of the list which points to a series of records singularly linked that contain the information for each disk extent of a file and this completes the list 108 as to the location of the files corresponding to the entries. This allows the source block read process 274 to begin moving through the list 108 obtaining directory files and loading them onto the source directory ring 275, and obtaining data files and loading them in the source data ring 112. The process of creating directory node entries and file node entries in the list 108 continues with the read process 274 loading the contents of subdirectory entries in the root directory into the source directory ring 275, the search process scanning the ring 275 and creating the node entries in the list 108, with the source location process 278 obtaining and completing the location information for the entries and the source block read process 274 reading the information in to the rings 112 and 275.

As the list 108 gets filled and the pointers associated with the input processes move past the entries on the list 108, indicating that the data and directory files have been stored on the rings 112 and 275, the system can allow the translate 114 and output processes to begin traversing the list 108 to load the directory and data files onto the destination disk 304. As previously discussed, if the translate process 114 has been activated, the text data from the source data ring 112 is reformatted and stored on the destination data ring 116.

The destination block write process 300 has two functions. First, it stores data files, directory files and headers on the destination disk 304. Second it reads in any directories and headers (indexes) that already exist on the destination disk 304, along with the allocation control list and header control list for the destination disk 304. This allows the files and directories on the list 108 to be merged with the files and directories on the destination disk 304. The destination directory build process 282 compares the list 108 with the contents of the directory in-ring 294, which stores directories on the destination disk 304, and creates merged or new directory entries and stores the merged and new entries on the destination directory out ring 296. The destination location process 290, when headers not in memory are needed, enters a wait state and block write 300 obtains the headers from the destination disk 304 and then process 290 determines the physical location of the files on the disk 304. If a directory entry does not exist on the disk 304, the destination directory build process 282 creates the directory, otherwise it adds to the existing directory. The header build process 286 creates the headers or indexes for the directory and data files and stores them in the destination location window 290. The destination block write process 300 stores or writes out the contents of the destination directory out ring 296 and the destination data ring 116 to the destination disk 304. Block write 300 being the higher priority process allocates space for the files on the rings 296 and 116 by calling a file system specific routine to allocate clusters (groups of blocks) to the file. The directory build process 282 allocates the headers, updating the header control list window as the header number is needed for the directory entry. The header build process 286, if necessary, later follows and stores the allocation information in the header. The header build process 286 is not required for a DOS destination disk since the location and allocation information are combined in the file allocation table. The block write process 300 writes views of the windows 290, 292 and 298 onto the disk 304 at appropriate stages of execution.

Figure 16A:
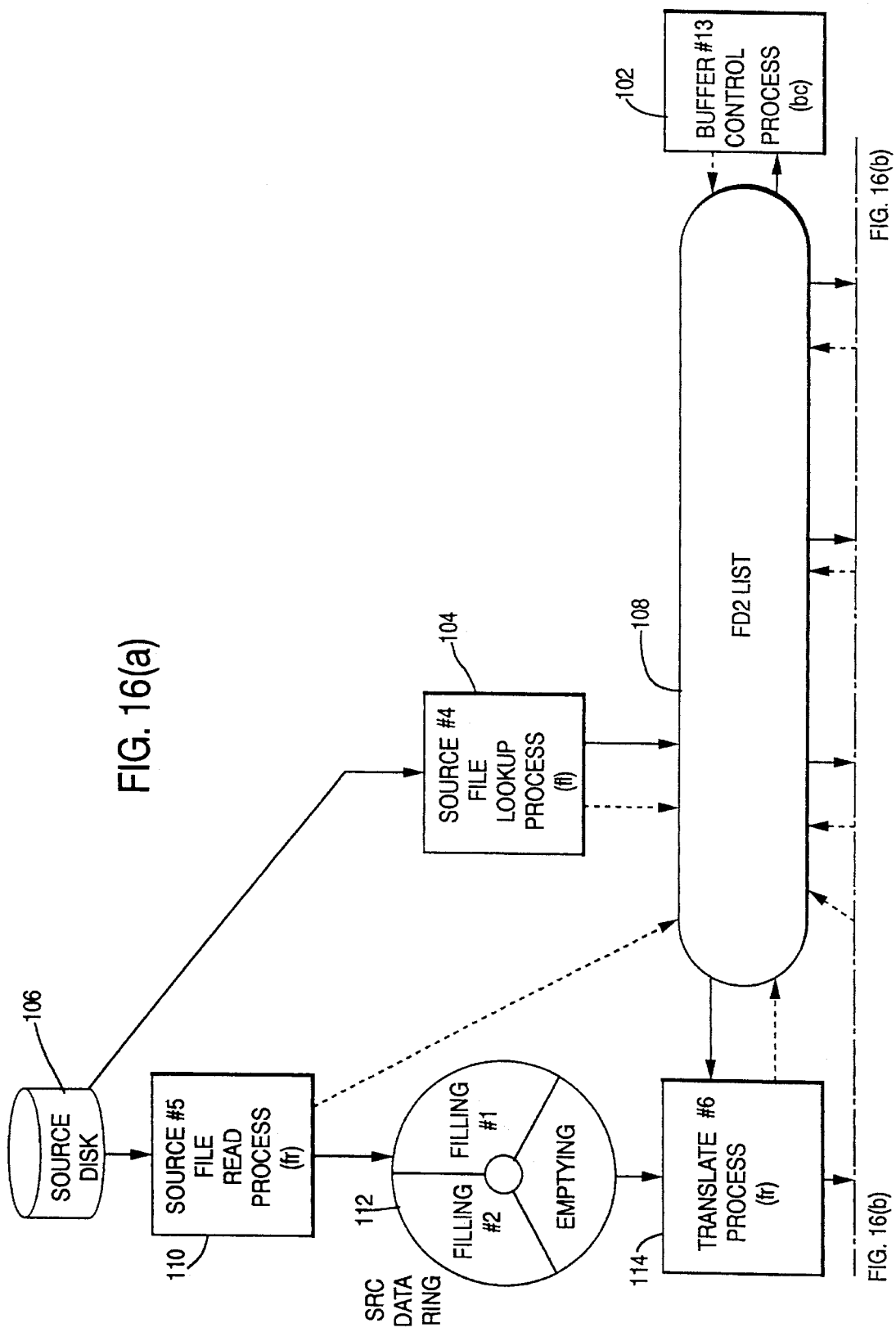
FIGS. 16 and 17 depict data flow and process execution for combinations of file I/O and block I/O transfers.
Figure 17:
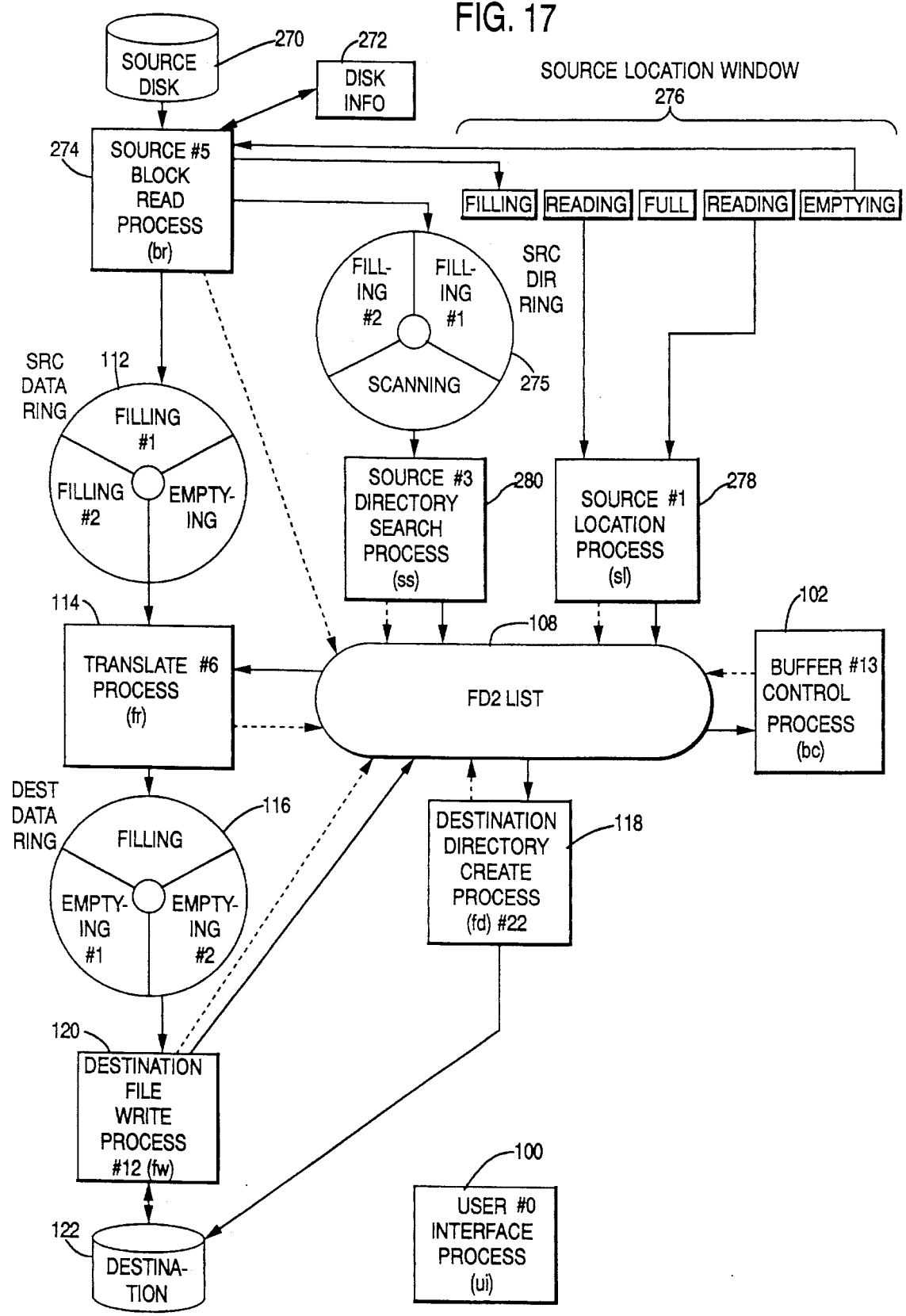

FIGS. 16 and 17 illustrate combinations of the block I/O and file I/O transfers where the processes as discussed before are appropriately activated and executed.

Figure 18:
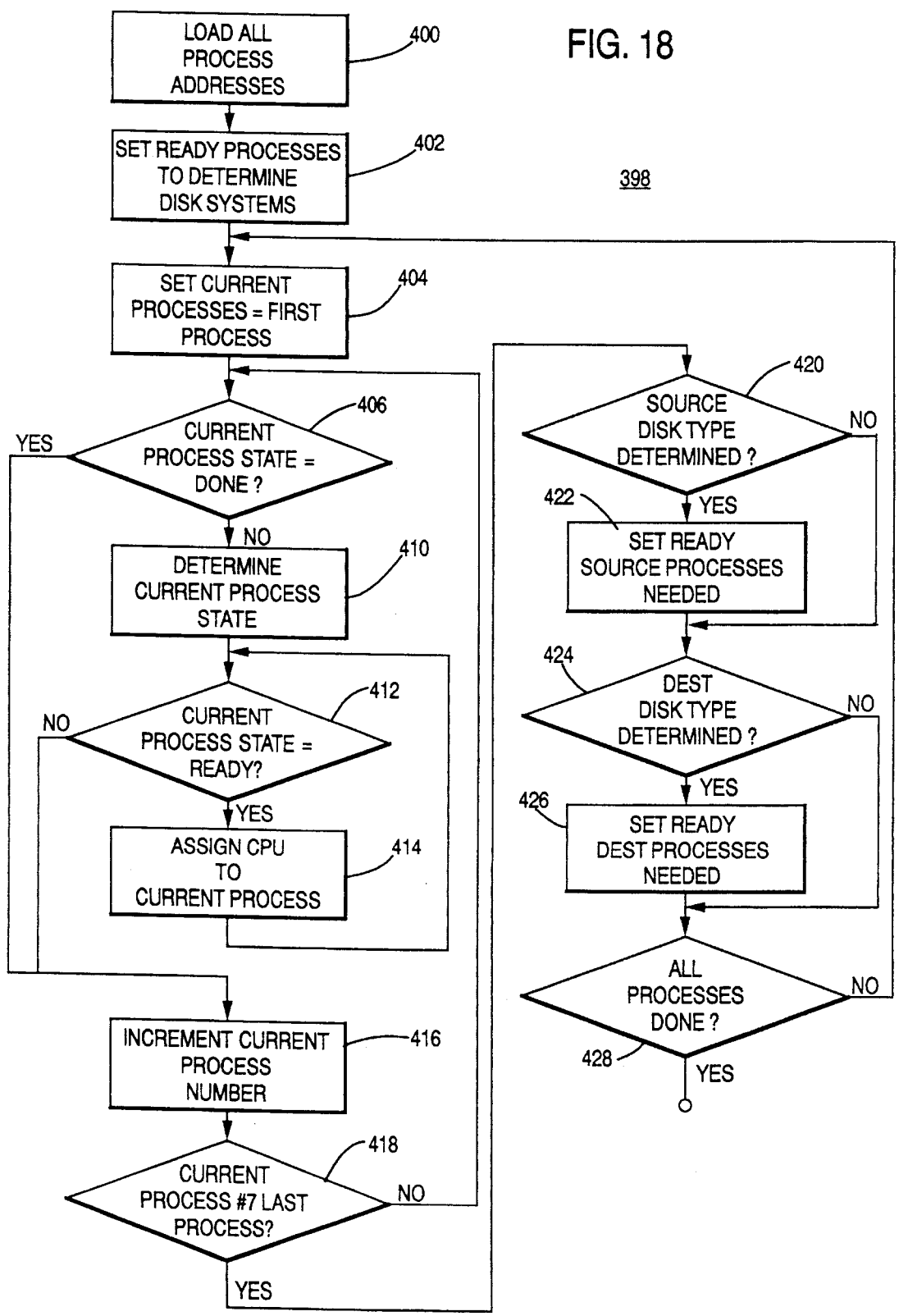
FIG. 18 is a flowchart of the process control routine 398 that controls process execution order.

The execution sequence of the processes within the present invention is controlled by a process control process or routine 398 illustrated in FIG. 18. This routine 398 is basically a loop which activates or calls a process allowing the process to run until it reaches a wait or completed state and then moves to the next process. When the end of the process list is reached, the routine starts again at the beginning of the processes and continues scanning until all processes are done. The first step is to load 400 the addresses of the processes. The process addresses are stored in an array or process control list in the order of execution and with one element for each process. The array also includes a status indicator for each process where the state or status can be ready, waiting for data, waiting for I/O and waiting for room. The array also includes a step number which allows a waiting process to begin at the point where the process stopped due to the creation of a waiting event such as an empty or full data ring. This acts like a variable entry point for a subroutine. The order in which the processes are executed is indicated by the process numbers in FIGS. 4, 14, 16 and 17, for example, the source directory search process 280 has process number 3 indicating it is fourth in the execution sequence and fourth in the process control array because process number start with zero. The process number is also the priority of the pointers for the process with a higher number being a higher priority and as can be seen from the process numbers the write processes have higher priority pointers.

In step 402 the system sets as ready those processes which are necessary to determine the file type of the source and destination disks. The processes set to ready at this initial stage are buffer control 102, block read 274, block write 300 and user interface 100. If the simpler version in which the user is asked the file format is implemented, this would set only the user interface process to ready. Because these processes are the only processes set as ready, during the first pass through the loop of the process control routine 398 only these initial processes are executed. During later processes the appropriate processes based on disk type will be activated. For example, if the source disk is determined to be a native disk and accessed through the host file system then the file read and look up processes 110 and 104 are set as ready and if the destination disk is a foreign disk then the processes 282, 284, 286 and 300 are activated.

In step 404 the current process is set to the first process and in the first pass through the loop this would be the user interface process 100. Next a determination 406 is made as to whether the current process is in a done state, if not the state of the current process is determined 410. As previously mentioned this is determined by accessing the process control array. If the current process is ready 412, the CPU of the computer 30 is assigned 414 to the current process. If not the process number is incremented 416 and a test 418 is performed 418 to determine if the current process number is greater than the last process number. If not, the looping process for activating the processes continues. If the current process number is greater than the last process (in the present situation the highest numbered process is process 13), a determination 420 is made as to whether the source disk type has been determined. Once the source disk type is determined the processes needed to read the source disk are activated 422. Next a test is performed to determine whether the destination disk type has been determined and, if so, the needed destination processes are activated 426. If all processes are not done 428 the current process number is set 404 to the first process and the process execution control loop continues. If all the processes are done a complete transfer from the source disk to the destination disk has been accomplished.

Figure 19:
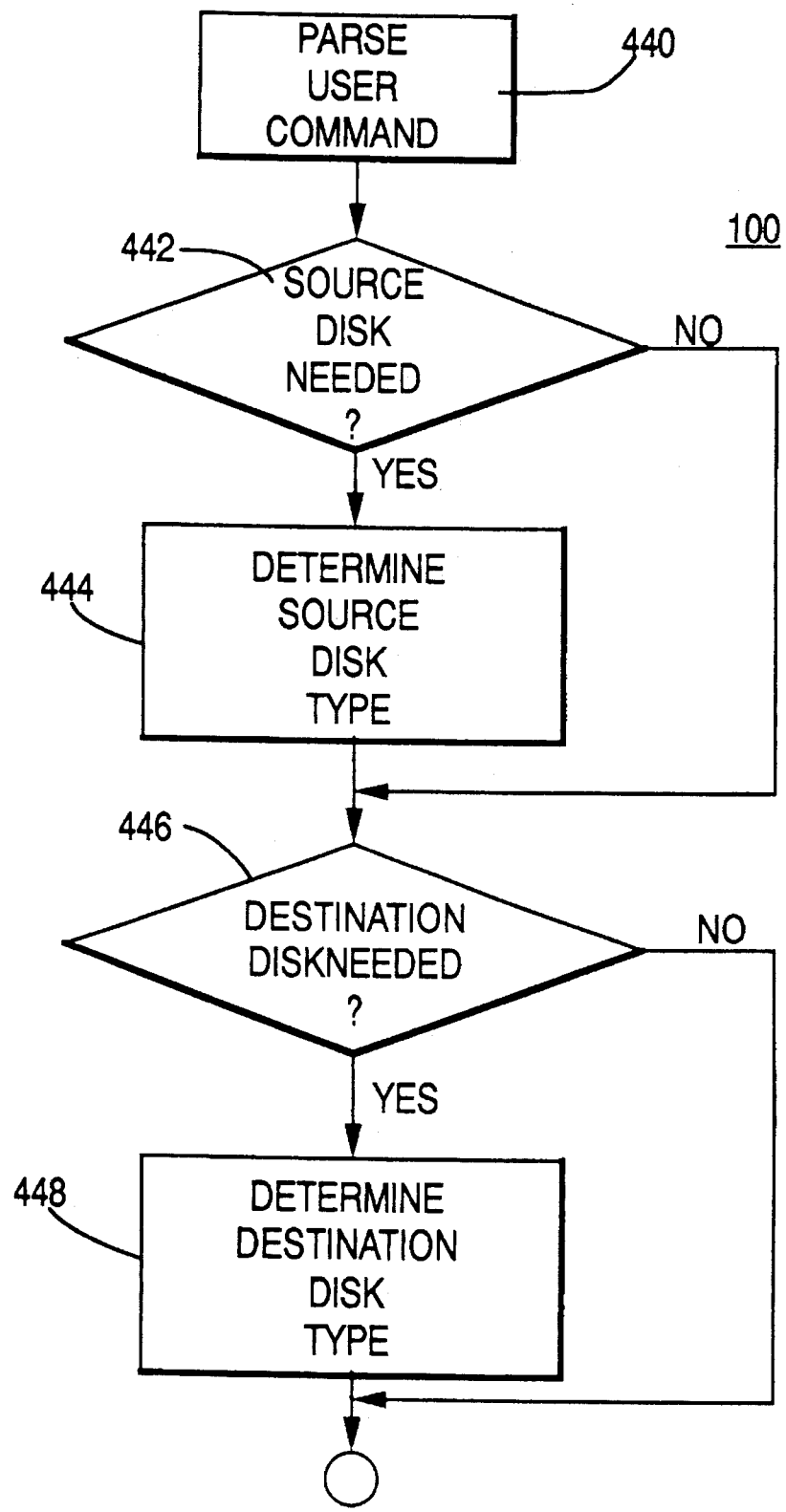
FIG. 19 depicts the user interface process 100.

The user interface process 100 illustrated in FIG. 19 starts by parsing 440 the user command. This parsing process is a conventional parsing process and identifies the source and destination disk devices and the files to be accessed. Once the command is parsed, a test is performed 442 to determine if a source disk is needed. For example, if the source disk and the destination disk devices are different in the COPY command, for example "A:" and "E:" then a source disk is needed If the command is TYPE or DIR a source disk is also needed while if the command is DELETE or MKDIR (make a directory, etc.) a destination disk is needed. If a source disk is needed the source disk type 444 is determined as previously discussed. The same steps are performed for the destination disk if it is needed. At this point, if the simpler version is being implemented the user would be asked to specify the destination and source disk file types. The determination of source and destination disk types is performed by executing the block read 274, block write 300, process control 398, buffer control 102 and user interface 100 processes. That is, the process control routine 398 activates or calls the user interface process 100. The user interface process 100 reaches step 444 and tries to determine the source disk type and is incapable of doing so because the appropriate information has not been read in from the disk. The use interface process 100 thus enters a wait state and transfers control back to the process control routine 398 of FIG. 18 which will eventually transfer control to the block read process 274. The block read 274 reads in the information necessary to determine the disk type and control is transferred back to the user interface process 100 through the process control routine 398 cycling back to the routine 100. When once again activated, the user interface process 100 then determines source disk type. As can be seen because of the interrelationship of the processes several loops through the process control routine 398 are performed before the processes appropriate to the source and destination disk types can be set as ready or activated. When sufficient information is provided the user interface process 100 initializes the operation description data structure 60 illustrated in FIG. 3 from the parsed command and disk types.

Figure 20:
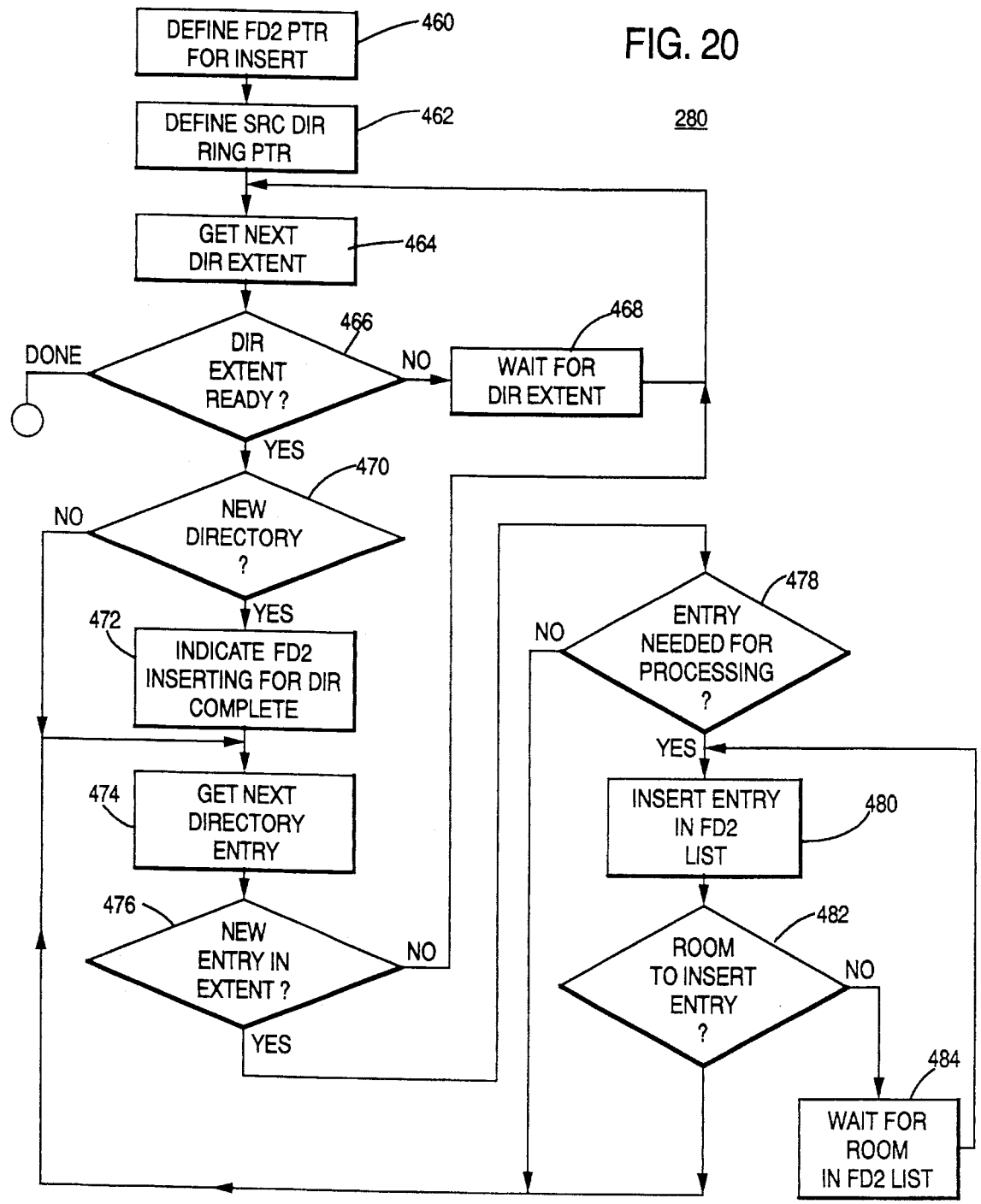
FIG. 20 is a flowchart of the source directory search process 280.

The source search process 280 illustrated in FIG. 20 starts by defining 460 an insert pointer for the file description two dimensional list 108. The pointer definition operation involves a call to buffer control 102 which will return an integer value which designates a pointer in the list pointer array that the source search process 280 will use for inserting. The pointer for the list 108 is a variable movement pointer as opposed to a directory build movement order pointer or a directory structure pointer. The pointer is allowed variable movement, does not follow any other pointer and moves freely through list 108 because it will need to insert entries into the list 108 at various locations throughout the list. Next the process 280 defines 462 a source directory ring 275 pointer. This also involves calling the buffer control process 102 to obtain an integer indicating which definition in the ring pointer array should be used. The search process 280 then beings processing by getting 464 the next directory extent. This involves requesting that buffer control 102 provide the next directory extent and in the first pass through this loop would be the first extent for the root directory if the root directory is larger than one extent. If the directory extent is not available 466 the process 280 enters a wait state 468 waiting for the directory extent to be provided. This wait state is actually a transfer back to process control prior to a step number update. During the wait state 468 process control activates other processes and eventually the extent becomes ready. If the process has reached the end of all directory extents the process state is flagged as done. When the directory extent is available buffer control 102 returns information which defines the extent, the length, the segment number and a pointer to the beginning of the data of the extent. That is, buffer control returns a pointer to the definition of an extent record which will point to the actual extent data. Next, the extent is examined to determine 470 whether a new directory has been encountered by using a hand shaking process with buffer control 102. If so, the process indicates 472 that the process for inserting the directory is complete. This handshaking process with buffer control 102 tells buffer control 120 that the following pointers may now advance to the entries for the directory because any sort processing is now complete. The next directory entry is then obtained 474 which is a call to a file system specific routine based on source disk type. This routine is given the address of a directory buffer and an offset into the buffer, updates the offset to the next entry, returns a wait state if no more entries are available in the buffer and returns done if the next entry indicates the end of the directory. If this is not a new entry in the extent, then the next extent is obtained 464. If it is a new entry in the extent, a determination is made 478 as to whether the entry is needed for processing. The entry is needed for processing when the entry matches the user specification and the entry is a file or when the user has requested processing of the entire directory tree and the entry is for a subdirectory. When needed for processing the entry is inserted 480 into list 108 in alphabetical order if sorting is required. This is performed by a call to the buffer control process 102. Buffer control 102, when sorting is not required, may return an indicator indicating that there is no room in the list 108 for the latest insert and the process 280 waits 484 for space on the list 108 to become available. However, when sorting is required, because the entire list 108 must fit into memory at the same time, and there is no room, an error condition exists and the user must be asked to specify a smaller set of files. Once again, as in all other waits that occur in this invention, this involves transfer to the process control routine 100 to allow other processes to execute after a step number is stored. Once the entry has been inserted control returns to step 470 in the same manner as other wait returns by using the stored step number.

Figure 21:
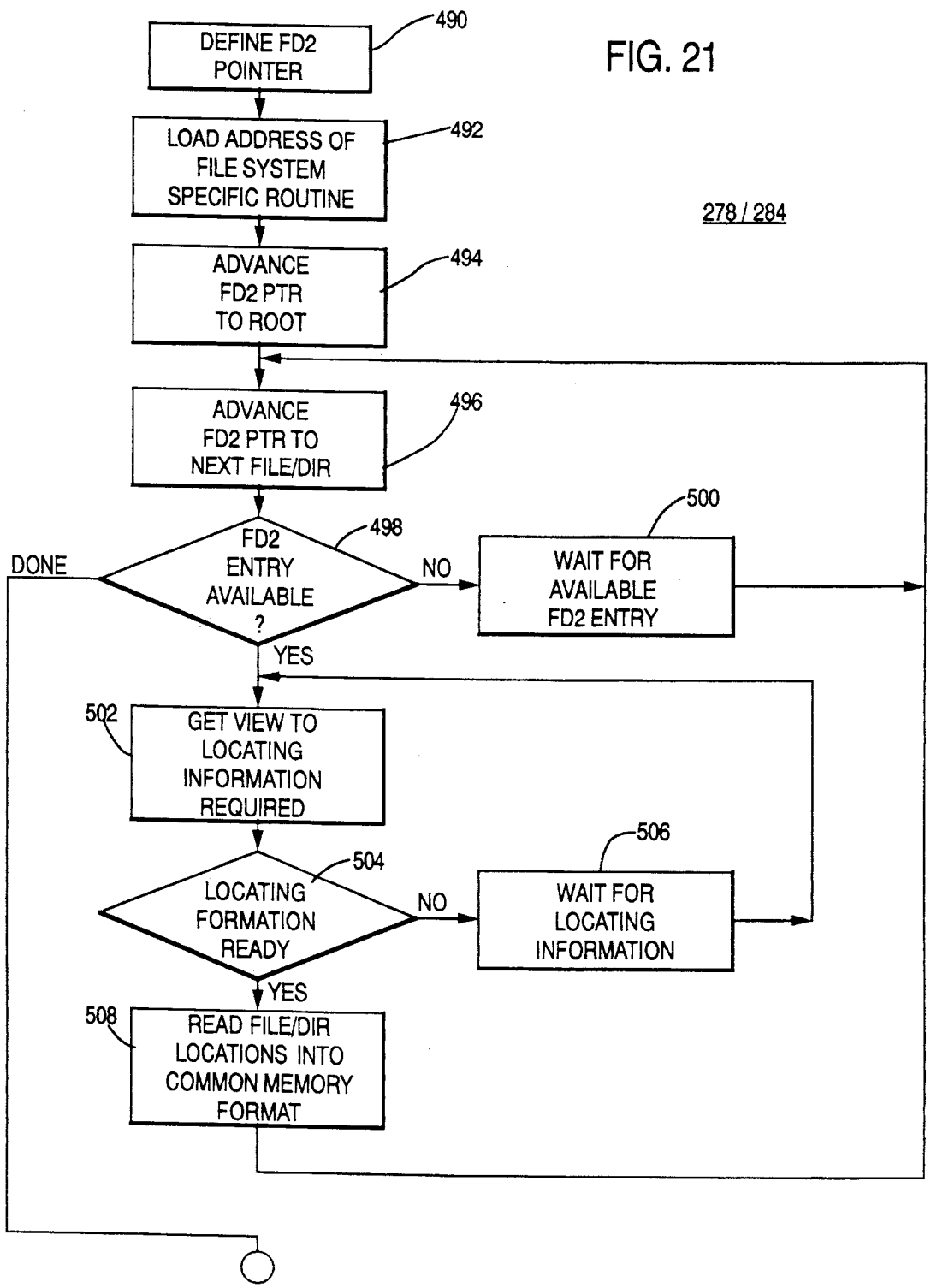
FIG. 21 is a flowchart of both the source location process 278 and the destination location process 284.

The source location process 278 and the destination location process 284 are both illustrated in FIG. 21. This process 278/284 starts out by defining 490 a pointer in the list 108 which is once again a call to buffer control 102 requesting an integer of the node 158 to be processed next. The pointer for this process moves through the list 108 in directory build order. When the source location pointer moves through list 108 it will stop on both files and directories because each type must be found on the source disk, however, when the destination location pointer moves it skips over file nodes in list 108 and stops only on directories because only directories must be read from the destination disk. The routine then loads 492 the address of a file system specific routine which will locate the target entry on the source or destination disk. Then the file description pointer is advanced 494 to the root within the list 108. This is a call to buffer control 102. The process of FIG. 21 then enters the main loop which continues performing the locating operation until a wait state occurs or the routine is done. The first step in the loop is to advance 496 the list pointer for list 108 to the next file or directory. This request causes buffer control to get an integer pointer number and return the state (ready, awaiting data, done). If the returned state is "ready" buffer control 102 also returns the address of (a pointer to) the next list entry. (If a ring is involved the address of the next ring extent is returned.)

The source location pointer advances over (stops on) both directories and files and is the first ordered (nonvariable movement) pointer through list 108. The destination location pointer advances over directories and follows the directory build pointer that inserts list entries in the destination directory ring. It is required that the destination location pointer follow the directory build pointer because directory build gets information from the destination directory that has the information needed to get location information. The source location pointer is followed by the block read pointer and the block ready pointer. The destination location pointer is followed by the block write pointer.

If the entry is not available 498, the process waits 500 for an available entry in list 108. If the entry is available the process obtains the view for the locating information required from the appropriate portion of window 290. This is a call to buffer control 102 requesting information from the appropriate window section using the VMS header number to identify the portion of the index file needed or the cluster number in DOS indicating the word in the file allocation table. Once again buffer control 102 returns to a pointer or an indication that the locating information is not ready. If the locating information is not ready the process enters a wait state 506 waiting for the locating information. Once this process 278/284 is called again by process control 398, a step number which was stored prior to the wait state 506 is used to move immediately to step 502. When the location information is ready the file or directory location information is read 508 into the common memory format and stored in the list 100 using the list pointer previously provided by integer designation.

Figure 22:
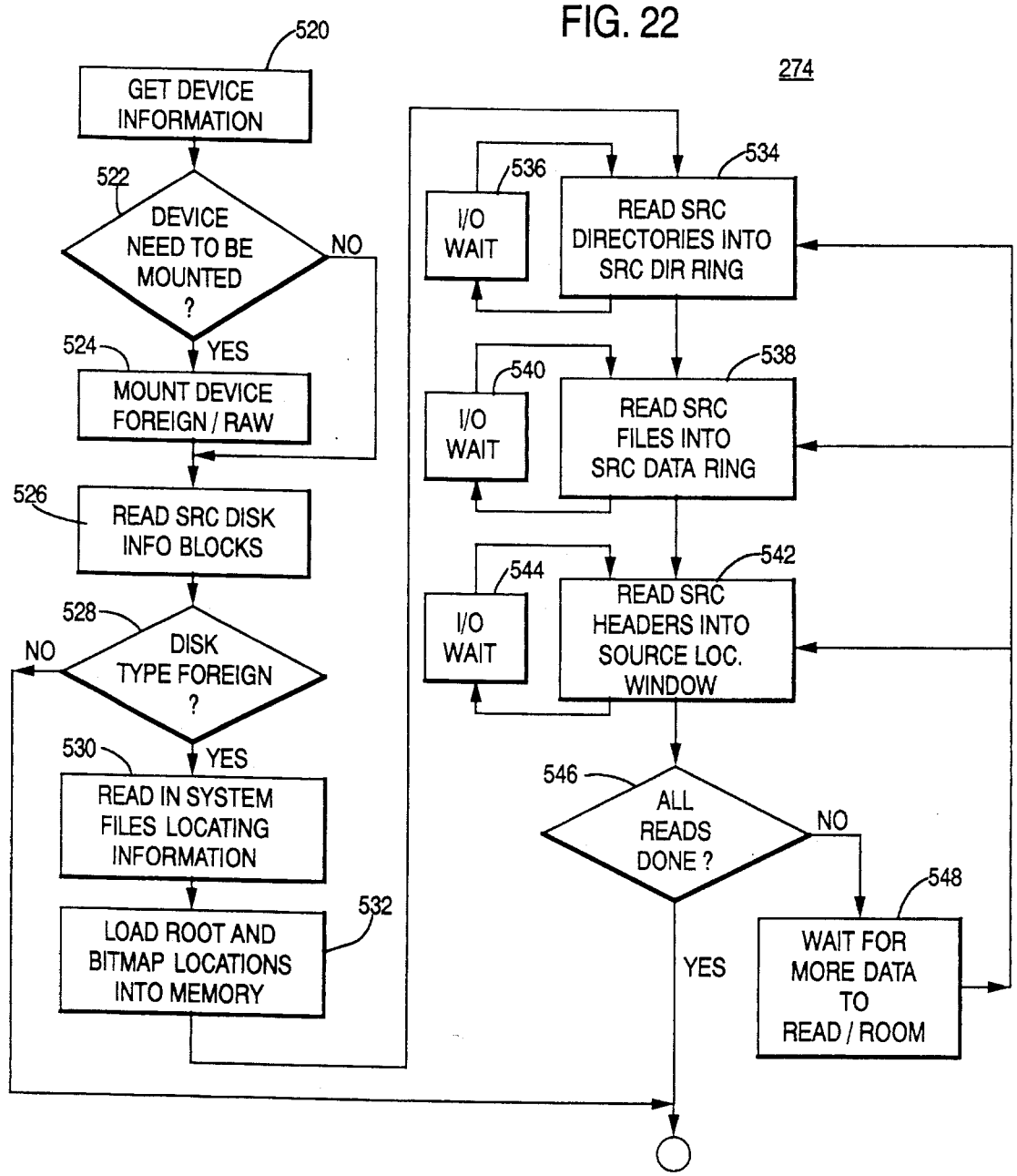
FIG. 22 depicts the block read process 274.

The block read process 274, as illustrated in FIG. 22, starts by obtaining 520 the device information, that is, a check is made to see if the devices specified by the user specification are random access and whether they are disk devices. This step and the next three steps are executed the first time this process is activated and a return of done occurs unless the disk type is foreign. Next the user is asked whether the disk needs to be mounted, if so the device is mounted, if not the process stops. Next the information blocks of the source disk which are needed to determine the source disk type are read 526. At this point a determination 528 is made as to whether the disk type is foreign. If the disk type is not foreign then the block read process 274 need not be executed again and is exited indicating that is process is done. If the disk type is foreign the file system locating information is read 530. This is the first 1024 bytes of the disk used to determine the disk type (the VMS home block or the DOS Bios Parameters Block). The DOS Bios Parameters block is used to determine the location of the file allocation table and the root directory. The VMS home block is used to get the first header which specifies the location of the headers file and the fourth header in the file identifies the location of the root directory. Next the root and bit map are loaded 532 which the source location process uses to determine the location of entries. When the block read process 274 is called later, the process enters a loop which is executed for as long as possible and necessary during which the directories and files and headers are loaded.

During the first block of the loop the source directories in list 108 are read 534 and stored on the source directory ring 275 as will be explained in greater detail with respect to FIG. 23. If during this process the end of the list of directories on the list 108 is encountered, the process moves to the next step or waits for room. However, if an I/O wait is encountered it waits 536 in the current step and returns to process control 398. Next the process reads 538, as will be discussed with respect to FIG. 23, as many source files listed on list 108 as possible into the source file data ring 112 until an I/O wait state is encountered or it moves to the next step because of a wait for room. And the process 274 then reads 542 the indexes of files and directories on list 108 into the source location window 272 until an I/O wait 444 is necessary or a move to the next step is needed because more room in the window is necessary. The read of headers (indexes) will be discussed in more detail with respect to FIG. 24. If all the reads are not done, that is, if the end of the list 108 has not been reached then the process waits 548 for more data to read or more room in the list 108. The return from this wait state returns to the steps within 534, 538 and 542 which were previously being executed using the step number stored before control is transferred to process control 398. When all file reads have been completed this process has reached the end of the files specified in the user specification and the state is set as done.

Figure 23:
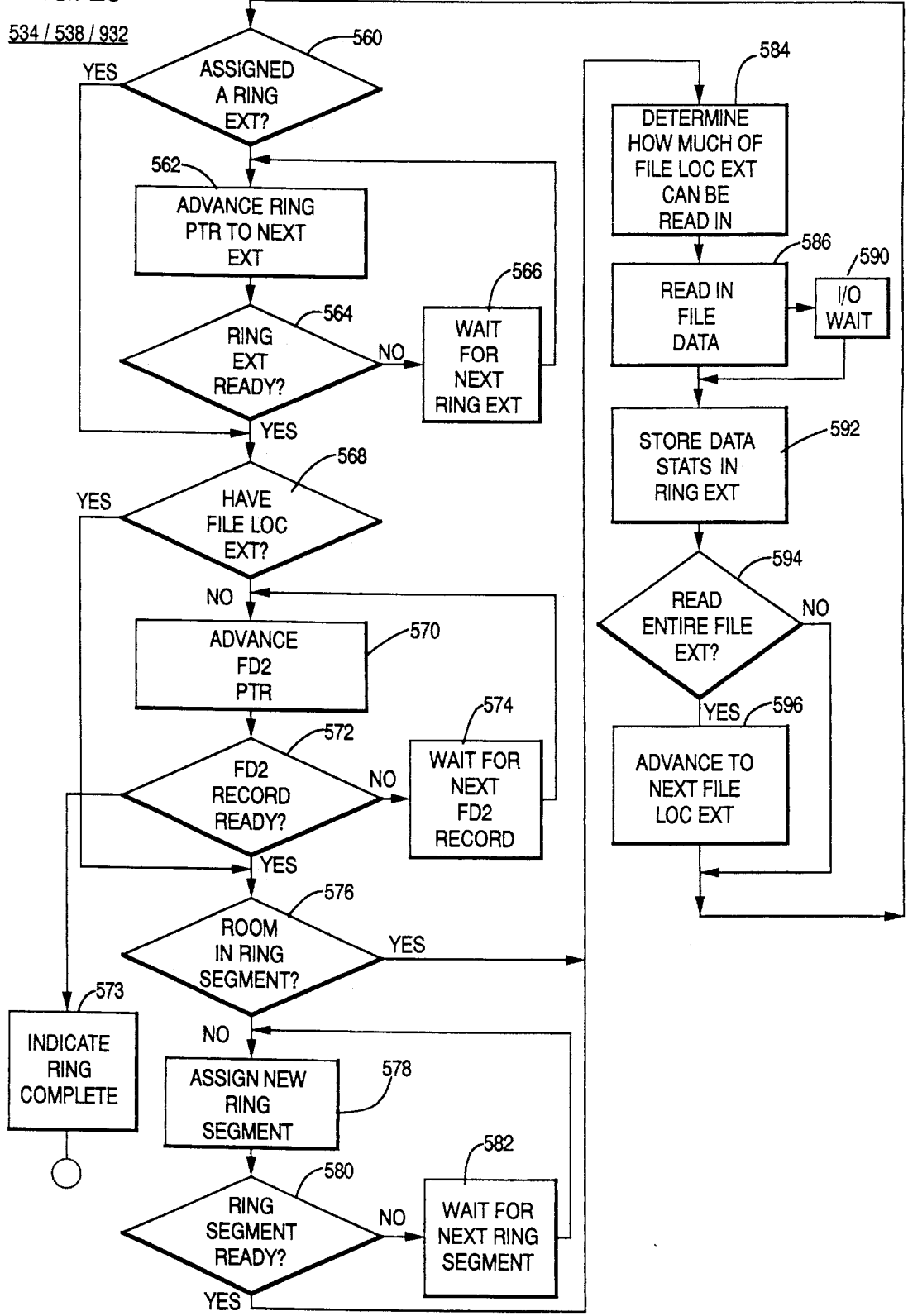
FIG. 23 describes the reading of directories and files in blocks 534 and 538 of FIG. 22.

The block read of directories 534 and block reads of files 538 into the appropriate rings is performed by the same process which is illustrated in FIG. 23. This process is also executed by the block write process 300 when destination disk 304 directories need to be read into the ring 294. This process keeps up with whether source directories or files or destination directories are needed through using the corresponding pointers in the local process array. The index in this array is determined by the current step. This process advances to the next list 108 entry and then for as long as there are block location extents to be read reads them into memory. When the last block location extent has been read, it advances to the next entry in the list 108. The first step by the process 274 is to determine 560 whether a ring extent has been assigned in the appropriate ring 112 or 275. If not, the ring pointer is advanced 562 to the next extent which is a call to buffer control requesting an appropriate pointer essentially to an available extent. The read file ring pointers are the first pointers through the ring and are followed by the process pointers used to extract data from the ring. For the source directory ring it is the source search pointer, for the source data ring it is the translate pointer otherwise the block write pointer and for the destination directory ring the next pointer is for the directory build process. The first pointer must also not get ahead of the last pointer which is the buffer control pointer. If the ring extent is not ready 564 a wait 566 occurs. Next a determination 568 is made as to whether a file location extent is available by examining the fields of the block location record 203 of FIG. 10. If not, the file description pointer is advanced 570 by making another call to buffer control 102. Once again this call returns the number of the pointer or an indication as to whether the pointer can be advanced. Next the process determines 576 whether there is room in the corresponding ring segment for the file or directory as appropriate by comparing the extent length 204 with segment length 236. If not a new ring segment is assigned 578 by again making a call to buffer control 102. Buffer control 102 looks for the first free segment using the status field 225 and assigns the free segment otherwise a not available indication is returned and a wait occurs at this stage. The process then determines 584 how much of the file block location extent can be read in by comparing extent length 204 with segment length 236 and reads 586 the appropriate portions of the data with a wait 590 as appropriate. The read in step 586 is what is conventionally called an absolute read which will be explained in more detail with respect to FIG. 49. Once the data is read in and stored 592 in the appropriate extent of the appropriate ring, the statistics for the segment are updated. This update involves subtracting from the total space available in the segment of the ring the amount of data newly stored in the ring. If the entire block extent has been read in 594, which is determined by checking field 250, the process advances to the next file block location extent by following the pointer 210 to the next block location record 203 of FIG. 10 where each block location record 203 represents one extent. Then the process loops back to continue reading in the data.

Figure 24:
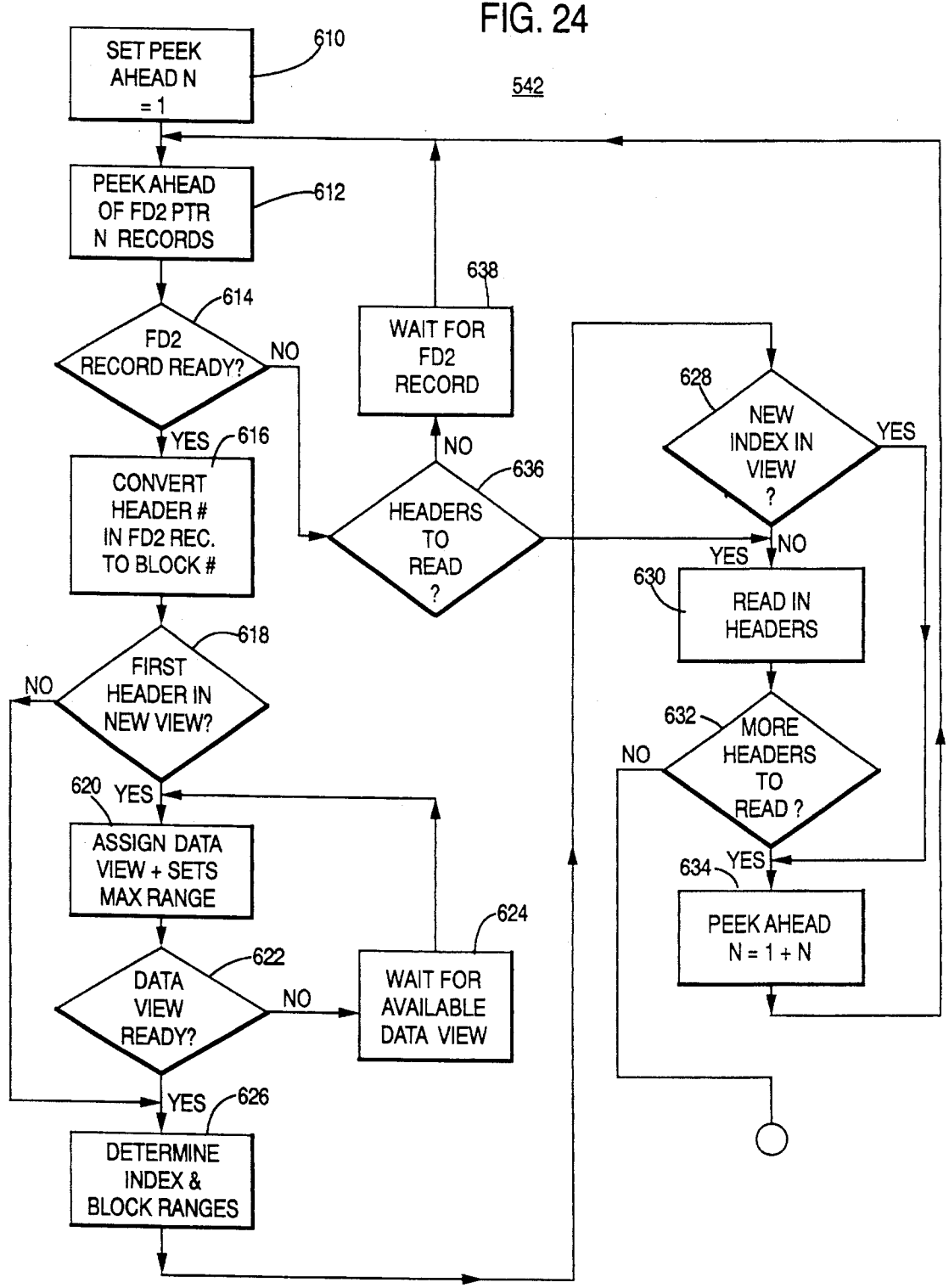
FIG. 24 describes the reading of headers in block 542 of FIG. 22.

FIG. 24 illustrates the block read of headers (indexes) of block 542 in FIG. 22. The block read of headers process 542 of FIG. 24 is also used by the destination block write process 300 to load headers into the destination location window 290 when needed. This routine is called to obtain the locating information (essentially file headers or indexes) for the files specified by the user or needed for file merging. In VMS this is the headers, in UNIX it is the I-NODES and in DOS it is the file allocation table. The headers will be stored in the appropriate source location or destination windows 276 and 290. The first thing the process 542 does is set 610 a peek ahead variable N equal to 1. This value is used to indicate how far ahead of the source location pointer for the list 108 the block read of headers needs to be performed. The block read of headers process 542 knows that the location process is going to be advancing the pointer in the list 108 and so the block read process 542 is attempting to load the information that will be needed into the windows. This peek ahead is possible because the source directory search process 280 has examined the source directory ring 275 and created entries in the list 108 for any directories that have been loaded. Next the process 542 of FIG. 24 peeks ahead 612 in the list 108 for the number of entries N. The buffer control peek ahead that occurs here works by saving the current address pointed to by the location pointer, calls buffer control 102 to advance the pointer N times, restores the address to the original current address and return the address the pointer will advance to N calls in the future. The peek ahead obtains the address of the list node 158 as the source and destination process will get them and then gets the header field contents out of the record to determine which header needs to be loaded into the window. If the list record is not ready 614 a determination is made 636 as to whether there are any headers to be read in, and if so, the process reads in the headers 630. If there are no headers to be read in because the window currently contains the headers to be used next or if the peek data is not available, the process waits 638 for the entry in the list 108 designated by the peek ahead to become available. If the record is ready the header number 197 is converted into a block number on the source disk 270 and stored in the block location record 203. Next a determination is made 618 as to whether this is the first header in a new view. That is, as in a paging process the index ranges of the views of the window are compared to the number of the header sought and if not in the ranges the header is in a new view. If so, a data view is assigned and the maximum range is set 620. If the data view is not ready 622 a wait for the data view to become available in the appropriate window occurs. The header and block numbers of a view are compared to the first header and block numbers assigned for reading. If the difference between the header numbers and block numbers are not the same, the data is not continuous on the disk and the new header is not assigned to be loaded in the window. If it is contiguous on the disk, a check is made to see if there is room in the window view for the header. If there is no room, the new header is not assigned to be loaded into the window. If there is room, peek sees if the next header can be fit into the window. When peek indicates the next header will not fit in the window or that peek cannot look ahead further, the data is read into the window. If there is another header to load and another data view is available, the header then becomes the first header in the next data view assigned.

Figure 25:
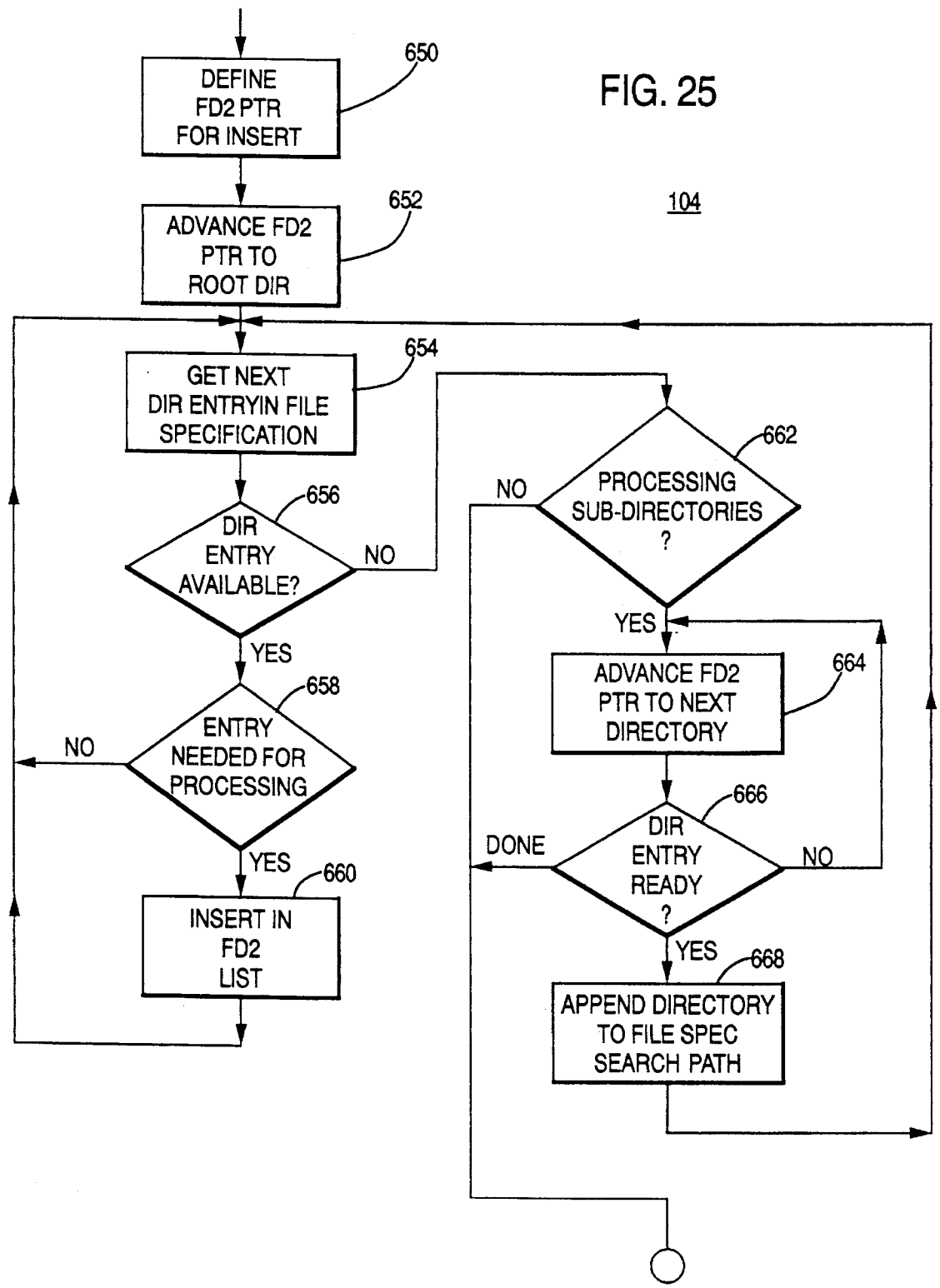
FIG. 25 is a flowchart of the file look-up process 104.

In the file look up process 104 of FIG. 25 the first thing done is to define a pointer inserting the file entry into the list 108. Once again this is a call to the buffer control process 102 to obtain an integer designation of the pointer. This pointer is a variable movement pointer like the source search pointer. Next the pointer is advanced to the root directory entry in the list 108 by again calling buffer control 102. The process then enters a processing loop which creates the file entries-in the list 108. First, the next directory entry in the file specification is obtained 654 which is a call to the native file system input/output routine. If the directory entry is available 656 a determination is made 658 as to whether the entry is needed for processing as previously discussed. Next the entry is inserted into the list 108 by making a call to buffer control 102 as previously discussed. If there are no more directory entries a determination 662 is made as to whether subdirectory processing is needed. If so, then the pointer is advanced 664 to the next directory and, if buffer control has returned a state of not ready for the advance request, a determination is made 666 as to whether the directory is ready. If so, the directory is appended 668 to the file specification search path and the process returns to get 654 the next entry.

Figure 26:
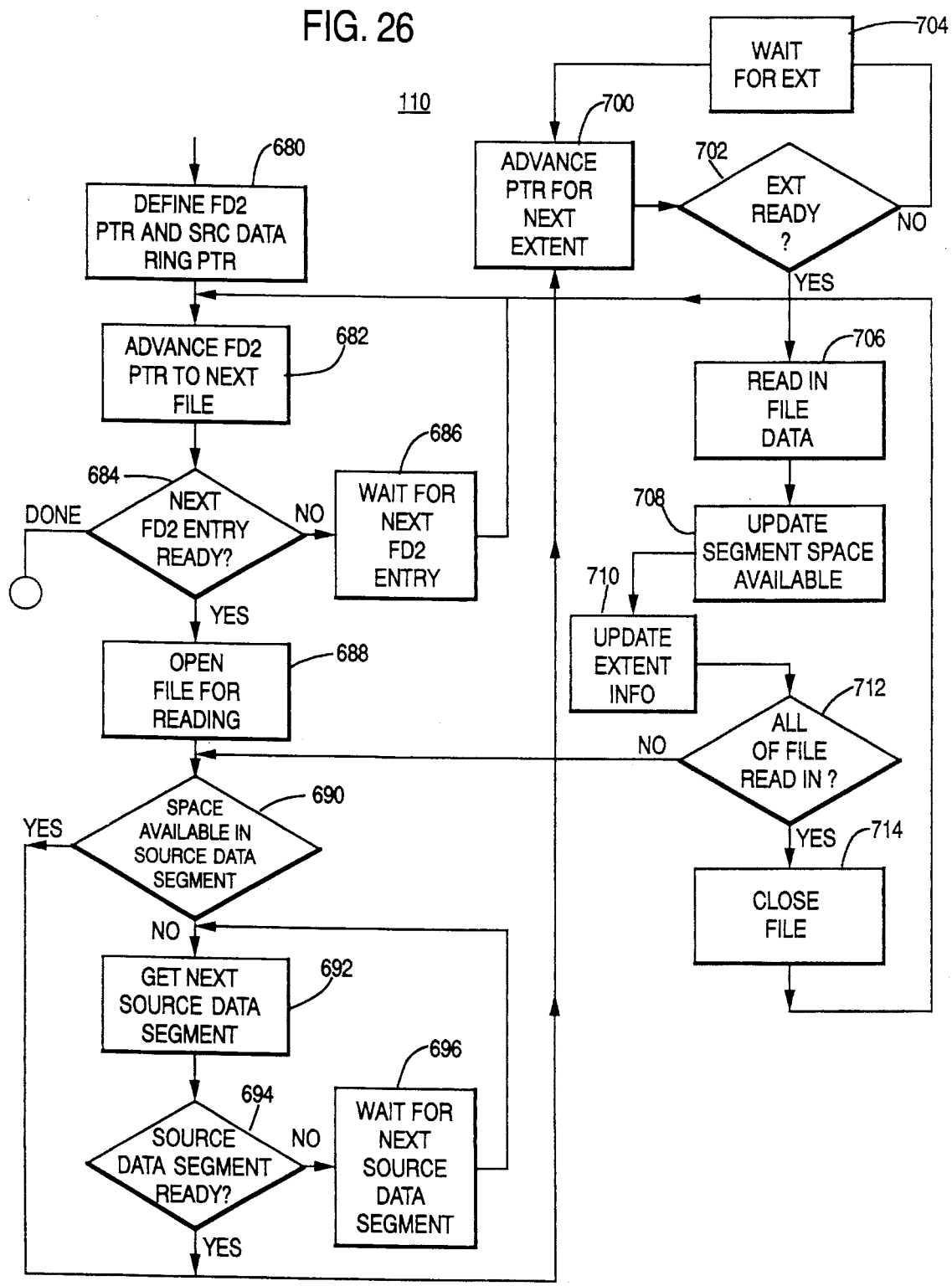
FIG. 26 depicts the file read process 110.

The file read process 110 is illustrated in FIG. 26 and also starts with defining 650 and 652 pointers for the source data ring 112 and the list 108 which is performed by appropriate calls to the buffer control process. The list pointer follows the insert pointer and moves in directory build order skipping over directory entries. The file read ring pointer is first and is followed by the translate pointer if translate is on otherwise by the block write pointer and moves in directory build order skipping over directory list nodes. Next the pointer for list 108 is advanced 682 to the next file and if the entry is not ready 684 a wait 686 occurs. Next the file, as specified by the file name, is opened 688 for reading by performing a conventional C call to the native operating system. Field 203 is completed with the returned information and the field is then passed to the read, write and close calls to specify the file. Then a determination 690 is made concerning whether space is available on the source data segment of the ring in a manner as previously discussed using the record 203 and the record 225. If so, the next source data segment is obtained 692 using a call to the buffer control process 102. Once again, if the segment is not ready 694 a wait 696 occurs. Once the ring segment is available the pointer is advanced 700 to the next extent with a wait 704 if the extent is not ready 702. Then the data in the file is read in 706 and stored in the segment with an update 708 of the segment space available followed by an update 710 of the extent information. If the entire file has not been read in 712, which is determined by a read return of non-zero bytes, then the read-in process continues 690 otherwise the file is closed 714 using a standard C call to the native operating system.

FIG. 27 illustrates the operation of the translate process 114 which starts by testing 720 to see if data in the source data extent of ring 112 is ready. If not, a call is made to buffer control to get 722 the next source data ring extent 242. If the source data ring extent is not ready 724 a wait occurs 726. If the data in the extent is ready a line or record is extracted 728 and then a test is made to determine whether there is room in the extent of the destination data ring 116. If not, ring pointer is advanced 734 by making a call to buffer control 102. If the extent for the destination data ring 116 is not ready 736, another wait 738 occurs, otherwise or if there is a determination is made 740 as to whether there is room for the line in the destination data segment (220–224) of the ring 116. If not, the ring extent information is updated 742 followed by an allocation 744 of a new data segment, which is again a call to buffer control 102. The new segment is allocated because extents cannot cross segment boundaries. If the new segment is ready 746 or the old segment has room 740, the line is put 750 in the destination data segment in the new format followed by incrementing 752 the destination file size. If this is not 754 the last line in the file, processing continues moving text lines (records) from the source data ring 112 to the destination data ring 116. If the just stored line is the last line in the file the size of the destination file is stored 756 in the list 108 and the ring extent information is updated 758.

Figure 28:
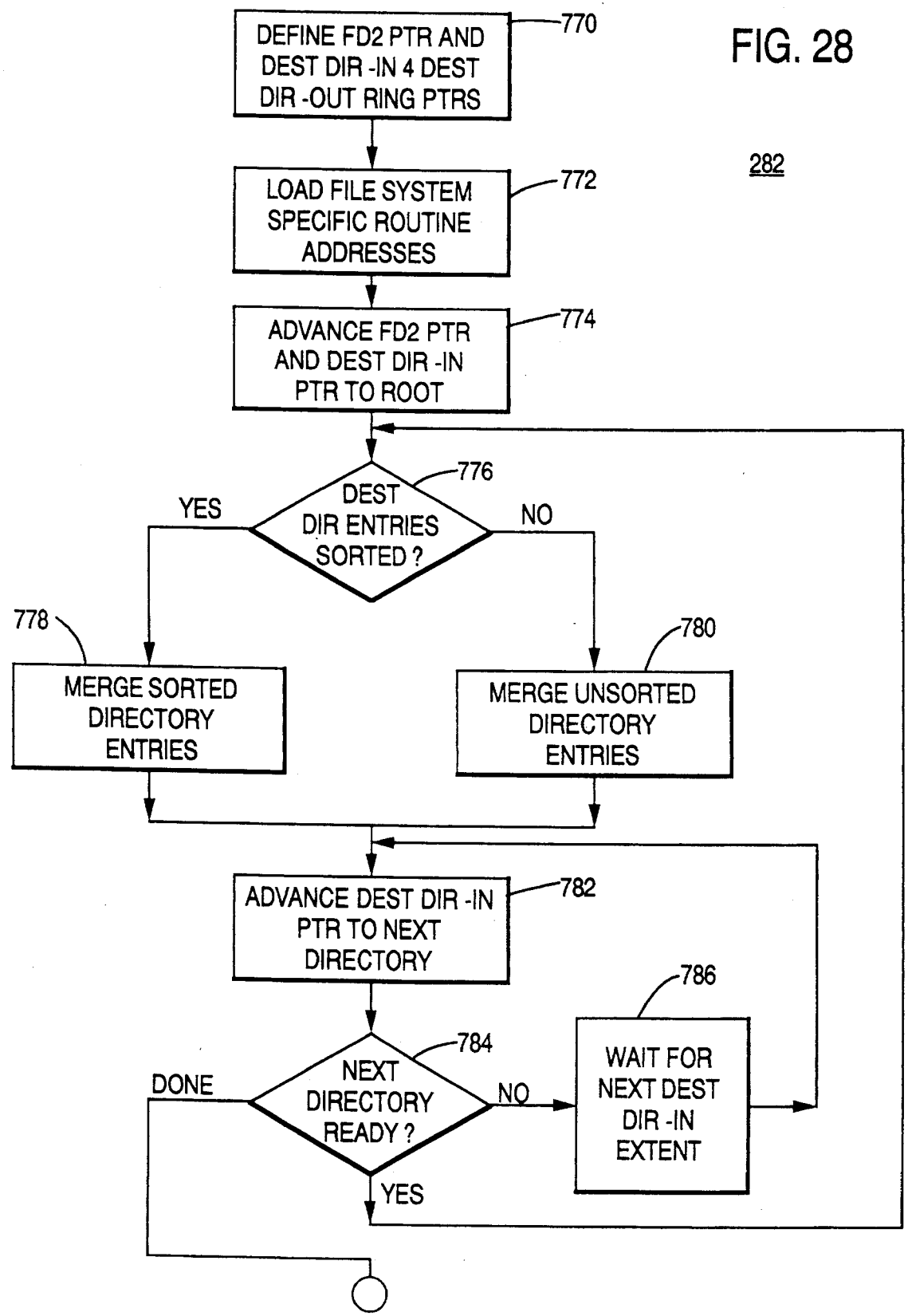
FIG. 28 shows the flow of the directory build process 282.

When the directory build process 282 illustrated in FIG. 28 is first called, the process calls 770 buffer control 102 to define a directory build pointer for list 108 along with defining pointers for the destination directory in ring 294 and destination directory out ring 296. The list pointer follows the translate or block read or file read pointers and is followed by the destination location pointer. The ring 294 pointer follows the block read directory pointer and is followed by the buffer control pointer while the ring 296 pointer is first and is followed by the block write directory pointer. Next the routine loads 772 the addresses for file system specific routines that get the next directory entry from the destination directory in ring, inserts a new entry in the destination directory out ring and extracts the name and type from the directory entry. The list pointer and destination directory in ring pointer are both advanced 774 to the root, so that the file description pointer and the destination directory in pointer correspond to the same directory. A determination 776 is then made as to whether the destination directory entries must be sorted based on the file format of the destination disk 304 previously determined. If the directory entries must be sorted the directory entries are merged 778 in a sorted order, which is further described with respect to FIG. 29. If the directory entries are not to be sorted, then they are merged 780 unsorted which will be further described with respect to FIG. 30. Once the entries for the current directory have been merged, the pointer for the destination directory in ring 294 is advanced 782 to the next directory by making a call to buffer control 102. If the next directory is not ready 784 a wait occurs, otherwise the process continues. If the end of the directories in the list 108 and the destination directory in ring 294 have been reached then this process is finished and is flagged done.

Figure 29:
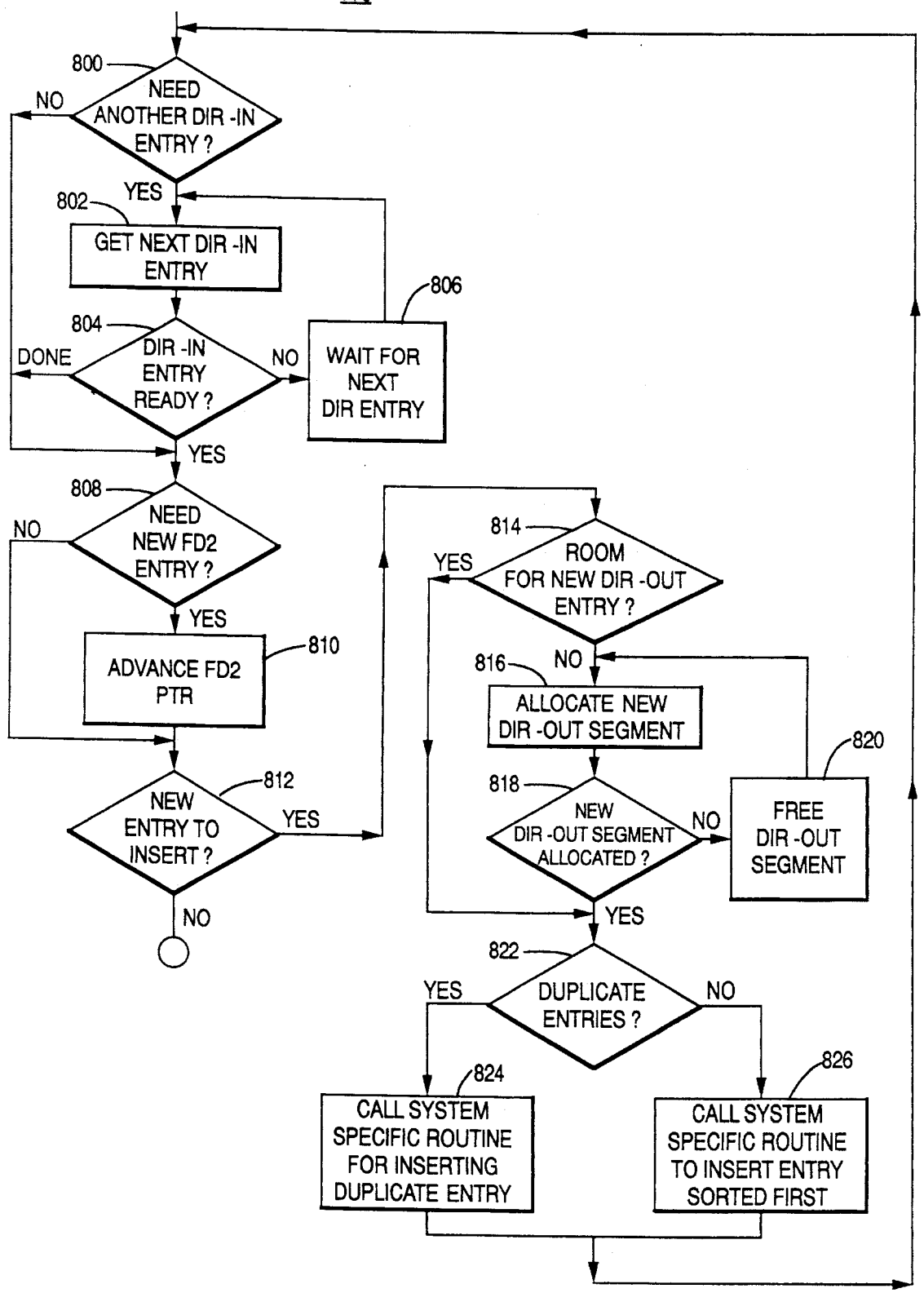
FIG. 29 illustrates the merge sorted operation 778 of FIG. 28.

The merge of sorted directory entries in block 778 is illustrated in FIG. 29 and for VMS will merge the list 108 entries with the destination disk 304 entries in alphabetical order. This routine takes a sorted directory list from list 108 and merges it with a sorted directory list in the destination in ring 294. The first step is to determine 800 whether another directory in ring 294 entry is needed. If so, the process gets 802 the next directory in ring 294 entry by calling a file system specific routine. If the entry in the ring is not ready 804 a wait occurs, however, if the end of the directories on the destination disk 304 has been reached, the getting of directories from the destination disk 304 is done. If the directory entry is ready, a determination is made 808 as to whether a new entry from the list 108 is needed. A new entry is needed if the current entry has already been processed and put onto ring 296 because the current entry is alphabetically before the current entry on the ring 294. If a new entry is needed, the directory pointer for the list 108 is advanced 810 by making a call to buffer control 102. If the new entry needs to be inserted 812, because it is alphabetically before the current entry on ring 294, a determination is made 814 as to whether there is room in the directory out ring 294 for the new entry. If there is no room a call to buffer control 102 is made to allocate 816 a new segment for the directory out ring 296. Once again, if the new entry has not been allocated 818, a wait 820 occurs which is a transfer back to process control 398 to allow other processes to execute. Next, the routine 778 compares 822 the entry pointed to on list 108 and the entry pointed to on ring 294 and if the entry is a duplicate a system specific routine is called 824 for inserting a duplicate entry. For example, for a VMS disk an additional version of the file is created. If not a duplicate entry, a system specific routine is called 826 to insert the highest entry in sort order from the two entries compared. These two insertion routines also allocate a header in the header control list window 292 by searching for the first non-allocated header either by forward or backward scanning. The routine then returns to obtain another entry from the directory in ring 294.

Figure 30:
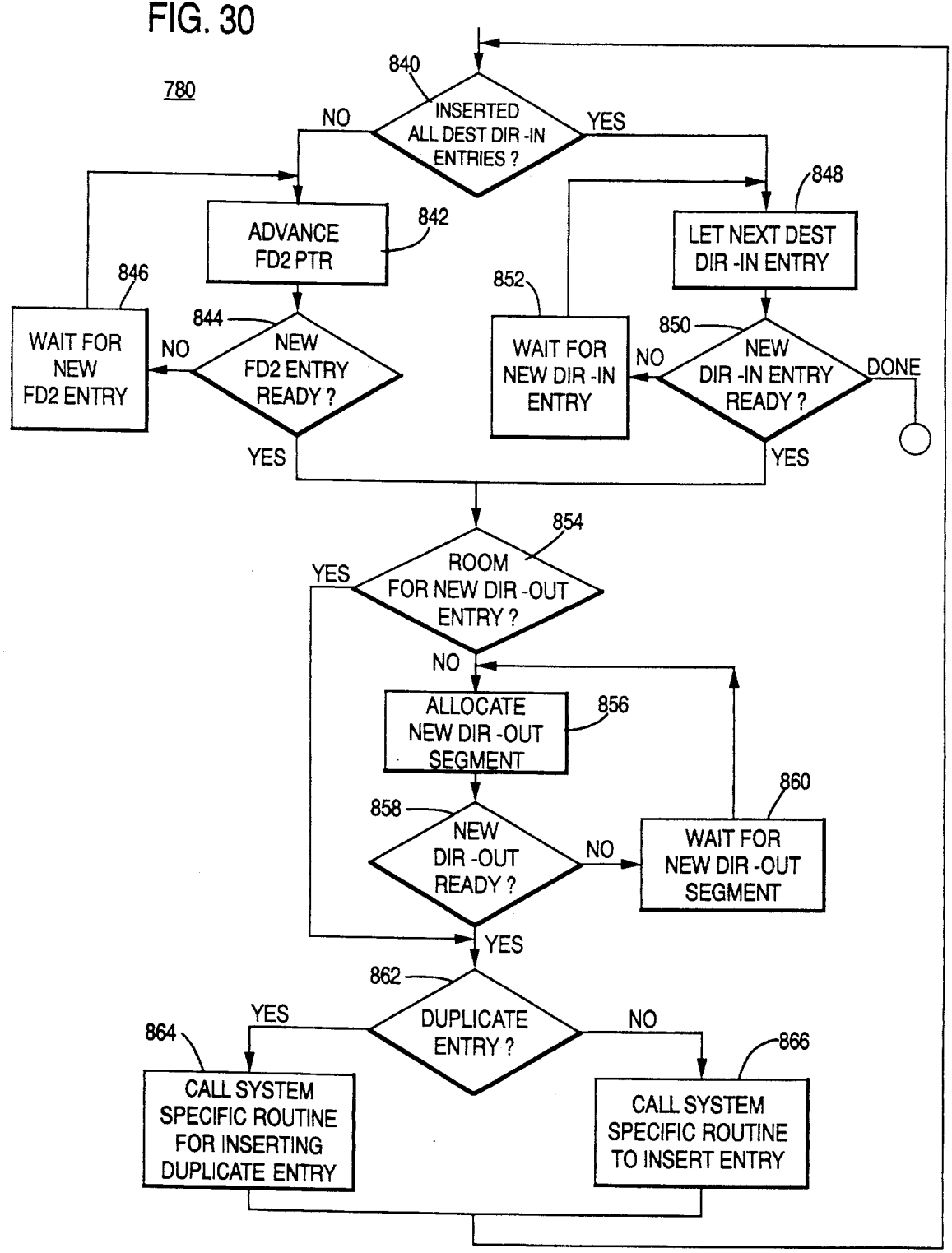
FIG. 30 provides the flow of the merge unsorted operation 780 of FIG. 28.

The merging of unsorted entries of steps 780 in FIG. 28 is illustrated in FIG. 30. This routine inserts the directories for the files from the destination disk higher in the destination directory structure than the directories for the original files on the destination source itself. This order can be reversed by simply changing the test performed in step 840 which checks to determine whether all the entries from the ring have been inserted. If all of the entries from the list 108 have been inserted, the process advances 842 the pointer for list 108 by making a call to buffer control and if the entry is not ready 844 waits 846. When all of the entries from the ring have not been inserted the process obtains 848 the entries from the destination directory in ring 294 using the file system specific process. If the entries are not ready 850 a wait occurs 852. Once an entry is ready a determination 854 is made as to whether there is room on the directory out ring 296 for the new entry. If not a new segment is allocated 856 by making a call to the buffer control routine 102. Once again if the segment is not ready 858 a wait 860 occurs. The same comparison 862 for duplicate entries and the insertion of duplicate entries 864 or a simple insertion is performed 866 in the same manner as in the routine of FIG. 29.

Figure 31:
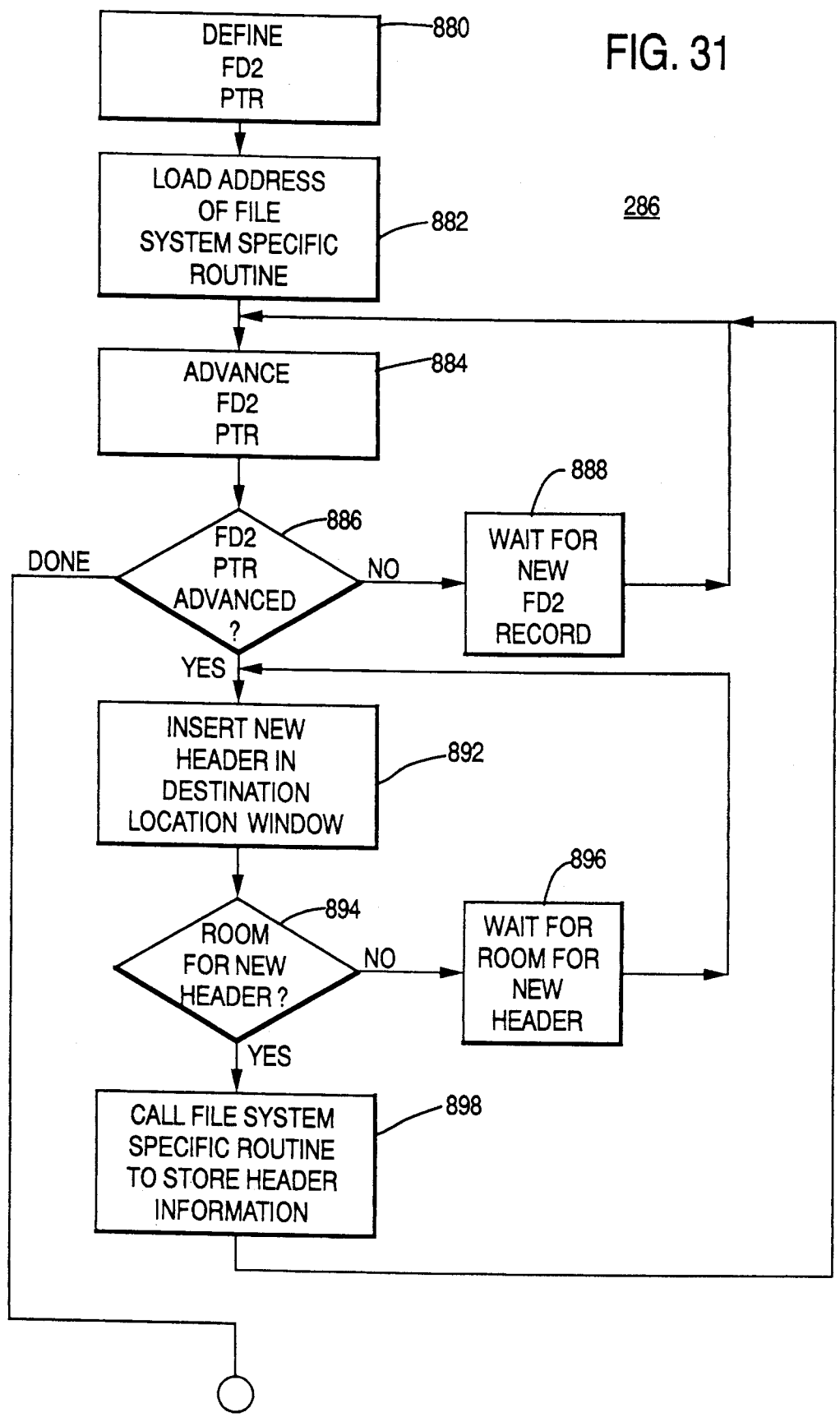
FIG. 31 is a diagram of the header build process 286.

At the beginning of the header build process 286 illustrated in FIG. 31, which is not activated when the destination is a DOS disk, the process defines 880 a header build pointer for list 108 by making a call to buffer control 102 in a manner as previously discussed. This list pointer follows the block write of files and block write of directories pointers and is followed by the buffer control pointer and advances in directory build order stopping on both file and directory nodes in list 108. Next the address of the file system specific routine which will build a header (index) in the format of the destination disk 304 is loaded. In the first pass through the loop, the list pointer for the header build process is advanced 884 to the first file or directory that requires a header. This is again a call to buffer control 102 which, if the pointer is not advanced 886, requires a wait 888. Then the new header is constructed from the information on list 108 and inserted 892 in the destination location window 290 and the window 292 is updated. The insert operation is a call to buffer control which will again indicate 894 whether there is room in the window 290 and if not wait 896 for the loading of the proper window 290. Next a file system specific routine is called 898 to store the header information.

Figure 32:
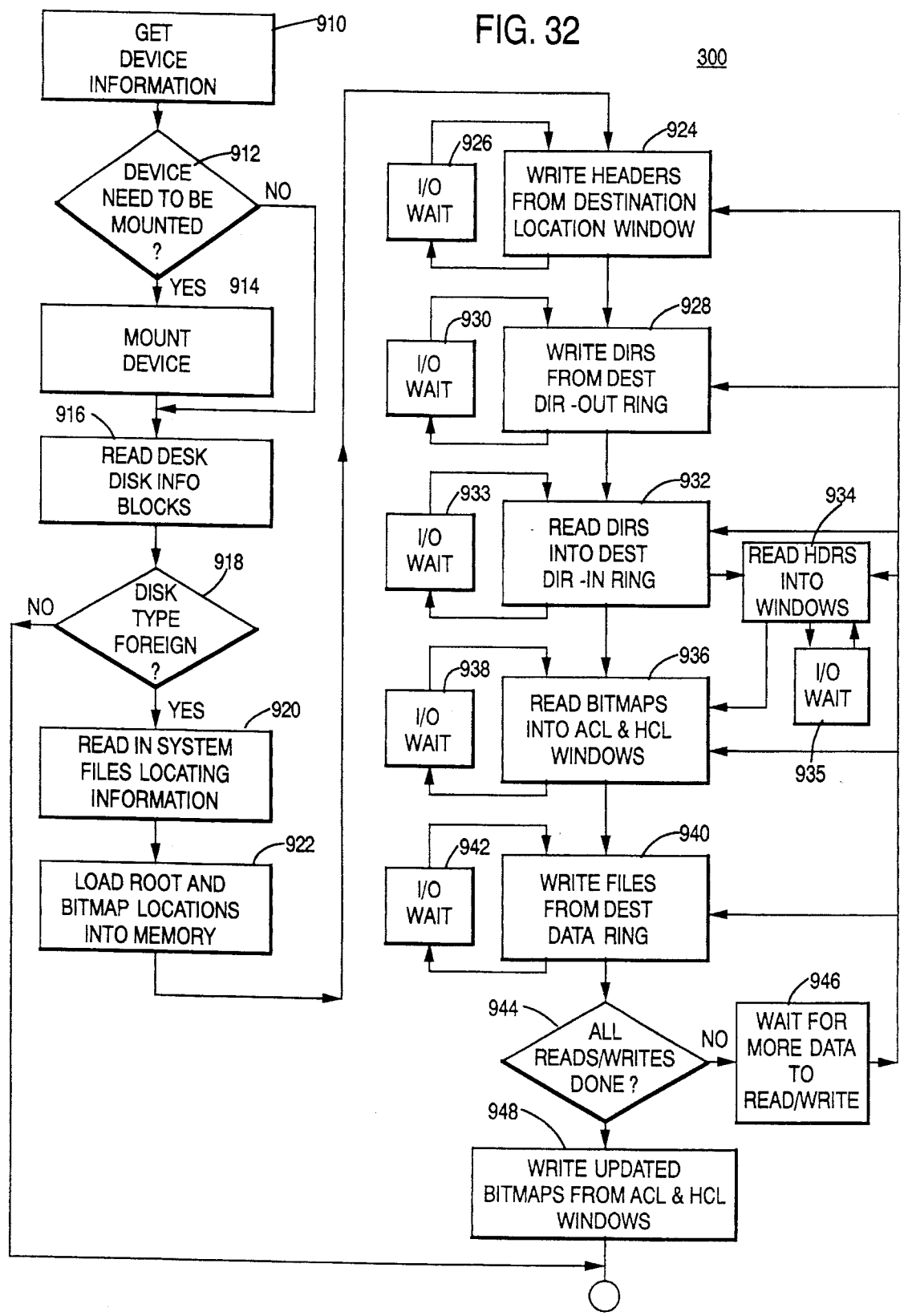
FIG. 32 is a flowchart of the block write process 300.

The block write process 300 is illustrated in FIG. 32 where the first seven blocks (910–922) of the process 300 are substantially identical to the same steps in the block read process discussed with respect to FIG. 22. Block write performs a number of different tasks and the pointers associated therewith advance in different ways. The reading of subdirectories advances over directories in list 108 and this pointer follows the destination location pointer and is followed by the header build pointer. The pointer for the writing of directories advances through the destination directory out ring following the directory build pointer followed by the buffer control pointer. The writing of files either advances through the destination data ring after the translate pointer or through the source data ring after the block read pointer. For both the writing of files and directories there is a pointer moving through list 108 and this pointer follows the actual writing operation and is used to prevent the ordered directory build pointer from building a header before the final destination location has been allocated by block write. This pointer is nonfunctional to block write. Once the disk type has been determined and process control 398 again calls the block write process 300, the first step in the writing loop is to attempt to write 124 all the headers from the destination location window 290 to the disk 304. This step will be discussed in more detail with respect to FIG. 33. If the destination disk 304 is busy an I/O wait occurs 926, step 924 continues executing until all the location window headers have been written out to disk 304 or until the location window 290 is empty and needs filling. Next, the process writes 928 all of the directories from the directory out ring 296 to the disk with a wait 930 if necessary. This step will be discussed in more detail with respect to FIG. 34 and will continue to be executed until the ring 296 is empty. Step 932 reads any necessary directories into ring 294 as described with respect to FIG. 23 and step 934 reads headers into the destination location window 290 as described in FIG. 24. Next the contiguous known location bit map for the allocation control list and the contiguous known location header control list are both read in 936 if the destination disk has a header or index type record control list. Once the bit maps are read in, the files are written 940 from the destination data ring 116 to the destination disk 304. If all reads and writes have not been accomplished the system waits 946 for more data to read or write. The return from this wait state 946 is a return to the particular process 924–940 and the particular step in the process which created the wait state in the first place. If all writes are done, the updated bit maps are written 948 contiguously to the destination disk 304.

Figure 33:
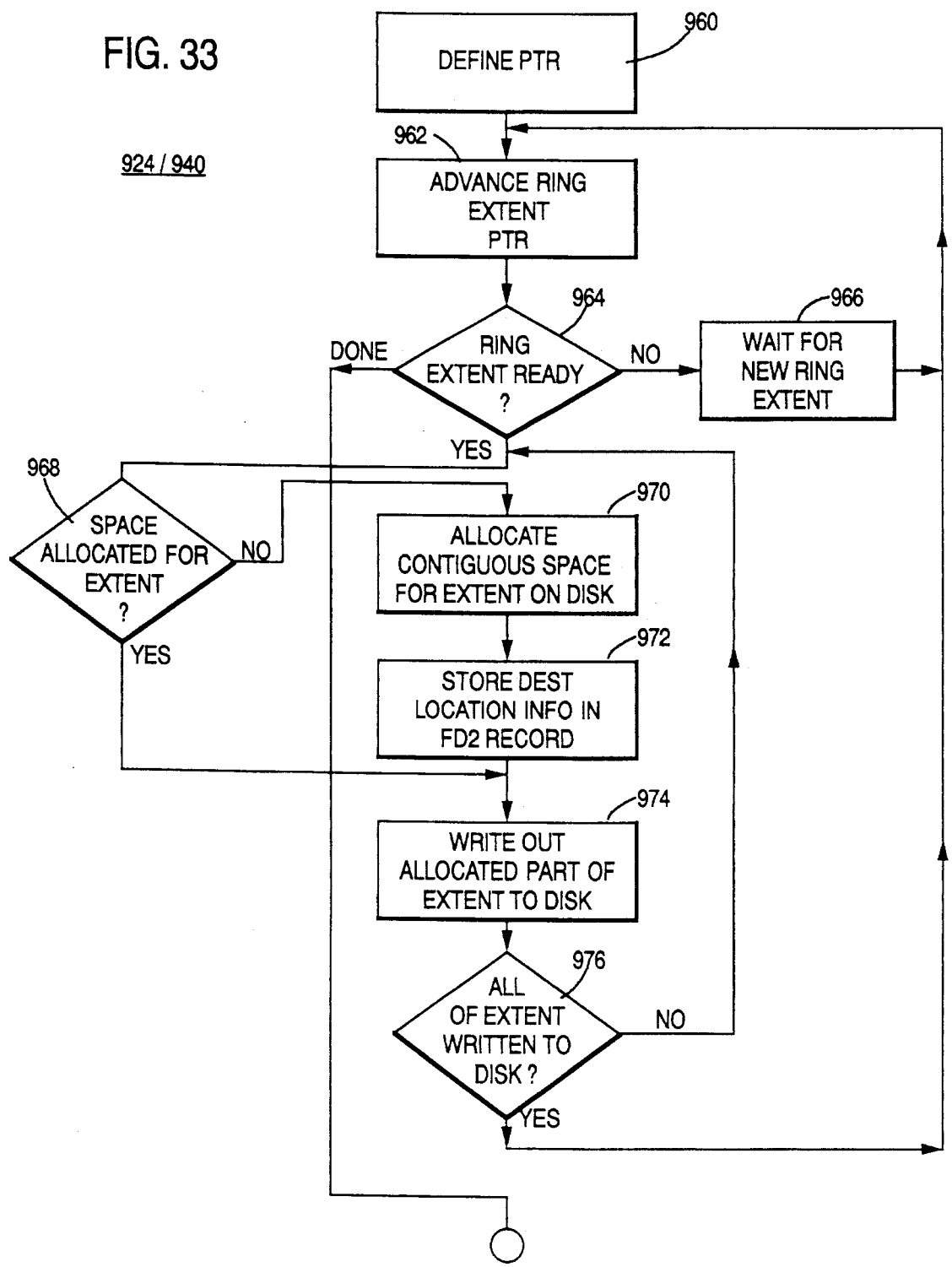
FIG. 33 depicts the block write of files or directories of steps 924 or 940 in FIG. 32.

The block writes of files or directories in steps 924 and 940 of FIG. 32 is illustrated in FIG. 33. The first step is to define a pointer 960 which is a call to buffer control 102 as previously discussed. The system then advances 962 the appropriate ring extent pointer, for ring 116 if files and for ring 296 if directories, and in a manner similar to previous situations determines 964 whether the extent is ready and waits 966 if not. If the extent is ready a determination 968 is made as to whether space has been allocated on the disk 304 for the extent. If not, a contiguous space is allocated 970 and the appropriate update to the allocation control list window 298 is performed. Next, the destination location information is stored 972 in the entry in the list 108, followed by a write 974 of the allocated portion of the extent to the disk 304. The write 974 is an absolute write which is discussed in more detail with respect to FIG. 49. If all of the extent has not been written 976 to the disk 304, the process continues allocating and writing. If the extent has been completely written the process returns to advance 962 the ring extent pointer.

Figure 34:
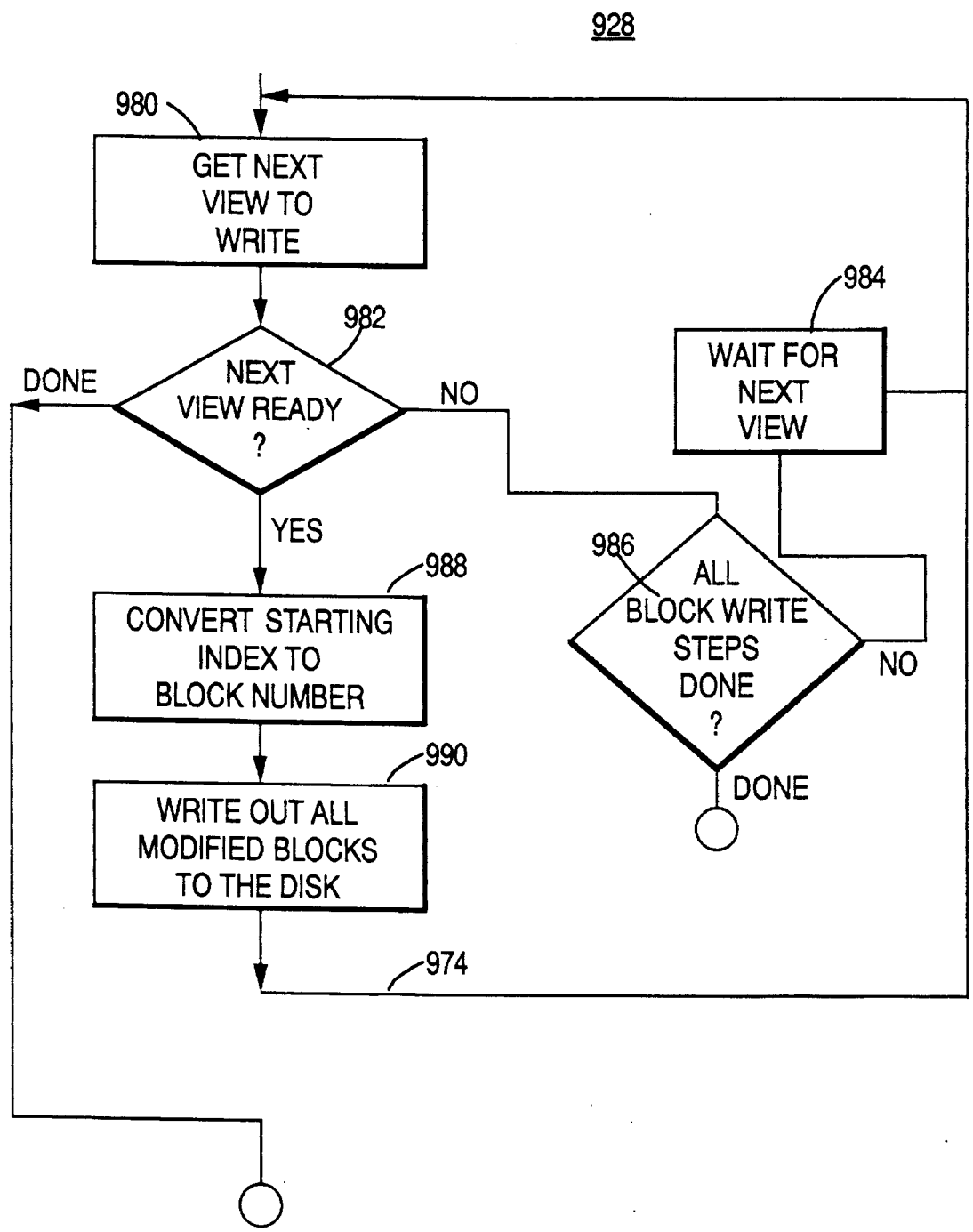
FIG. 34 is the flow of the window write step 928 of FIG. 32.

The block write window process 928 of FIG. 32 is illustrated in FIG. 34. This routine first gets 980 the next view to write by making a call to buffer control 102. If the next view is not ready 982 a determination is made 986 as to whether all the block write steps of other processes have been completed. That is, the status of each write process in the write process array is examined to determine whether the status is done. If not the window write process waits 984 for the next view. If the view is ready the starting index of the window is converted 988 into block number on the disk and all modified blocks are written 990 to the disk 304.

Figure 35:
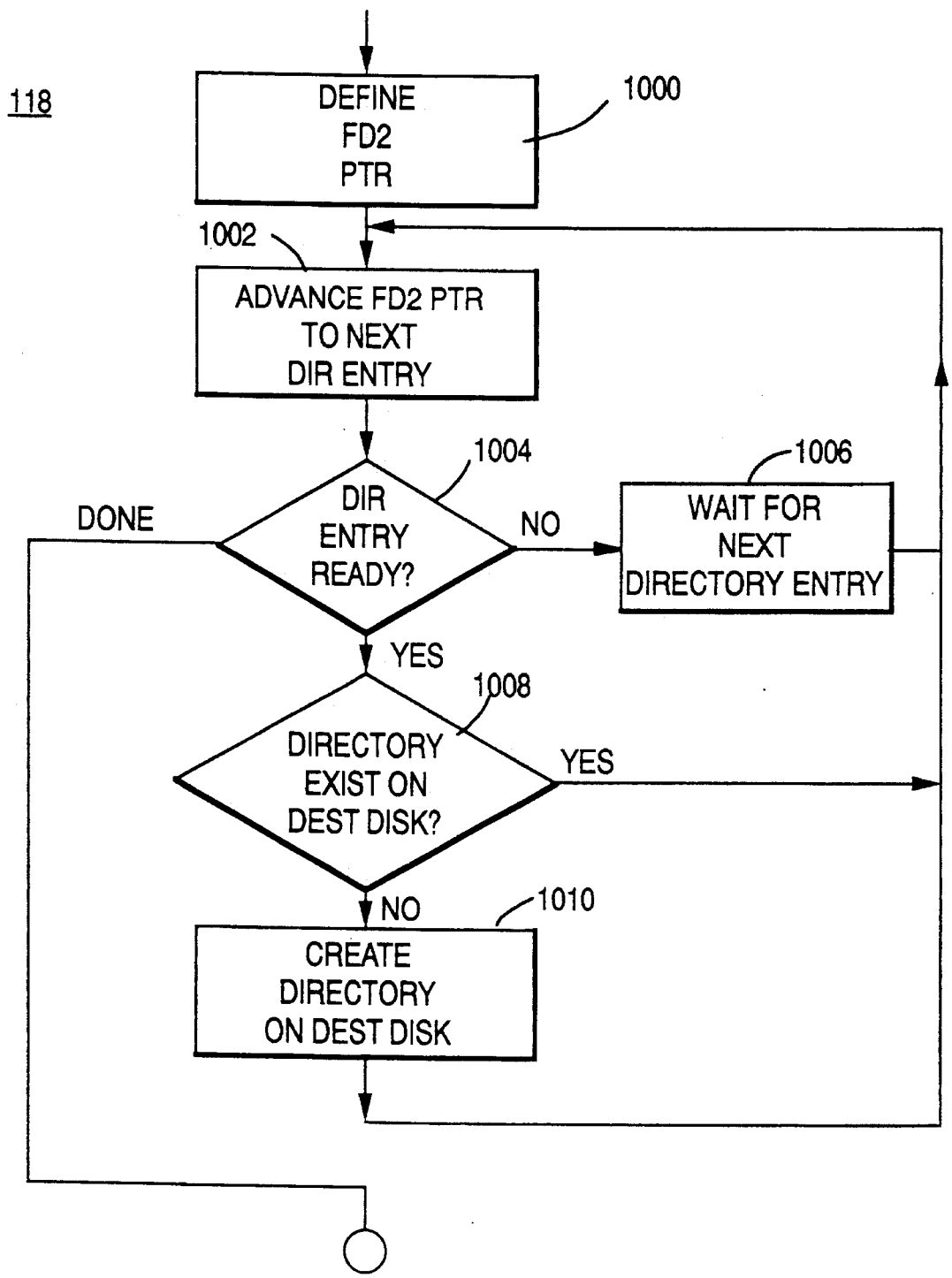
FIG. 35 is a flowchart of the directory create process 118.

The file directory create process 118 when it first starts executing defines 1000 a pointer for list 108 as illustrated in FIG. 35. This pointer follows the block read directory pointer and is followed by the file write pointer and passes over, does not stop on, subdirectories. Then the process enters a loop in which the first step 1002 advances the pointer to the next directory entry in the list 108. The steps 1000 and 1002 are both calls to the buffer control process 102. If the directory entry is not ready 1004, a wait occurs which is once again a return to the process control routine at step 404 in FIG. 18. If the buffer control process 102 returns a done state, then process 118 returns done. The next step is to determine whether the directory exists 1008 on the destination disk 304, which is determined using a call to the file system 44 of the computer 30. If the directory does exist on the disk the process loops back, otherwise a directory is created on the destination disk 122 from the list 108 node using a call to the native file system 44.

Figure 36:
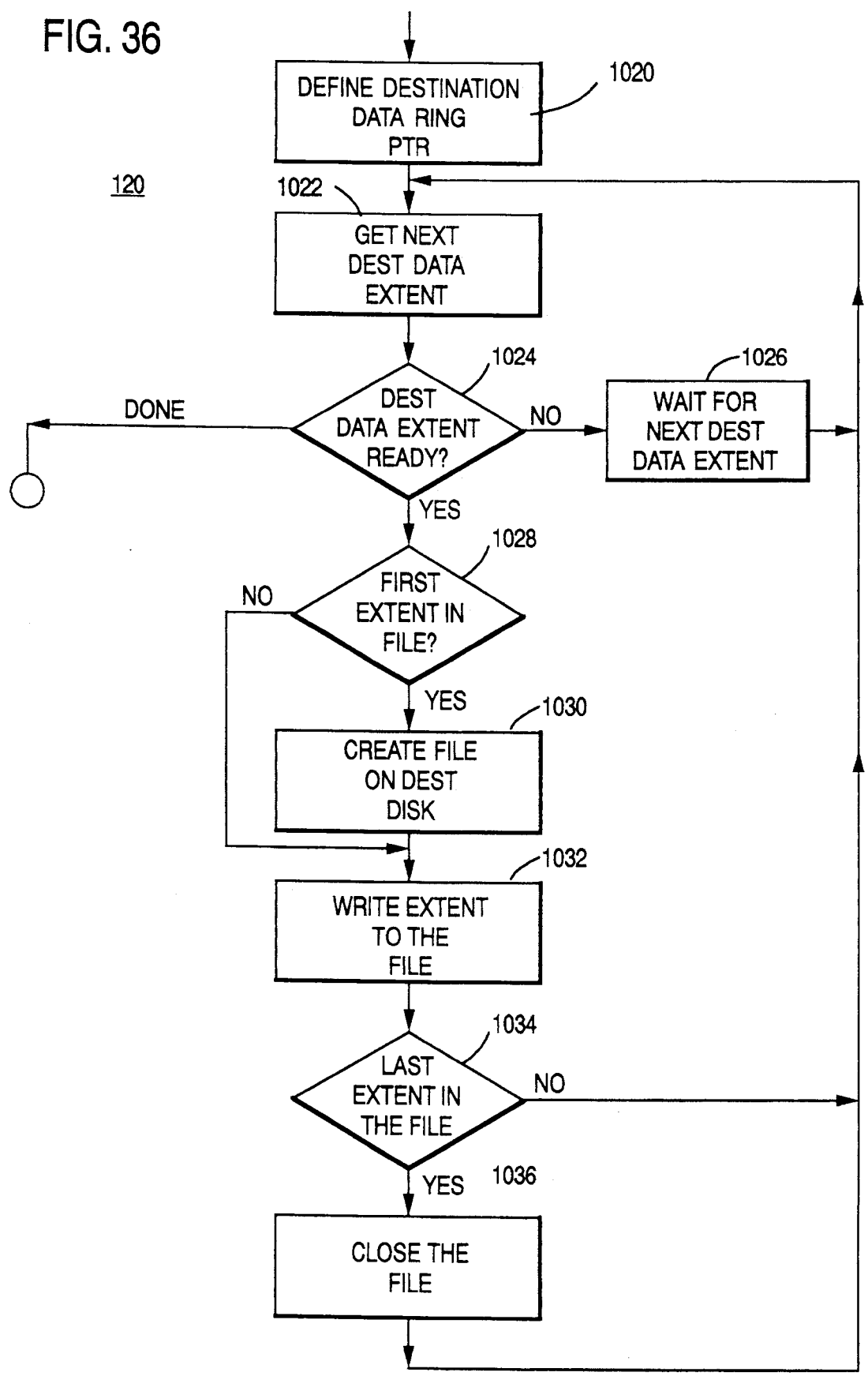
FIG. 36 shows the file write process 120.

The destination file write process 120 illustrated in FIG. 36 also uses standard system C calls to the native operating system. This process when it first is executed defines 1020 a destination data ring 116 pointer and obtains 1022 the next destination data extent where steps 1020 and 1022 are calls to buffer control. If the extent is ready a determination 1028 is made as to whether this is the first extent in the file. If so, a standard C call to the native operating system 44 creates the file on the destination disk 304. If it is not the first extent in the file, the extent is written 1032 to the file and a determination is made 1034 as to whether this is the last extent. If not, the process loops back to continue writing extents to the file on the disk 304. When the last extent is reached the file is closed 1036 using a standard C call to the native operating system 44.

Figure 37:
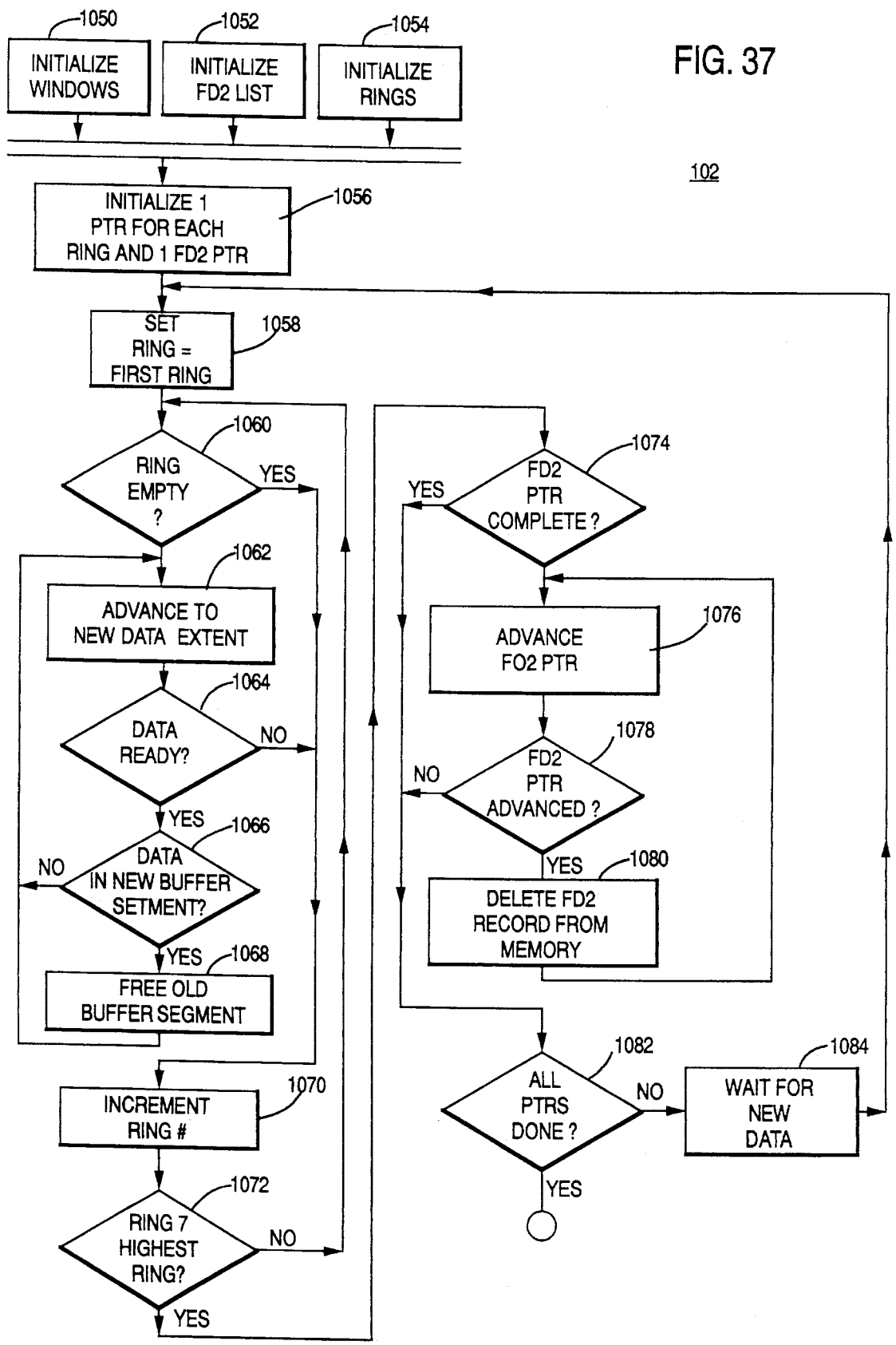
FIG. 37 illustrates the portion of the buffer control process 102 called by the process control routine of FIG. 18.

The portion of the buffer control process which is called by the process control routine of FIG. 18 is illustrated in FIG. 37. The initial execution of the buffer control process 102 initializes the windows 1050 which is simply setting a value in the status field 338 of each window to indicate that the window has not been defined, initializes the list 108 which involves inserting one entry in the list 108 which is the root entry and initializes the rings 1054 which involves indicating that each ring has not been defined. Subsequent to the initialization steps a pointer for each ring is initialized 1056 and along with a pointer for the list 108. The process then enters a loop in which the first step is to set 1058 the ring number of the ring being processed to the first ring. Next the process checks 1060 to see if the ring is empty. If not, the process advances 1062 to a new data extent. If the data is ready 1064 a test 1066 is performed to determine if the data is in a new buffer segment. If so, the status 225 of the old buffer segment is set as free 1068. If the ring is empty the ring number is incremented 1070 and a determination is made 1072 as to whether the ring is the highest ring in the ring list. If it is, a determination is made concerning whether the pointer for the list 108 is complete, that is an advance request has returned done. If not, the pointer to the list 108 is advanced 1076 by a call to the appropriate portion of the buffer control process as will be discussed later. If the pointer is complete 1074 or the pointer has not advanced 1078, a determination is made 1082 as to whether all of the pointers are complete, if not the process transfers control back to the process control routine 398 and waits 1084 for new data. If the pointer 108 advances, the node for the list entry just completed, if it is a file node, is deleted from memory and the nodes for directories are deleted when all the nodes (files) in the directory are deleted, since until all files are deleted the directory node may be referenced through the parent element in the data structure. This involves conventional pointer removal operations necessary to remove a node from a multi-pointer list where a forward pointer from a previous node is changed to point to a later node and backward pointers from the later node are changed to point to the previous node along with freeing the memory for allocations of new nodes.

Figure 38:
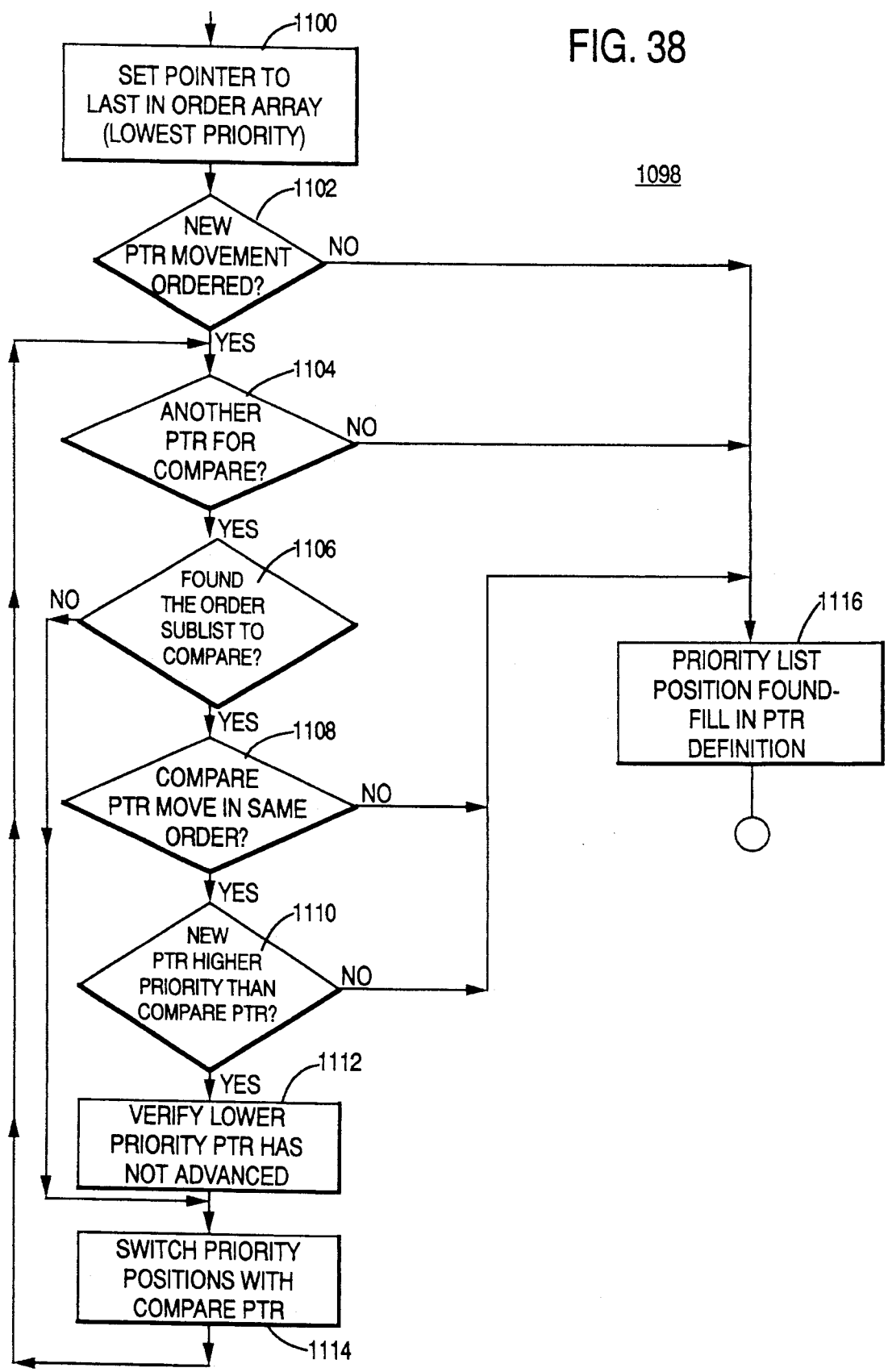
FIG. 38 illustrates the define file description pointer operation 1098 of the buffer control process 102.

When a process previously discussed makes a call to buffer control to define a pointer for the file description list 108, the process 1098 illustrated in FIG. 38 is performed. First the routine sets 1100 the pointer to the lowest priority indicating that this pointer has been most recently serviced. If the call requires 1102 that the pointer be moved in an order a determination is made 1104 as to whether there is another pointer for comparison. For example, the node deletion pointer cannot move to a node until all other pointers have completed their operation on that node. The deletion pointer must be compared to all pointers because, even though the buffer control process has the highest process number, it has the lowest priority. However, the source search pointer is a variable movement pointer that does not need to be compared. If so, a determination 1106 is made to see if the sublist for variable movement or directory build has been found which lists the pointers which move through the list 108 in the same order. When the list is found a determination is made 1108 as to whether the pointers move in the same order. If so a determination 1110 is made concerning whether the pointer is higher in priority than the pointer to be compared followed by verification 1112 that the lower priority pointer has not advanced and a switch 1114 in the priority position with the compared pointer. If any of the determinations 1102, 1104, 1108, 1110 indicate a negative answer, the pointer definition is filled in 1116 and the order of the pointer in the priority list is assigned otherwise the process loops back and continues to search for the priority position for the pointer.

Figure 39:
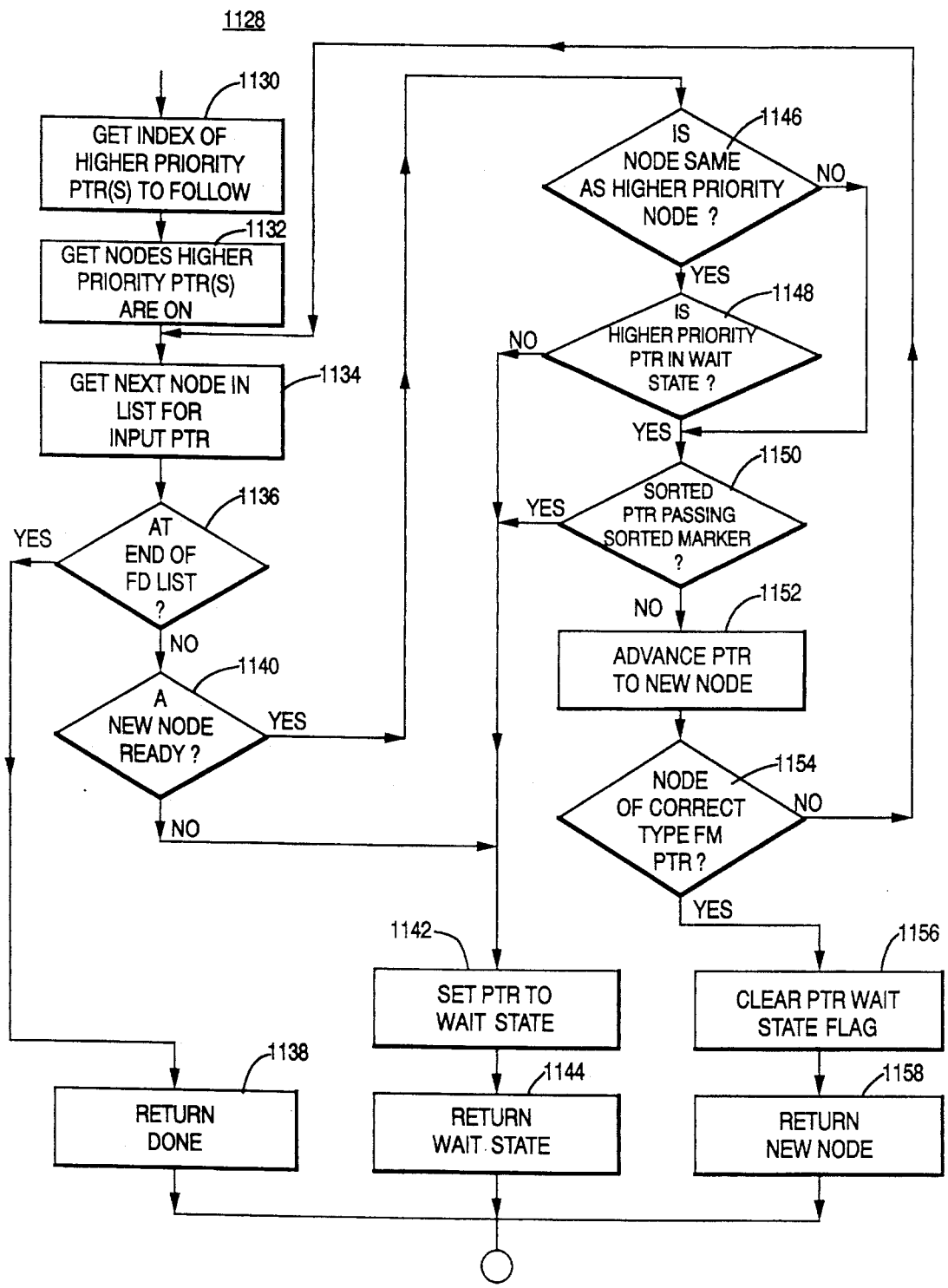
FIG. 39 depicts the advance file description pointer process 1128 of the buffer control process 102.

FIG. 39 depicts the process 1128 performed within the buffer control process 102 which advances a file description list pointer whenever called by another process. The first step in this process is to obtain 1130 the index of the higher priority pointers and then to obtain 1132 the nodes on which the higher priority pointers are positioned. Next, the process gets 1134 the next node in the list for an input pointer (the pointer to be advanced) and then makes a determination 1136 as to whether or not the pointer is at the end of the list. If so, the advance pointer process returns 1138 with a status of done. If the pointer is not at the end of the list 108, a determination 1140 is made as to whether the new node is ready. If not the pointer is set 1142 to the wait state and a return to the calling process with a wait state status is performed. If a new node is ready, the determination is made 1146 as to whether the node is the same as the high priority node, that is, is the high priority pointer pointing to the new node, if so the determination 1148 is made as to whether the higher priority pointer is in the wait state. If in the wait state, a determination is made 1150 as to whether the sorted marker for the nodes which indicates that the node has been sorted is being passed by the sorted pointer. This marker is an internal variable maintained by buffer control. It is advanced when source search and file look up indicate that all entries for a directory have been entered. If so, the pointer is put into a wait state and a return is performed. If not, the pointer is advanced 1152 to the new node and a determination is made 1154 as to whether the node is of the correct type for the pointer. For example, if the pointer only points to directory entries on list 108, and the node is a data file entry node, then the node 158 is not correct. If not the correct node, the loop continues passing through the nodes checking each as described above until they correct high node is found. However, if a pointer to a node with a higher priority is in a wait state, the pointer cannot advance, for example the buffer control delete pointer may not advance past a wait state pointer because it may be deleting a node that still needs to be referenced. At which point the pointer wait state is cleared 1156 and a return with the index of the new node is performed 1158.

Figure 40:
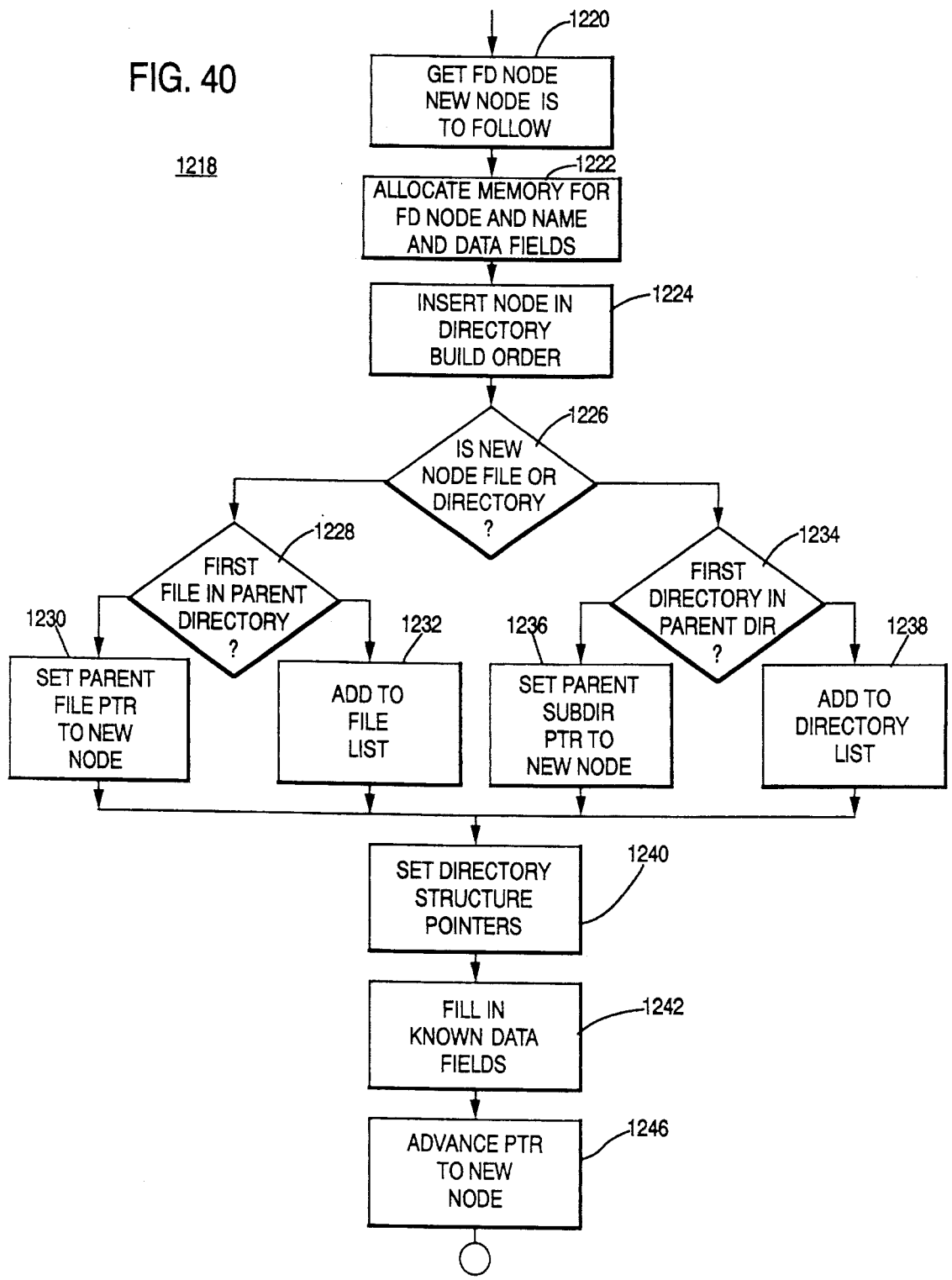
FIG. 40 illustrates the insertion operation 1218 for a node in the file description two dimensional list 108.

Whenever a new node needs to be inserted into the list 108 the process 1218 illustrated in FIG. 40 that resides within the buffer control process 102 is called. This process first involves getting 1220 the node from the list 108 which the new node is to follow. This involves getting the node pointer number and then the address from field 211 and inserting after that address. After the node which is to be followed is determined, the memory for the node and name and path fields is allocated 1222, followed by an insertion of the node into the list 108 in directory build and source directory hierarchy order. If the new node is a file node 1226, then a determination 1228 is made as to whether this is the first file in the parent directory, if so, the parent file pointer is set 1230 to the new node, and if not, the file is added 1232 to the end of the file list. If the new node is a directory node a determination is made 1234 as to whether this is the first directory in the parent directory, if so, the parent subdirectory pointer is set 1236 to the new node, otherwise the new node is added to the directory list 108. Next the remaining directory structure pointers 1240 are set using conventional techniques followed by filling in 1242 the known data fields and advancing 1246 the pointer to the new node by calling the advance pointer process 1128 of FIG. 39.

Figure 41:
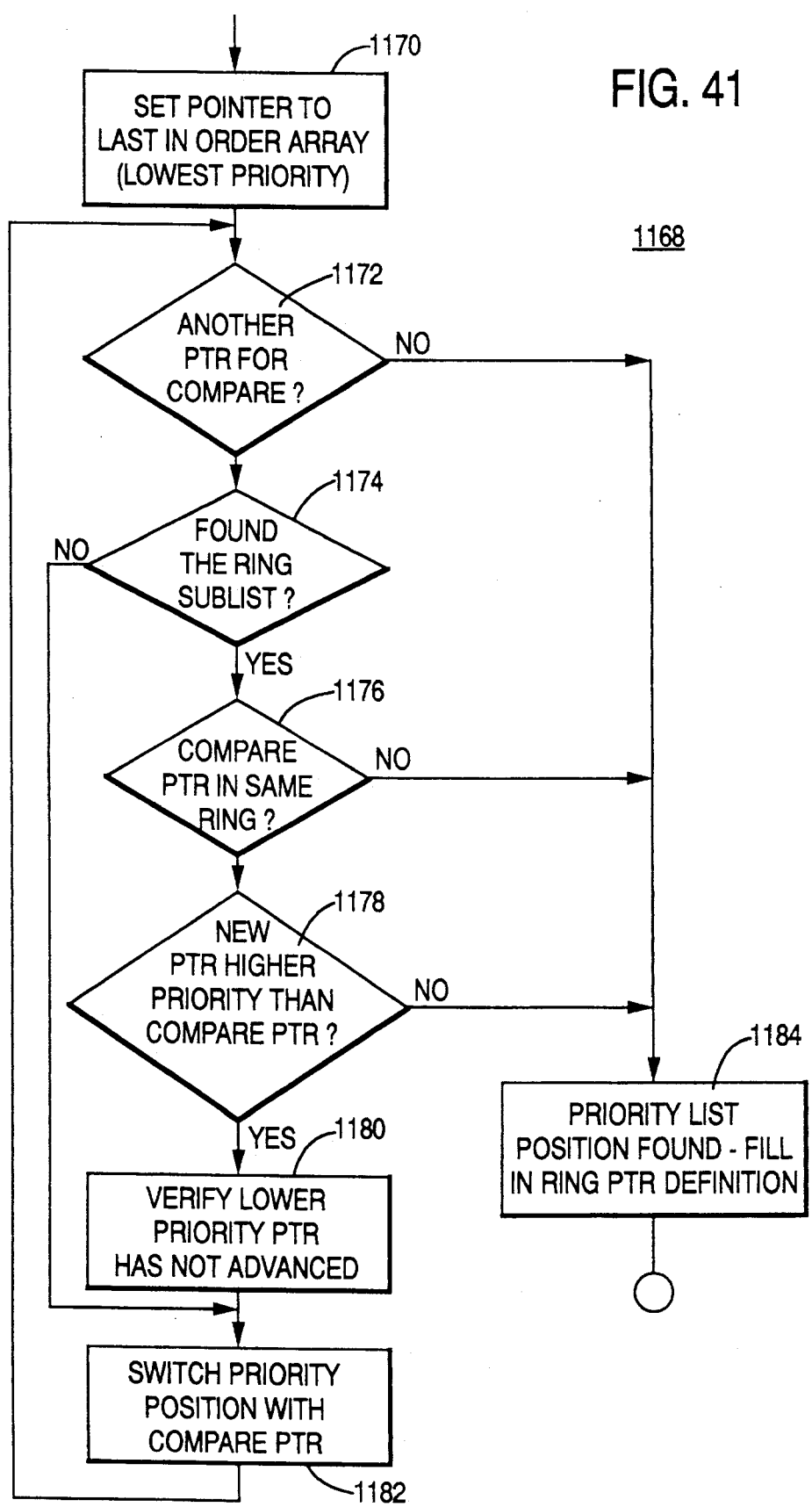
FIG. 41 is the flowchart of the define ring pointer process 1168 of the buffer control process 102.

When a process calls buffer control to define a ring pointer the process 1168 of FIG. 41 is performed. This process 1168 is very similar to the define file description pointer process 1098 of FIG. 38 and starts with setting 1170 the pointer to the lowest priority. The same comparisons as described with respect to FIG. 38 are performed with respect to the ring pointers using the array of ring pointers until the pointer that requires the definition is found at which time the ring definition information is completed 1184.

Figure 42:
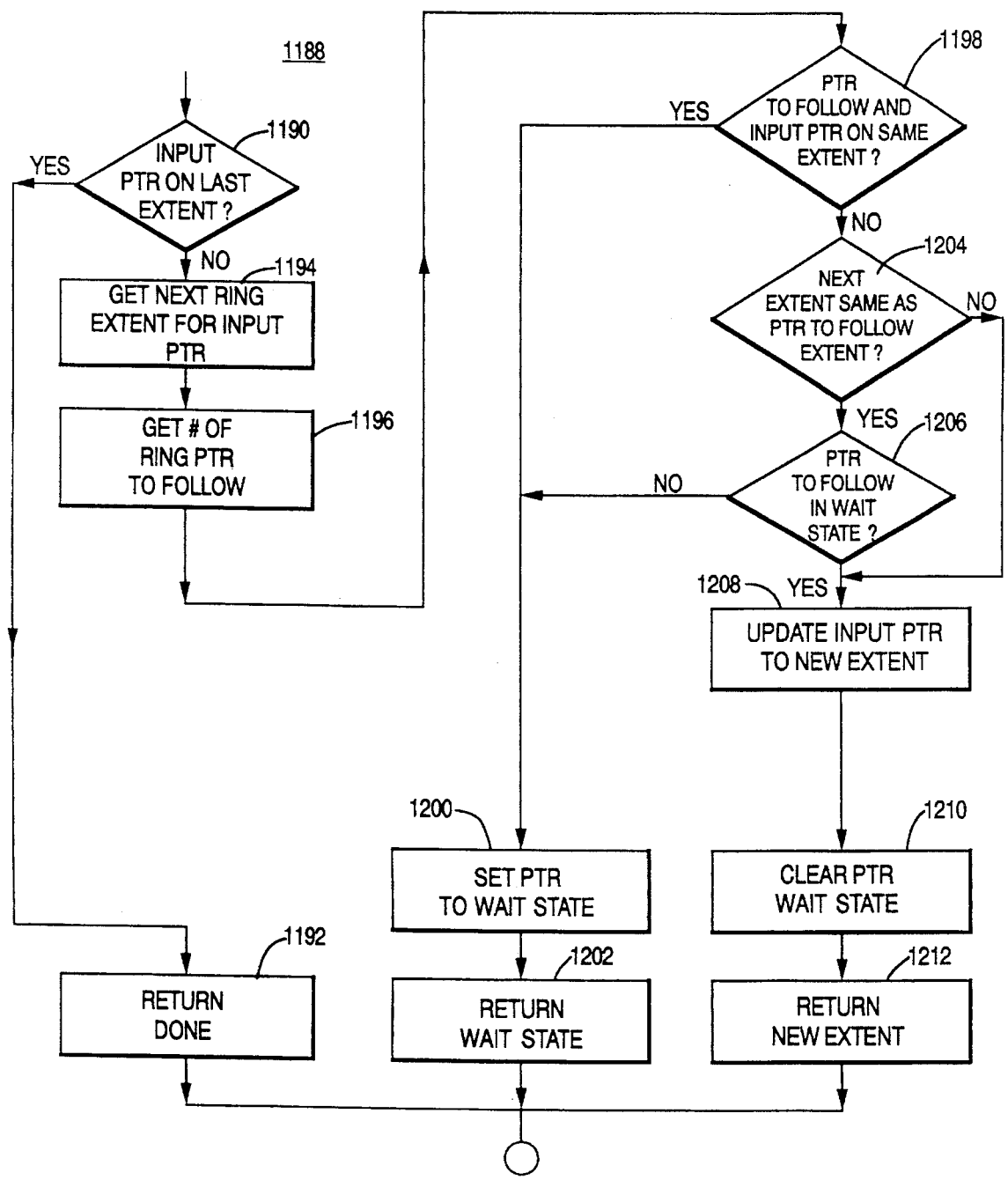
FIG. 42 illustrates the process 1188 of advancing a ring pointer performed by buffer control 102.

The advancing of a ring pointer process 1188, as illustrated in FIG. 42, is substantially identical to the advancing of the file description two-dimensional list pointer except that the end of a ring cannot be encountered. This process starts by determining 1190 whether the input pointer is on the last extent, if so the process returns 1192 done. If not, the next extent for the ring pointer is obtained followed by the ring number of the pointer to follow. If the pointer to follow and the input pointer are on the same extent 1198 the pointer is set 1200 to the wait state and a return 1202 in a wait state is performed. If the pointer is not on the same extent a determination is made at 1204 as to whether the next extent is the same as the pointer to follow extent. If so, a determination 1206 is made as to whether the pointer to follow is in the wait state. If not, once again a return in the wait state is performed. Otherwise the input pointer is updated 1208 to the new extent and the pointer wait state is cleared 1210 with a return with the address of the new extent.

As a specific example, when the present invention is used to copy all of the directory trees ending with "set" and out of those directories all files (*.*) from one disk drive holding a DOS disk to another disk drive holding a VMS disk the command entered is:

bypass_copy a:\*set\...\*.* e:\...

This will perform a DOS block I/O to VMS block I/O transfer on a DOS operating system machine when a machine such as an IBM PC is used. In this example, we will assume that the directories on the source and destination disks are as follows:

Source Directories at Start of Operation:
 Dos Root Dir:
 IO.SYS
 MSDOS.SYS
 COMMAND.COM
 DISKI.VOL
 COLORSET
 SHADESET
 TEXTSET
 Colorset Dir:
 Blue.txt
 Green.txt
 Red.txt
 Shapeset Dir:
 Circle.txt
 Square.txt
 Triangle.txt
 Testset Dir:
 Test1.txt
 Test2.txt
Destination Directory At Start of Operation:
 VMS Root Dir:
 oooooo.dir
 backup.sys
 badblk.sys
 badlog.sys bitmap.sys
contin.sys
corimg.sys
indexf.sys
king.dir
volset.sys
whislu.dir When the process is stopped at the time the first extent in the destination data ring is being written the contents of the various data structures and associated pointers will be as indicated in FIGS. 43–48. That is, FIGS. 43–48 provide a snapshot of the contents of the data structures of present invention part way through a transfer. At the time of the snapshot, as can be seen in FIG. 43, the source data ring 112 has been filled with the green text contents, the red text contents, the blue text contents and circle text contents. The contents of test1 and test2 have not been read in. The translate process 114 has completed translation of the contents of the source data ring as illustrated in ring 116. The source directory ring 275 still contains the directory contents for the color set and shape set directories. However, the test set directory contents have not yet been transferred to this ring 275. Because the source 270 is a block I/O DOS source the source location window 276 contains the file allocation table for DOS in contiguous windows. The destination directory in ring 294 still contains the destination directory root contents and empty contents for the color set and shape set directories. The destination directory out ring 296 contains the merged root directory contents and the merged color set directory contents as will be illustrated in FIG. 47. Because the destination disk 304 is VMS, the destination location window 290 contains the headers 1–4, 450–453 and 454–457, the header control window 292 contains the VMS header bit map which is contiguous and the allocation control window contains bits for blocks 1–78 and 78–156.

Figure 44:
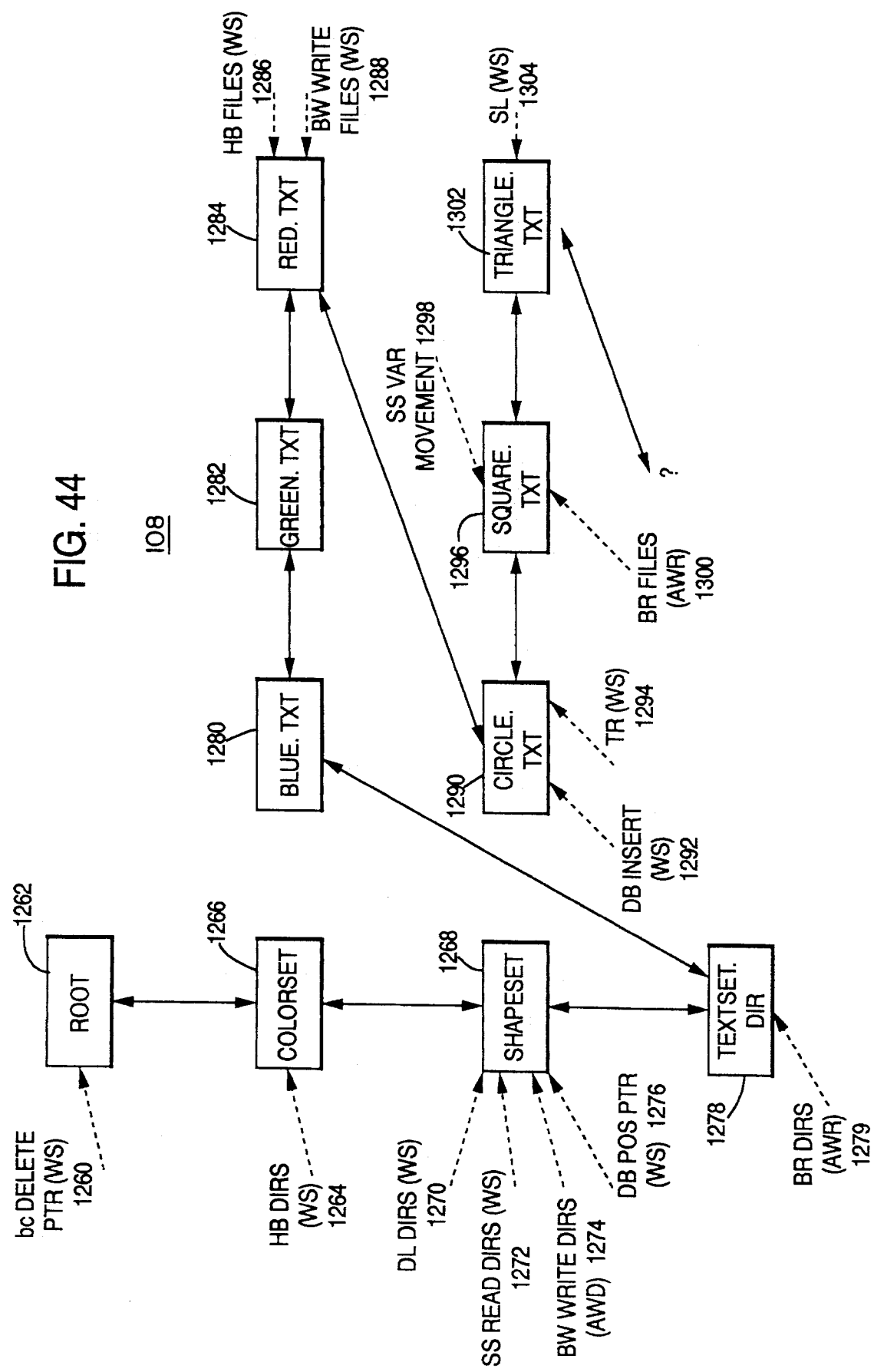
FIG. 44 depicts the list 108 as seen from directory build perspective at the snapshot.

The file description two-dimensional list 108 at the time of the snapshot with respect to the directory build pointers is shown in FIG. 44. The directory build pointers as indicated by the double headed arrows indicate the order in which the directories are built with the question mark indicating that the files of the text set directory have yet to be added to a list 108. Within this list 108 the buffer control delete pointer 1260 is in a wait state pointing to the root directory 1262. The header build directory pointer 1264 is pointing to the color set directory 1266. The shape set directory entry node 1268 is pointed to by the destination location directory pointer 1270 which is in the wait state, the source search read directory pointer 1272 which is in the wait state, the block write for directories pointer 1274 which is awaiting data and the directory build pointer 1276 which is in a wait state. The text set directory entry 1278 in list 108 is pointed at by the block read for directories pointer 1279 which is awaiting room on the source directory ring 275. The red text entry 1274 is pointed to by the header build pointer 1286 for files which is in the wait state and the block write pointer 1288 for files which is also in the wait state. The circle text entry 1290 is pointed at by the directory build insert pointer 1292 and the translate pointer 1294 which are also in the wait state. The square text entry is pointed at by the source search variable movement pointer 1298 and the block read for files pointer 1300 which is awaiting room on the source data ring 112. The triangle text entry 1302 is pointed at by the source location pointer 1304 which is in the wait state.

Figure 45:
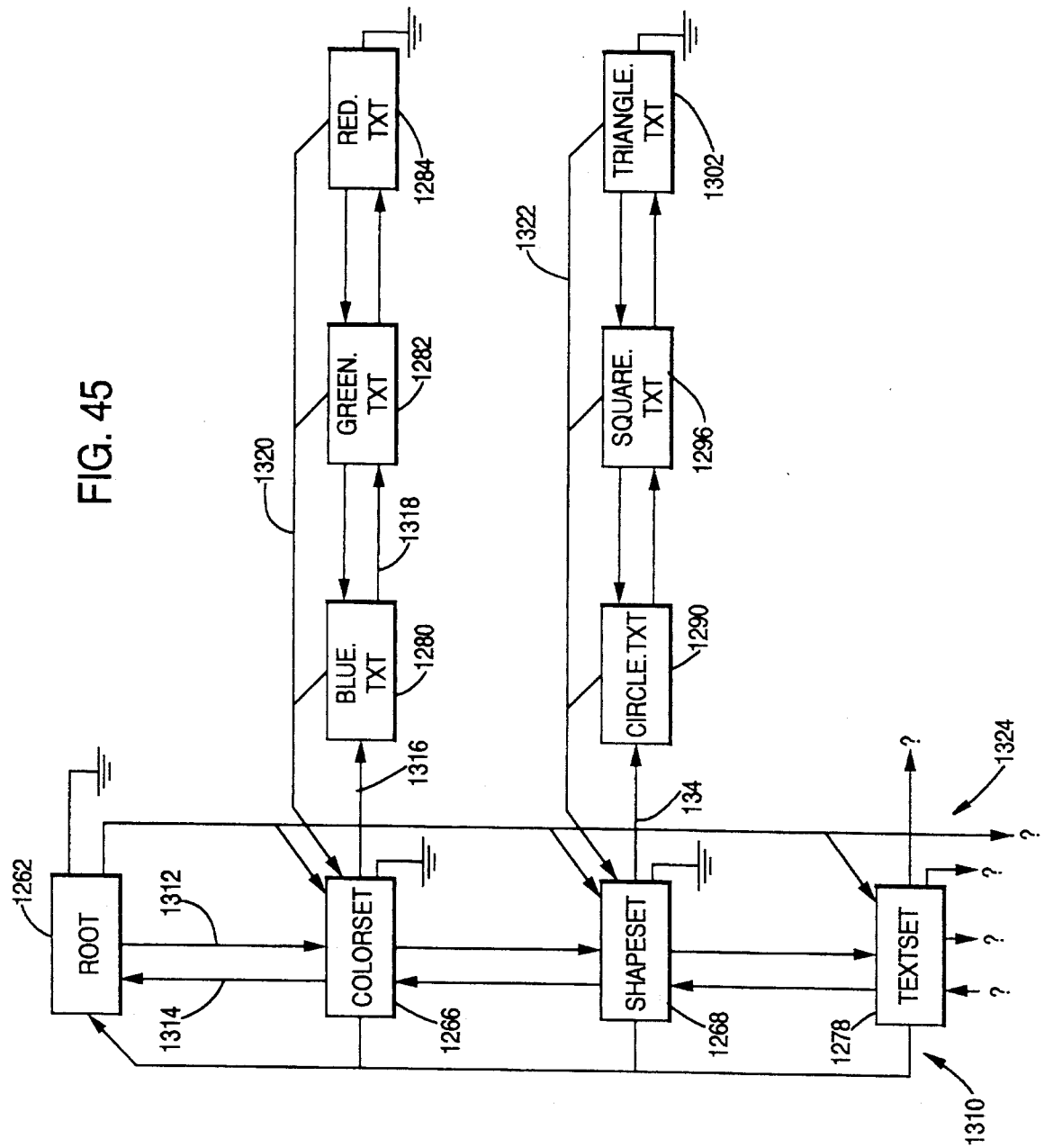
FIG. 45 shows the list 108 in source directory structure hierarchy order.

The source directory hierarchy dimension of the two dimensional list 108 is shown in FIG. 45. The structure includes parent pointers 1310 pointing to the root 1262, forward 1312 and backward 1314 directory pointers before directory entries, file pointers 1316, forward 1318 and backward 1320 file pointers, file parent pointers 1322 and subdirectory pointers 1324.

Figure 46:
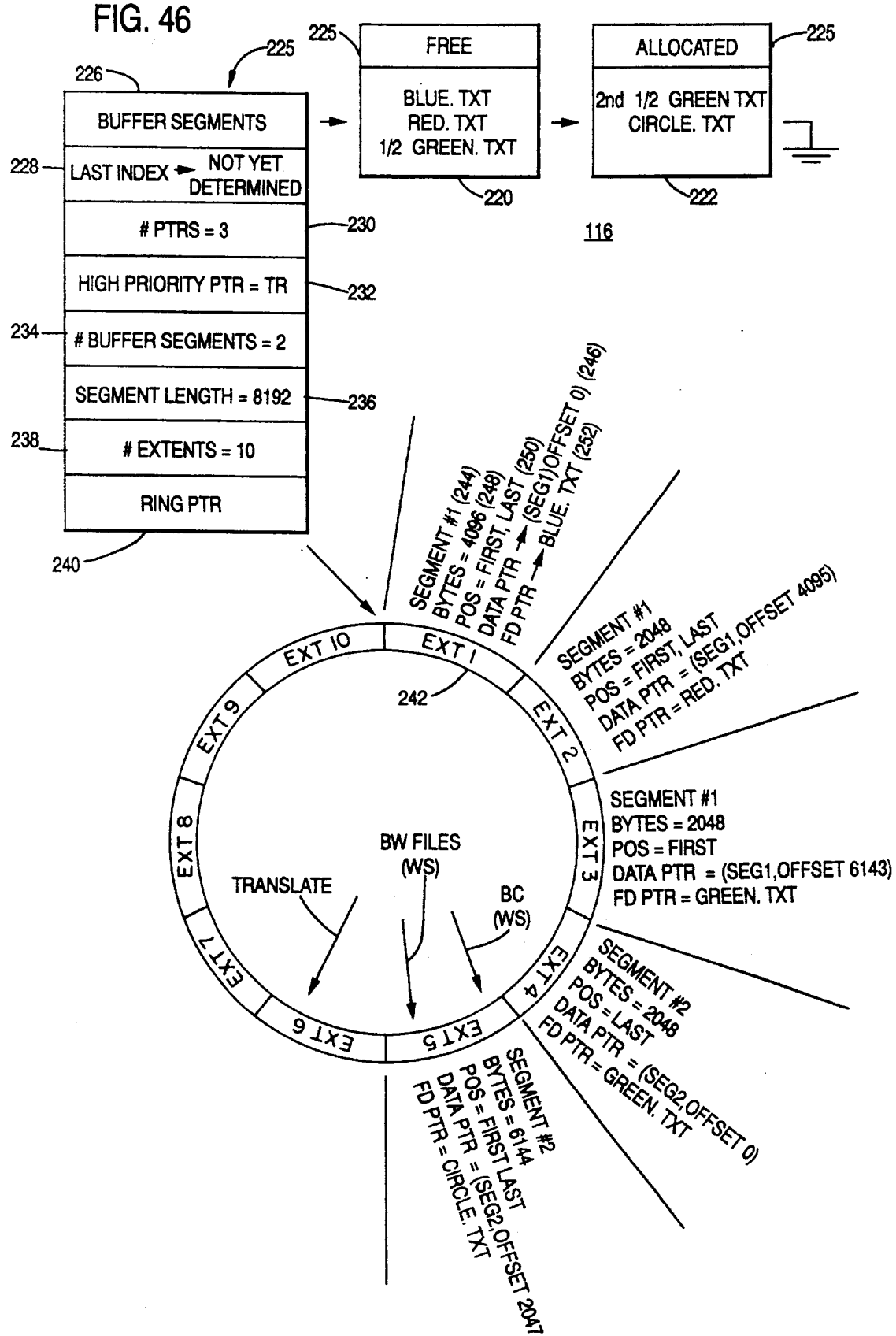
FIG. 46 shows the contents of the ring 116 at the snapshot.

The destination data ring 116 includes the contents as illustrated in FIG. 46. The definition 225 points to one buffer segment 220 which contains available space and one buffer segment 222 which has been allocated. The number of pointers using this ring is three while the highest priority pointer is the translate pointer. The two buffer segments allocated have lengths of 8K bytes while the ring includes 10 extents. The extents 1–5 include the location information for the blue text, red text, first and second halves of the green text and the circle text. The translate pointer is pointing at extent 6 awaiting data white the block write of files and the buffer control pointer point at extent 5 for the circle text.

Figure 47:
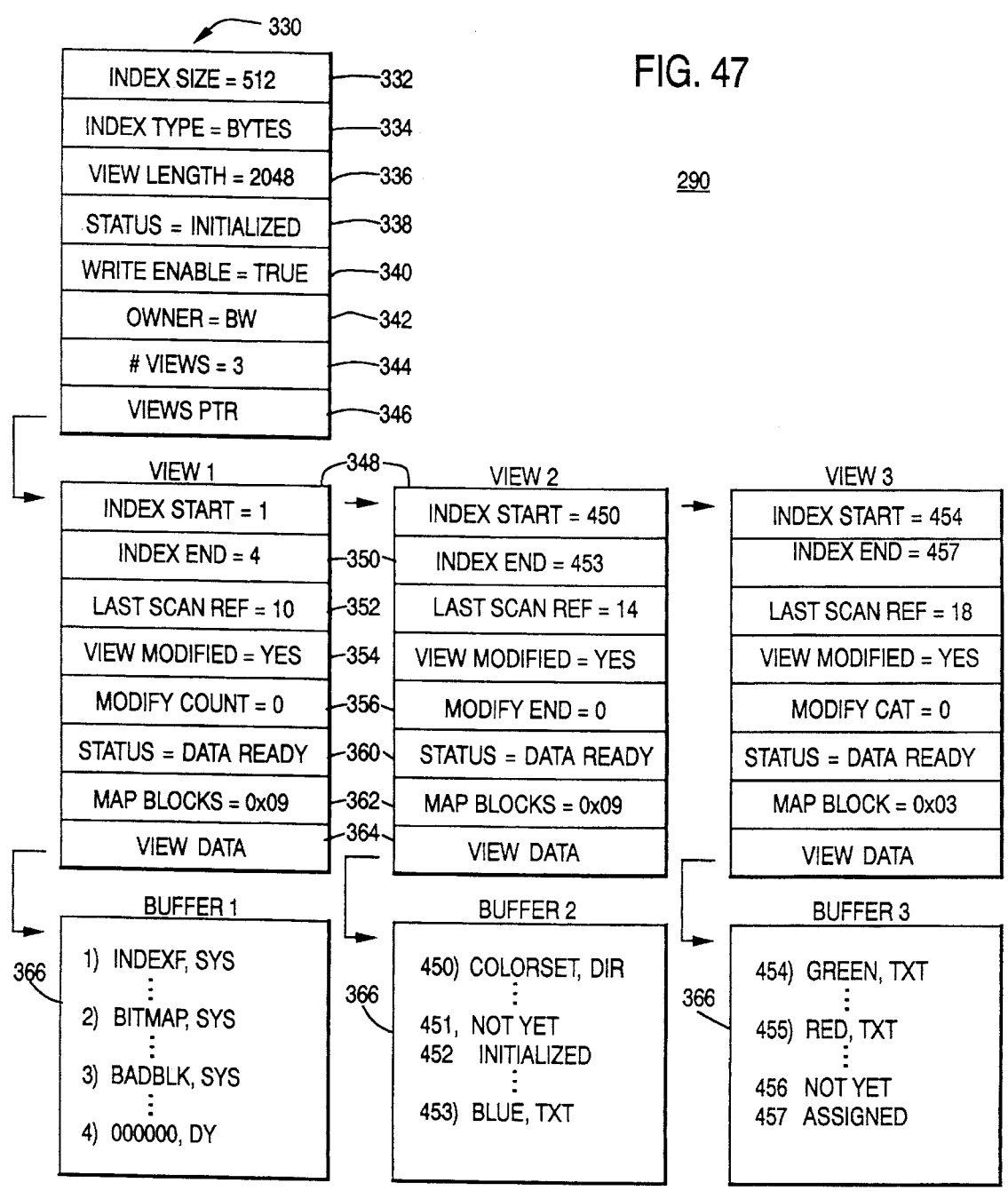
FIG. 47 is a snapshot of destination window 290 contents.

The content of the destination location window 290 at the time of the snapshot, as illustrated in FIG. 47, includes headers for the destination disk files existing on the disk 304 as well as for the color set directory, blue text directory, green text directory and red text directory. The buffers also include space for uninitialized headers and headers that have not yet been assigned.

Figure 48:
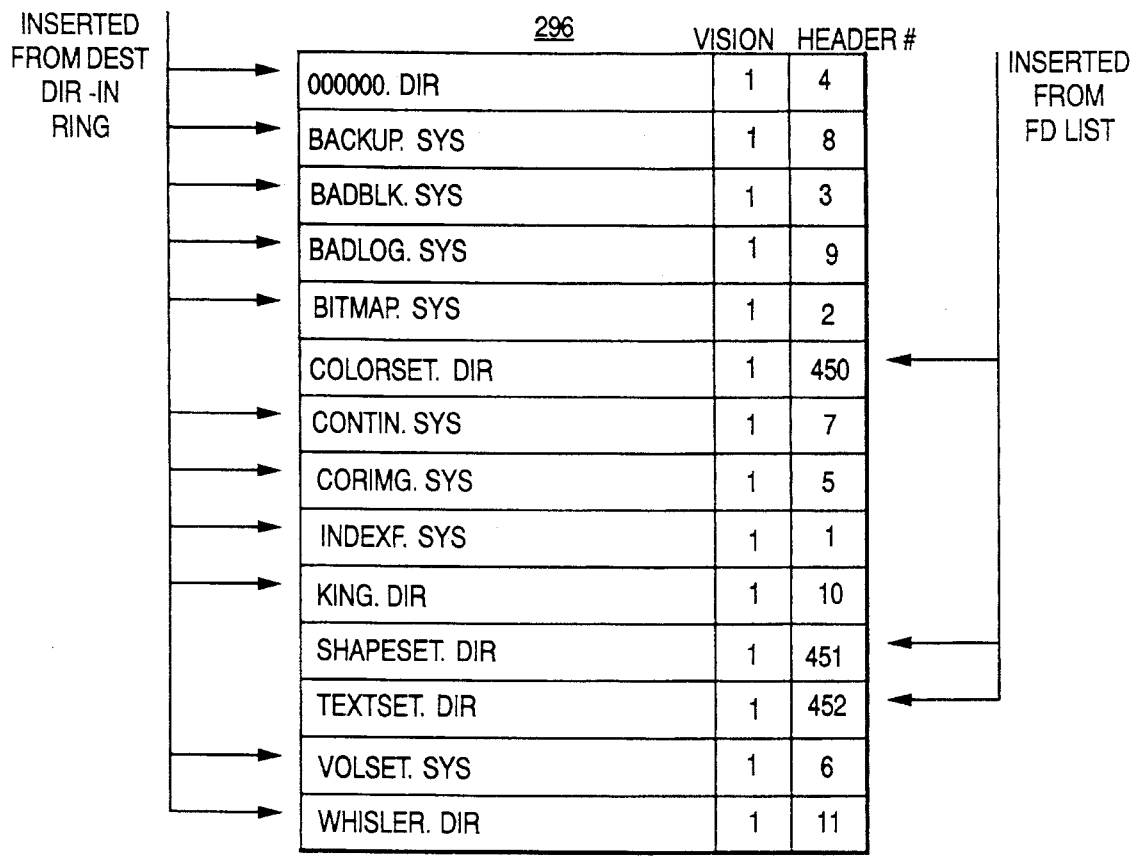
FIG. 48 shows the contents of the ring 296.

The contents of the first extent of the destination directory out ring 296 is illustrated in FIG. 48. This shows that the directories have been sorted into alphabetical order by the destination directory build process 282. The header numbers have also been assigned for each of the directories and the corresponding bits of the header control list window 292 have been set to indicate the headers have been allocated.

Figure 49:
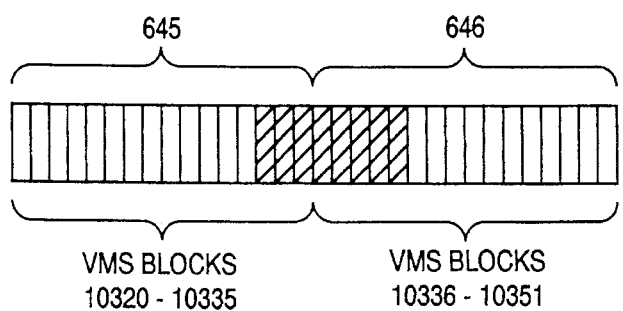
FIG. 49 illustrates the relationship between DOS blocks and VMS blocks when the first extent on the ring 116 is written out to the destination disk 304.

In VMS when a read or write is performed each block will be 512 bytes long while in DOS they will be 8K bytes long. The absolute reads and writes performed throughout this invention perform an appropriate translation for the desired disk format from what the system 36 is requesting to what the disk format requires. For example, when the block write of the first extent in the destination data ring 116 is stored on the destination disk 304 the contents of the disk blocks as indicated in FIG. 49 by the shading will contain the blue text file contents. The target disk block size is 512 bytes while the target I/O block size is 8K bytes. The blue text file contains 4K resulting in the VMS blocks 10333–10340 being assigned. The block ratio is 8K/512 or 16. The steps for writing the blue text out to the destination disk include reading DOS block 645 and 646 from the destination disk into the buffer, copying the first 1536 bits of the blue text into the end of the DOS block 645 buffer and copying the last 2560 bites of the blue text into the beginning of DOS block 646 and writing the blocks 10333–10340 to the disk.

To provide a selective translate file capability, the user can be asked by the user interface process 100 to specify which files require translation as each file node is created on the list 108 by the source file look up process 104 or source directory search process 280. This requires a call to the user interface process 100 each time a file node is created and a simple query "Should 'file name' be translated?" be output by the interface process 100. The return from the call would be a yes or no which would be stored in a translate field of the corresponding node in the list 108. The translate process would examine the flag and perform a translation as previously described if the flag is set "yes," otherwise the file would just be moved to the destination data ring 116 from the source data ring 112 without translation.

A DIR command activates only the read processes, particularly the directory read processes which creates directory and file entry nodes on list 108. As the source search process 280 creates an entry on the list 108 the entry file name is echoed to the screen along with the directory path for that file.

The TYPE command, which causes a file to be written to the users screen for review, when entered by the user also activates the read processes particularly the source block read process 274. The source block read process 274 when the file contents are to be put on ring 112 echoes the contents of the input buffer to the users screen. This of course does not translate the file contents into the format of the native operating system if the disk is a foreign file format disk. To transfer a translated file to the user screen, the destination file write process 120 writes the file out to the screen from the destination data ring 116 after translation by the translate process requiring activation of the translate 114 and file write 120 processes in addition to the read processes.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, this invention has been described with respect to a single processor performing all the processes. FIG. 37 illustrates that some of the operations can be done in parallel if multiple processors accessing a common memory are available. Other operations and processes will be recognized by those of ordinary skill in the art as being capable of parallel execution.

We claim:

1. A file transfer method performed in a computer having an operating system, comprising the steps of:

reading files from a first disk having a first file format with a first file format definition including a first directory structure and a first file structure using: a computer; means for reading the first disk; and a read process separate from and bypassing the operating system and with the read process controlling a reading operation of the first disk by the means for reading and which reading operation bypasses the operating system; and writing the files to a second disk having a second file format with a second file format definition including a second directory structure and a second file structure using: the computer; means for writing the second disk and a write process separate from and bypassing the operating system and for transforming contents read from the first disk into the second file format and the write process controlling writing operations to the second disk by the means for writing and which writing operation bypasses the operating system.

2. A file transfer method performed in a computer having an operating system, comprising the steps of:

reading files from a first disk having a first file format using: a computer; means for reading the first disk; and a read process separate from and bypassing the operating system and the read process controlling a reading operation of the first disk by the means for reading and which bypasses the operating system; and writing the files to a second disk having a second file format using: the computer; means for writing the second disk and a write process separate from and bypassing the operating system and for transforming contents read from the first disk into the second file format and the write process controlling writing operations to the second disk by the means for writing and which bypasses the operating system and, further comprising asking a user to specify the first and second file formats and performing the transforming of the files from the first format to the second format responsive to the user specifying the first and second formats.

3. A file transfer method performed in a computer having an operating system, comprising the steps of:

reading files from a first disk having a first file format using: a computer; means for reading the first disk; and a read process separate from and bypassing the operating system and the read process controlling a reading operation of the first disk by the means for reading and which read process bypasses the operating system; and writing the files to a second disk having a second file format using: the computer; means for writing the second disk and a write process separate from and bypassing the operating system and for transforming contents read from the first disk into the second file format and the write process controlling writing operations to the second disk by the means for writing and which write process bypasses the operating system, and wherein said reading step includes determining the first file format from contents of the first disk and said writing step includes determining the second file format from contents of the second disk and the reading and writing steps including the steps of reading and writing the files responsive to the determined first and second formats, respectively.

4. A method as recited in claim 3, further comprising the steps, during said reading, of:

storing first disk file contents on a source file contents ring;

storing first disk directory contents on a source directory ring;

creating a two-dimensional list from the first directory contents having a first dimension coordinating a disk directory structure and having a second dimension coordinating a disk file structure; and further comprising the steps, during said writing, of:

storing the contents of the source file contents ring on a destination file contents ring responsive to the two dimensional list used as a guide to maintaining correct directory order; and storing second directory contents on a destination directory ring responsive to the two dimensional list used as a guide to maintaining correct directory order.

5. A method as recited in claim 4, further comprising creating and writing headers for files and directories for the second disk.

6. A method as recited in claim 5, further comprising moving file contents stored on the source file contents ring to the destination file contents ring and translating the file contents from the first format to the second format during the moving.

7. A method as recited in claim 6, further comprising controlling access to the rings and list.

8. A method as recited in claim 4, wherein said destination and source file contents rings are the same ring.

9. A file transfer method performed in a computer having an operating system, comprising the steps of:

determining a first file format from contents of a first disk;

determining a second file format from contents of a second disk;

reading files from the first disk, the files having the first file format using the: computer; disk reading means for reading the first disk; and a read process separate from and bypassing the operating system and the read process controlling reading operations of the first disk by the disk reading means and which read process bypasses the operating system;

storing first disk file contents of the files obtained during reading on a source file contents ring;

storing first disk directory contents of the files obtained during reading on a source directory ring;

creating a two-dimensional list from the directory contents having a first dimension coordinating a first directory structure of the first disk and having a second dimension coordinating a second directory structure of the second disk;

storing second directory contents for the second file contents on a destination directory ring based on the second directory structure of the two dimensional list for maintaining correct directory order;

transferring the contents of the source file contents ring to a destination file contents ring;

creating headers for the files and directories for the second disk;

writing the files from the destination field contents ring, directories from the destination directory ring and the headers to the second disk having the second file format using: the computer; disk writing means for writing the second disk; and a write process separate from and bypassing the operating system and the write process controlling writing operations to the second disk by the disk writing means which write process bypasses the operating system; and controlling access to the rings and the list.

10. A file structure display method using a computer having an operating system, comprising:

reading disk contents using a disk reading means having a read process separate from and bypassing the operating system, transforming, using a transforming means for taking the disk contents in a first file format with a first file format definition including a first directory structure and a first file structure and converting the contents into a second format with a second file format definition including a second directory structure and a second file structure, and displaying, using a display means for displaying, file and directory names from a disk having files with file names stored in the first file format using the computer having the operating system which displays using the second file format.

11. A method as recited in claim 10, wherein said reading and displaying step includes echoing a file name and directory path to a user screen when a file or directory name from the disk is obtained.

12. A file display method using a computer having an operating system, comprising:

reading a file having contents from a disk using a disk reading means having a read process separate from and via bypassing the operating system, with the file contents having a first file format with a first file format definition including a first directory structure and a first file structure;

transforming, separate from and via bypassing the operating system, the file contents from the first file format to a second file format with a second file format definition including a second directory structure and a second file structure using the computer by maintaining a directory hierarchy of the first disk in the second format and converting record formats; and displaying the file contents having the second file format used by the computer using a display means for displaying.

13. A method as recited in claim 12, wherein file contents are transformed before display.

14. A file format transform apparatus, comprising:

a disk drive having a disk; and a computer having an operating system, connected to said drive and comprising transform means, separate from and bypassing the operating system, for transforming files on the disk from a first file format having a first file format definition including a first directory structure and a first file structure to a second file format having a second file format definition including a second directory structure and a second file structure by reading disk contents, transforming from the first file format to the second file format and writing format transformed contents onto the disk.

15. A file format transform apparatus, comprising:

a disk drive for accessing first and second disks; and a computer having an operating system, connected to said drive and comprising transform means, separate from and bypassing the operating system, for transforming files on the first disk from a first file format to a second file format by reading first disk contents, transforming from the first file format to the second file format and writing format transformed contents onto the second disk and said transform means comprising:

means for determining, prior to the reading and during the transforming, the first file format from contents of the first disk; and means for determining, prior to the writing and during the transforming, the second file format from contents of the second disk.

16. An apparatus as recited in claim 15, wherein said transform means further comprises:

means for storing, during the transforming, first disk directory contents on a source directory ring;

means for storing, during the transforming, first file contents on a source file ring;

means for creating, during the transforming, a two-dimensional list from the directory contents having a first dimension coordinating a first directory structure of the first disk and having a second dimension coordinating a second directory structure of the second disk;

means for designating, during the transforming, the contents of the source file ring as a destination file contents ring; and means for storing, during the transforming, second directory contents on a destination directory ring responsive to the two-dimensional list for maintaining correct directory order.

17. An apparatus as recited in claim 16, wherein said transform means further comprises means for creating headers for files and directories of the second disk.

18. An apparatus as recited in claim 17, wherein said apparatus has a destination file contents ring and said transform means further comprises means for moving the file contents from the source file contents ring to the destination file contents ring and translating the file contents from the first format to the second format during the moving.

19. An apparatus as recited in claim 18, wherein said transform means further comprises means for controlling, during the transforming, access to the rings and the list.

20. An apparatus as recited in claim 18, wherein said process control means selectively activates said means responsive to the file format of the first and second disks.

21. A file format transform apparatus, comprising:

a disk drive having a disk; and a computer having an operating system, connected to said disk drive and comprising transform means, separate from and bypassing the operating system, for transforming files on the disk from a first file format to a second file format by reading disk contents, transforming from the first file format to the second file format and writing format transformed contents onto the disk, and said transform means comprises:

source file look-up means for determining the location of files on the first disk;

source directory location means for determining the location of directories of the files on the first disk;

source block reading means for reading blocks from the first disk and storing files of the blocks on the source data ring and directories of the files on a source directory ring;

source directory search means for creating file and directory entries in a file description listing from the directories on the source directory ring;

translate means for translating the files on the source data ring from the first file format into the second file format and storing the files on a destination data ring;

destination directory location means for locating directories on a second disk;

header build means for building headers for files and directories listed on the file description list;

destination directory build means for building directories from the entries on the file description list and directories on the second disk and storing the directories on a destination directory out ring;

destination block write means for writing files from the destination data ring, directories from the out ring and headers onto the second disk in the second file format;

destination directory create means for creating directories on the second disk;

buffer control means for controlling access to the list and rings; and process control means for controlling execution sequence of the above-listed means.

22. A file transfer system, comprising:

file storage means for storing files; and a computer connected to said file storage means and transferring files within said storage means responsive to a two-dimensional file description list storing file and directory build order for the files of said file storage means and for maintaining correct directory order during the transferring, and said file storage means including a destination disk and said computer further including:

a source data ring storing files during the transferring and listed in said list;

a source directory ring storing directories during the transferring and listed in said list; and a directory out ring storing directories during the transferring and listed in said list and from the said destination disk.

23. A system as recited in claim 22, said computer further including a destination data ring storing files during the transferring and listed in said list.

24. A system as recited in claim 23, said computer further including:

a source location window storing location information for the files during the transferring and listed in said list; and a destination location window storing location information for the files listed in said list and files from said destination disk during the transferring.

25. A system as recited in claim 24, further comprising:

an allocation control list window storing indicators of allocated space on said destination disk during the transferring; and an index control list window storing indicators of indexes allocated on said destination disk during the transferring.

26. A disk file transfer system, comprising:

file storage means for storing files and comprising a source disk and a destination disk; and a computer connected to said file storage means and including:

a two-dimensional file description list storing file and directory entries in source disk directory structure hierarchical order and destination disk directory build order during a transfer;

a source data ring storing files listed in said list from the source disk during the transfer;

a source directory ring storing directories listed in said list from the source disk during the transfer;

a destination data out ring storing translated contents of said source data ring during the transfer;

a directory out ring storing directories listed in said list and from a destination disk during the transfer;

a source location window storing source disk location information for the files listed in said list during the transfer;

a destination location window storing location information for the files listed in said list and files from the destination disk during the transfer;

an allocation control list window storing indicators of allocated space on the destination disk during the transfer; and an index control list window storing indicators of indexes allocated on the destination disk during the transfer.

* * * * *